US010609878B2

(12) United States Patent
Montgomery et al.

(10) Patent No.: US 10,609,878 B2
(45) Date of Patent: Apr. 7, 2020

(54) WIRELESS REMOTE IRRIGATION CONTROL

(71) Applicant: Rain Bird Corporation, Azusa, CA (US)

(72) Inventors: Randy R. Montgomery, Tucson, AZ (US); Anderson I. Micu, San Diego, CA (US); John E. Price, Tucson, AZ (US); James R. Harris, Tucson, AZ (US); Jeffrey B. Westphal, Tucson, AZ (US); Ray S. Peppiatt, Oro Valley, AZ (US); Samuel P. Whitt, Jr., San Diego, CA (US); Forrest M. Henderson, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 15 days.

(21) Appl. No.: 15/650,257

(22) Filed: Jul. 14, 2017

(65) Prior Publication Data

US 2018/0014480 A1    Jan. 18, 2018

Related U.S. Application Data

(60) Provisional application No. 62/363,170, filed on Jul. 15, 2016.

(51) Int. Cl.
*H04H 20/71* (2008.01)
*A01G 25/16* (2006.01)
*G05B 19/042* (2006.01)

(52) U.S. Cl.
CPC ........... *A01G 25/16* (2013.01); *G05B 19/042* (2013.01); *G05B 2219/2625* (2013.01)

(58) Field of Classification Search
CPC ...... A01G 25/16; A01G 27/00; A01G 25/167; Y02A 40/238; G05B 2219/2625

(Continued)

(56) References Cited

U.S. PATENT DOCUMENTS 3,114,243 A    12/1963   Winters
3,372,899 A     3/1968   Mcpherson
(Continued)

FOREIGN PATENT DOCUMENTS

EP    2730159    5/2014
WO    9003724    4/1990
(Continued)

OTHER PUBLICATIONS

U.S. Appl. No. 15/270,986, filed Sep. 20, 2016, Weiler Steven W.
(Continued)

*Primary Examiner* — Edward F Urban
*Assistant Examiner* — Max Mathew
(74) *Attorney, Agent, or Firm* — Fitch, Even, Tabin & Flannery LLP

(57) ABSTRACT

Systems, apparatuses, and methods are provided herein related to irrigation control systems. In some embodiments, an irrigation control system includes a router, an access point, and irrigation controller, a wireless adapter, and a mobile device. The mobile device can communicate with the wireless adapter in a direct communication mode in which the wireless adapter creates a wireless network, a first indirect communication mode in which the mobile device and the wireless adapter communicate via the access point while the mobile device is within range of the access point, and a second indirect communication mode in which the mobile device and the wireless adapter communicate via the access point while the mobile device is out of range of the access point.

21 Claims, 35 Drawing Sheets

(58) Field of Classification Search
USPC .................................................... 455/3.01
See application file for complete search history.

(56) References Cited

U.S. PATENT DOCUMENTS

| | | |
|---|---|---|
| 3,599,867 A | 8/1971 | Griswold |
| 4,176,395 A | 11/1979 | Evelyn-Veere |
| 4,185,650 A | 1/1980 | Neves |
| 4,189,776 A | 2/1980 | Kendall |
| RE31,023 E | 9/1982 | Hall |
| 4,545,396 A | 10/1985 | Miller |
| 4,548,225 A | 10/1985 | Busalacchi |
| 4,626,984 A | 12/1986 | Unruh |
| 4,685,920 A | 8/1987 | Fritch |
| 4,760,547 A | 7/1988 | Duxbury |
| 4,937,732 A | 6/1990 | Brundisini |
| 4,962,522 A | 10/1990 | Marian |
| 4,985,638 A | 1/1991 | Brock |
| 5,097,861 A | 3/1992 | Hopkins |
| 5,173,855 A | 12/1992 | Nielsen |
| 5,208,855 A | 5/1993 | Marian |
| 5,251,153 A | 10/1993 | Nielsen |
| 5,333,785 A | 8/1994 | Dodds |
| 5,400,246 A | 3/1995 | Wilson |
| 5,427,350 A | 6/1995 | Rinkewich |
| 5,444,611 A | 8/1995 | Woytowitz |
| 5,465,904 A | 11/1995 | Vaello |
| 5,479,338 A | 12/1995 | Ericksen |
| 5,479,339 A | 12/1995 | Miller |
| 5,651,500 A | 7/1997 | Patterson |
| 5,740,031 A | 4/1998 | Gagnon |
| 5,740,038 A | 4/1998 | Hergert |
| 5,748,466 A | 5/1998 | McGivern |
| 5,760,706 A | 6/1998 | Kiss |
| 5,813,606 A | 9/1998 | Ziff |
| 5,828,807 A | 10/1998 | Tucker |
| 5,860,715 A | 1/1999 | Lohde |
| 5,884,224 A | 3/1999 | McNabb |
| 5,921,280 A | 7/1999 | Ericksen |
| 5,999,908 A | 12/1999 | Abelow |
| 6,019,290 A | 2/2000 | Grott |
| 6,061,603 A | 5/2000 | Papadopoulos |
| 6,088,621 A | 7/2000 | Woytowitz |
| 6,098,898 A | 8/2000 | Storch |
| 6,108,590 A | 8/2000 | Hergert |
| 6,123,093 A | 9/2000 | D'Antonio |
| 6,145,755 A | 11/2000 | Feltz |
| 6,173,727 B1 | 1/2001 | Davey |
| 6,218,953 B1 | 4/2001 | Petite |
| 6,236,332 B1 | 5/2001 | Conkright |
| 6,240,336 B1 | 5/2001 | Brundisini |
| 6,267,298 B1 | 7/2001 | Campbell |
| 6,283,139 B1 | 9/2001 | Symonds |
| 6,314,340 B1 | 11/2001 | Mecham |
| 6,337,971 B1 | 1/2002 | Abts |
| 6,452,499 B1 | 9/2002 | Runge |
| 6,453,215 B1 | 9/2002 | Lavoie |
| 6,491,062 B1 | 12/2002 | Croft |
| 6,507,775 B1 | 1/2003 | Simon |
| 6,553,336 B1 | 4/2003 | Johnson |
| 6,600,971 B1 | 7/2003 | Smith |
| 6,708,084 B2 | 3/2004 | Battistutto |
| 6,721,630 B1 | 4/2004 | Woytowitz |
| 6,763,287 B2 | 7/2004 | Brundisini |
| 6,782,310 B2 | 8/2004 | Bailey |
| 6,834,662 B1 | 12/2004 | Olson |
| 6,850,819 B1 | 2/2005 | Townsend |
| 6,891,838 B1 | 5/2005 | Petite |
| 6,892,113 B1 | 5/2005 | Addink |
| 6,898,467 B1 | 5/2005 | Smith |
| 6,963,808 B1 | 11/2005 | Addink |
| 6,990,335 B1 | 1/2006 | Shamoon |
| 6,997,642 B2 | 2/2006 | Bishop |
| 7,010,394 B1 | 3/2006 | Runge |
| 7,050,887 B2 | 5/2006 | Alvarez |
| 7,053,767 B2 | 5/2006 | Petite |
| 7,103,511 B2 | 9/2006 | Petite |
| 7,181,319 B1 | 2/2007 | Woytowtiz |
| 7,182,272 B1 | 2/2007 | Marian |
| 7,203,576 B1 | 4/2007 | Wilson |
| 7,216,020 B2 | 5/2007 | Marian |
| 7,216,659 B2 | 5/2007 | Caamano |
| 7,225,057 B2 | 5/2007 | Froman |
| 7,245,991 B1 | 7/2007 | Woytowitz |
| 7,248,945 B2 | 7/2007 | Woytowitz |
| 7,250,860 B2 | 7/2007 | Smith |
| 7,257,397 B2 | 8/2007 | Shamoon |
| 7,264,177 B2 | 9/2007 | Buck |
| 7,269,829 B2 | 9/2007 | Smith |
| 7,272,456 B2 | 9/2007 | Farchmin |
| 7,280,892 B2 | 10/2007 | Bavel |
| 7,286,904 B2 | 10/2007 | Graham |
| 7,305,280 B2 | 12/2007 | Marian |
| 7,315,764 B1 | 1/2008 | Sutardja |
| 7,328,089 B2 | 2/2008 | Curren |
| 7,330,796 B2 | 2/2008 | Addink |
| 7,337,042 B2 | 2/2008 | Marian |
| 7,359,769 B2 | 4/2008 | Bailey |
| 7,363,113 B2 | 4/2008 | Runge |
| 7,383,721 B2 | 6/2008 | Parsons |
| 7,398,139 B1 | 7/2008 | Woytowitz |
| 7,400,944 B2 | 7/2008 | Bailey |
| 7,406,363 B2 | 7/2008 | Doering |
| 7,424,291 B1 | 9/2008 | Lunsford |
| 7,444,207 B2 | 10/2008 | Nickerson |
| 7,457,676 B1 | 11/2008 | Sutardja |
| 7,468,661 B2 | 12/2008 | Petite |
| 7,469,707 B2 | 12/2008 | Anderson |
| 7,532,954 B2 | 5/2009 | Evelyn-Veere |
| 7,546,172 B1 | 6/2009 | Sutardja |
| 7,558,650 B2 | 7/2009 | Thornton |
| 7,574,285 B2 | 8/2009 | Kah |
| 7,584,023 B1 | 9/2009 | Palmer |
| 7,584,053 B2 | 9/2009 | Abts |
| 7,590,471 B2 | 9/2009 | Jacobsen |
| 7,613,546 B2 | 11/2009 | Nelson |
| 7,620,565 B2 | 11/2009 | Abelow |
| 7,640,079 B2 | 12/2009 | Nickerson |
| D607,847 S | 1/2010 | Elliott |
| 7,643,823 B2 | 1/2010 | Shamoon |
| 7,650,425 B2 | 1/2010 | Davis |
| 7,693,582 B2 | 4/2010 | Bergman |
| 7,711,454 B2 | 5/2010 | Addink |
| 7,761,189 B2 | 7/2010 | Froman |
| 7,778,736 B2 | 8/2010 | Sutardja |
| 7,792,612 B2 | 9/2010 | Kah |
| 7,809,475 B2 | 10/2010 | Kaprielian |
| 7,822,511 B2 | 10/2010 | Ivans |
| 7,831,321 B2 | 11/2010 | Ebrom |
| 7,844,367 B2 | 11/2010 | Nickerson |
| 7,844,369 B2 | 11/2010 | Nickerson |
| 7,912,588 B2 | 3/2011 | Runge |
| 7,913,653 B2 | 3/2011 | Jordan |
| 7,916,458 B2 | 3/2011 | Nelson |
| 7,917,249 B2 | 3/2011 | Jacobsen |
| 7,930,069 B2 | 4/2011 | Savelle |
| 7,937,187 B2 | 5/2011 | Kaprielian |
| 7,962,245 B2 | 6/2011 | Runge |
| 7,966,153 B2 | 6/2011 | Bangalore |
| 7,978,059 B2 | 7/2011 | Petite |
| 7,987,446 B2 | 7/2011 | Cypher |
| 7,996,115 B2 | 8/2011 | Nickerson |
| 7,996,192 B2 | 8/2011 | Repelli |
| 8,010,238 B2 | 8/2011 | Ensworth |
| 8,014,904 B1 | 9/2011 | Woytowitz |
| 8,019,328 B2 | 9/2011 | Lunsford |
| 8,019,482 B2 | 9/2011 | Sutardja |
| 8,024,074 B2 | 9/2011 | Stelford |
| 8,055,389 B2 | 11/2011 | Holindrake |
| 8,061,080 B2 | 11/2011 | Loebl |
| 8,064,412 B2 | 11/2011 | Petite |
| 8,104,993 B2 | 1/2012 | Hitt |
| 8,108,077 B2 | 1/2012 | Smith |
| 8,136,484 B2 | 3/2012 | Jordan |

(56) References Cited

U.S. PATENT DOCUMENTS

| | | |
|---|---|---|
| 8,145,359 B2 | 3/2012 | Addink |
| 8,150,554 B2 | 4/2012 | Anderson |
| 8,158,248 B2 | 4/2012 | Hara |
| 8,160,750 B2 | 4/2012 | Weiler |
| 8,191,307 B2 | 6/2012 | Donoghue |
| 8,193,930 B2 | 6/2012 | Petite |
| 8,215,570 B2 | 7/2012 | Hitt |
| 8,217,781 B2 | 7/2012 | Ebrom |
| 8,219,935 B2 | 7/2012 | Hunts |
| 8,224,493 B2 | 7/2012 | Walker |
| 8,225,810 B2 | 7/2012 | Blanchard |
| 8,234,014 B1 | 7/2012 | Ingle |
| 8,244,404 B2 | 8/2012 | Nickerson |
| 8,265,797 B2 | 9/2012 | Nickerson |
| 8,271,144 B2 | 9/2012 | Kah |
| 8,275,309 B2 | 9/2012 | Woytowitz |
| 8,285,460 B2 | 10/2012 | Hoffman |
| 8,302,881 B1 | 11/2012 | Campbell |
| 8,302,882 B2 | 11/2012 | Nelson |
| 8,311,765 B2 | 11/2012 | Nielsen |
| 8,321,365 B2 | 11/2012 | Anderson |
| 8,322,072 B2 | 12/2012 | Anderson |
| 8,335,304 B2 | 12/2012 | Petite |
| 8,340,828 B2 | 12/2012 | Danieli |
| 8,359,142 B2 | 1/2013 | Hoffman |
| 8,369,996 B2 | 2/2013 | Choat |
| 8,477,021 B2 | 7/2013 | Slack |
| 8,498,572 B1 | 7/2013 | Schooley |
| 8,509,683 B2 | 8/2013 | Woytowitz |
| 8,554,380 B2 | 10/2013 | Nourian |
| 8,573,049 B1 | 11/2013 | Ware |
| 8,649,907 B2 * | 2/2014 | Ersavas ............... A01G 25/167 700/275 |
| 8,659,183 B2 | 2/2014 | Crist |
| 8,680,983 B2 | 3/2014 | Ebrom |
| 8,750,796 B2 | 6/2014 | Claus |
| 8,812,007 B2 | 8/2014 | Hitt |
| 8,819,432 B2 | 8/2014 | Bergsten |
| 8,838,021 B2 | 9/2014 | Woytowitz |
| 8,862,275 B2 | 10/2014 | Runge |
| 8,981,946 B2 | 3/2015 | Runge |
| 9,007,050 B2 | 4/2015 | Hill |
| 9,069,071 B1 | 6/2015 | Schlautman |
| 9,079,748 B2 | 7/2015 | Tracey |
| 9,081,376 B2 | 7/2015 | Woytowitz |
| 9,121,623 B2 | 9/2015 | Filson |
| 9,128,494 B2 | 9/2015 | Viera |
| 9,164,177 B1 | 10/2015 | Schlautman |
| 9,200,985 B2 | 12/2015 | Rice |
| 9,258,952 B2 | 2/2016 | Walker |
| 9,280,885 B2 | 3/2016 | Frederick |
| 9,296,004 B1 | 3/2016 | Clark |
| 9,297,150 B2 | 3/2016 | Klicpera |
| 9,307,620 B2 | 4/2016 | Woytowitz |
| 9,324,067 B2 | 4/2016 | Van Os |
| 9,326,462 B2 | 5/2016 | Runge |
| 9,356,226 B2 | 5/2016 | Pargas |
| 9,418,530 B2 | 8/2016 | Rapaport |
| 9,442,474 B2 | 9/2016 | Madonna |
| 9,465,377 B2 | 10/2016 | Davis |
| 9,468,162 B2 | 10/2016 | Weiler |
| 9,478,119 B1 | 10/2016 | Rapaport |
| 9,494,480 B2 | 11/2016 | Klicpera |
| 9,520,250 B2 | 12/2016 | O'Keeffe |
| 9,538,713 B2 | 1/2017 | Pearson |
| 9,555,432 B2 | 1/2017 | McLain |
| 9,565,810 B2 | 2/2017 | Eng |
| 9,579,790 B2 | 2/2017 | Laurent |
| 9,590,427 B2 | 3/2017 | Davis |
| 9,594,366 B2 | 3/2017 | Klein |
| 9,618,137 B2 | 4/2017 | Ferrer Herrera |
| 9,678,485 B2 | 6/2017 | Malaugh |
| 9,699,974 B2 | 7/2017 | Clark |
| 9,703,275 B2 | 7/2017 | Ersavas |
| 9,717,191 B2 | 8/2017 | Endrizzi |
| 9,740,177 B2 | 8/2017 | Feng |
| 9,747,538 B2 | 8/2017 | Gudan |
| 9,749,792 B2 | 8/2017 | Klicpera |
| 9,756,797 B2 | 9/2017 | Sarver |
| 9,762,406 B2 | 9/2017 | Davis |
| 9,763,396 B2 | 9/2017 | Endrizzi |
| 9,817,380 B2 | 11/2017 | Bangalore |
| 9,829,869 B2 * | 11/2017 | Ersavas ............... G05B 15/02 |
| 9,829,871 B1 | 11/2017 | Goodman |
| 9,883,641 B2 | 2/2018 | Thomas |
| 9,886,016 B2 | 2/2018 | Bermudez Rodriguez |
| 9,912,732 B2 | 3/2018 | Romney |
| 9,922,580 B2 | 3/2018 | Mathews |
| 9,924,644 B2 | 3/2018 | Endrizzi |
| 9,928,724 B2 | 3/2018 | Alcorn |
| 9,943,047 B2 | 4/2018 | Carlson |
| 9,986,696 B2 | 6/2018 | Halahan |
| 10,028,425 B2 | 7/2018 | Canyon |
| 10,028,454 B2 | 7/2018 | Williams |
| 10,029,265 B2 | 7/2018 | Bell |
| 10,073,428 B2 | 9/2018 | Bruhn |
| 10,104,836 B2 | 10/2018 | Jamison |
| 10,123,493 B2 | 11/2018 | Runge |
| 10,136,286 B2 | 11/2018 | Namgoong |
| 10,178,016 B1 | 1/2019 | Hall |
| 10,188,050 B2 | 1/2019 | Walker |
| 10,194,598 B2 | 2/2019 | Bauman |
| 10,228,711 B2 | 3/2019 | Woytowitz |
| 10,241,488 B2 | 3/2019 | Bermudez Rodriguez |
| 10,254,728 B2 | 4/2019 | Hill |
| 10,274,969 B2 | 4/2019 | Klein |
| 10,292,343 B2 | 5/2019 | Weiler |
| 10,327,397 B2 | 6/2019 | Olive-Chahinian |
| 2002/0002425 A1 | 1/2002 | Dossey |
| 2002/0010516 A1 | 1/2002 | Addink |
| 2002/0019725 A1 | 2/2002 | Petite |
| 2002/0130834 A1 | 9/2002 | Madarasz |
| 2003/0067889 A1 | 4/2003 | Petite |
| 2003/0093159 A1 | 5/2003 | Sieminski |
| 2003/0109964 A1 | 6/2003 | Addink |
| 2003/0120393 A1 | 6/2003 | Bailey |
| 2003/0135286 A1 | 7/2003 | Brundisini |
| 2003/0179102 A1 | 9/2003 | Barnes |
| 2003/0182022 A1 | 9/2003 | Addink |
| 2004/0003060 A1 | 1/2004 | Asoh |
| 2004/0013468 A1 | 1/2004 | Kadner |
| 2004/0015270 A1 | 1/2004 | Addink |
| 2004/0089164 A1 | 5/2004 | Addink |
| 2004/0100394 A1 | 5/2004 | Hitt |
| 2004/0181315 A1 | 9/2004 | Cardinal |
| 2004/0217847 A1 | 11/2004 | Fries |
| 2005/0038569 A1 | 2/2005 | Howard |
| 2005/0044372 A1 | 2/2005 | Aull |
| 2005/0187665 A1 | 8/2005 | Fu |
| 2005/0216129 A1 | 9/2005 | Clark |
| 2005/0216130 A1 | 9/2005 | Clark |
| 2005/0220050 A1 | 10/2005 | Uchida |
| 2006/0027677 A1 | 2/2006 | Abts |
| 2006/0043208 A1 | 3/2006 | Graham |
| 2006/0116791 A1 | 6/2006 | Ravula |
| 2006/0122735 A1 | 6/2006 | Goldberg |
| 2006/0161309 A1 | 7/2006 | Moore |
| 2006/0259199 A1 | 11/2006 | Gjerde |
| 2007/0016334 A1 | 1/2007 | Smith |
| 2007/0043454 A1 | 2/2007 | Sonnenberg |
| 2007/0179674 A1 | 8/2007 | Ensworth |
| 2007/0191991 A1 | 8/2007 | Addink |
| 2007/0268121 A1 | 11/2007 | Vasefi |
| 2007/0282486 A1 | 12/2007 | Walker |
| 2007/0289635 A1 | 12/2007 | Ghazarian |
| 2008/0027587 A1 | 1/2008 | Nickerson |
| 2008/0037485 A1 | 2/2008 | Osinga |
| 2008/0039978 A1 | 2/2008 | Graham |
| 2008/0058964 A1 | 3/2008 | Nickerson |
| 2008/0058995 A1 | 3/2008 | Holindrake |
| 2008/0119948 A1 | 5/2008 | O'Connor |
| 2008/0125917 A1 | 5/2008 | Walker |
| 2008/0125918 A1 | 5/2008 | Curren |
| 2008/0140262 A1 | 6/2008 | Williams |

(56) References Cited

U.S. PATENT DOCUMENTS

| | | |
|---|---|---|
| 2008/0147205 A1 | 6/2008 | Ollis |
| 2008/0157995 A1 | 7/2008 | Crist |
| 2008/0234870 A1 | 9/2008 | Chalemin |
| 2008/0251602 A1 | 10/2008 | Leggett |
| 2008/0275595 A1 | 11/2008 | Bailey |
| 2008/0287062 A1 | 11/2008 | Claus |
| 2009/0076659 A1 | 3/2009 | Ensworth |
| 2009/0076660 A1 | 3/2009 | Goldberg |
| 2009/0099701 A1 | 4/2009 | Li |
| 2009/0145974 A1 | 6/2009 | Fekete |
| 2009/0150000 A1 | 6/2009 | Stelford |
| 2009/0150001 A1 | 6/2009 | Fekete |
| 2009/0150002 A1 | 6/2009 | Fekete |
| 2009/0204265 A1 | 8/2009 | Hackett |
| 2009/0216345 A1 | 8/2009 | Christfort |
| 2009/0222141 A1 | 9/2009 | Ensworth |
| 2009/0271045 A1 | 10/2009 | Savelle |
| 2009/0276102 A1 | 11/2009 | Smith |
| 2009/0281672 A1 | 11/2009 | Pourzia |
| 2009/0292401 A1 | 11/2009 | Kah |
| 2009/0316671 A1 | 12/2009 | Rolf |
| 2009/0326723 A1 | 12/2009 | Moore |
| 2010/0023173 A1 | 1/2010 | Wu |
| 2010/0030389 A1 | 2/2010 | Palmer |
| 2010/0030476 A1 | 2/2010 | Woytowitz |
| 2010/0032493 A1 | 2/2010 | Abts |
| 2010/0032495 A1 | 2/2010 | Abts |
| 2010/0038440 A1 | 2/2010 | Ersavas |
| 2010/0062757 A1 | 3/2010 | Reina |
| 2010/0070097 A1 | 3/2010 | Morgenstern |
| 2010/0094472 A1 | 4/2010 | Woytowitz |
| 2010/0100247 A1 | 4/2010 | Nickerson |
| 2010/0129154 A1 | 5/2010 | Cox |
| 2010/0130188 A1 | 5/2010 | Brundisini |
| 2010/0145531 A1 | 6/2010 | Nickerson |
| 2010/0146491 A1 | 6/2010 | Hirano |
| 2010/0152909 A1 | 6/2010 | Hitt |
| 2010/0179701 A1 | 7/2010 | Gilbert |
| 2010/0198418 A1 | 8/2010 | Williams |
| 2010/0200674 A1 | 8/2010 | Everett |
| 2010/0222932 A1 | 9/2010 | O'Connor |
| 2010/0241279 A1 | 9/2010 | Samon i Castella |
| 2010/0256827 A1 | 10/2010 | Bragg |
| 2010/0265909 A1 | 10/2010 | Petite |
| 2010/0268391 A1 | 10/2010 | Anderson |
| 2010/0274398 A1 | 10/2010 | Choat |
| 2010/0286833 A1 | 11/2010 | Kaprielian |
| 2010/0305764 A1 | 12/2010 | Carr |
| 2010/0305765 A1 | 12/2010 | Sutardja |
| 2010/0306012 A1 | 12/2010 | Zyskowski |
| 2010/0312881 A1 | 12/2010 | Davis |
| 2010/0324744 A1 | 12/2010 | Cox |
| 2010/0325569 A1 | 12/2010 | King |
| 2011/0015802 A1 | 1/2011 | Imes |
| 2011/0017845 A1 | 1/2011 | Crist |
| 2011/0035059 A1 | 2/2011 | Ersavas |
| 2011/0035064 A1 | 2/2011 | Kah |
| 2011/0040415 A1 | 2/2011 | Nickerson |
| 2011/0040416 A1 | 2/2011 | Nickerson |
| 2011/0045761 A1 | 2/2011 | Rolf |
| 2011/0046792 A1 | 2/2011 | Imes |
| 2011/0046798 A1 | 2/2011 | Imes |
| 2011/0046799 A1 | 2/2011 | Imes |
| 2011/0046800 A1 | 2/2011 | Imes |
| 2011/0049260 A1 | 3/2011 | Palmer |
| 2011/0093123 A1 | 4/2011 | Alexanian |
| 2011/0097534 A1 | 4/2011 | Lee |
| 2011/0098351 A1 | 4/2011 | Mioskoski |
| 2011/0106320 A1 | 5/2011 | Hall |
| 2011/0118857 A1 | 5/2011 | Bodnar |
| 2011/0137472 A1 | 6/2011 | Hitt |
| 2011/0137827 A1 | 6/2011 | Mason |
| 2011/0166715 A1 | 7/2011 | Hoffman |
| 2011/0170239 A1 | 7/2011 | Nelson |
| 2011/0190947 A1 | 8/2011 | Savelle |
| 2011/0190948 A1 | 8/2011 | Fekete |
| 2011/0196541 A1 | 8/2011 | Bauman |
| 2011/0202185 A1 | 8/2011 | Imes |
| 2011/0210049 A1 | 9/2011 | O'Regan |
| 2011/0224838 A1 | 9/2011 | Imes |
| 2011/0238228 A1 | 9/2011 | Woytowitz |
| 2011/0238229 A1 | 9/2011 | Woytowitz |
| 2011/0246898 A1 | 10/2011 | Imes |
| 2011/0270448 A1 | 11/2011 | Kantor |
| 2011/0270449 A1 | 11/2011 | Nickerson |
| 2011/0288690 A1 | 11/2011 | Ensworth |
| 2011/0301767 A1 | 12/2011 | Alexanian |
| 2011/0307101 A1 | 12/2011 | Imes |
| 2011/0310929 A1 | 12/2011 | Petite |
| 2011/0320050 A1 | 12/2011 | Petite |
| 2012/0023225 A1 | 1/2012 | Imes |
| 2012/0029709 A1 | 2/2012 | Safreno |
| 2012/0035898 A1 | 2/2012 | Repelli |
| 2012/0037725 A1 | 2/2012 | Verfuerth |
| 2012/0046859 A1 | 2/2012 | Imes |
| 2012/0064923 A1 | 3/2012 | Imes |
| 2012/0072033 A1 | 3/2012 | Imes |
| 2012/0072036 A1 | 3/2012 | Piper |
| 2012/0072037 A1 | 3/2012 | Alexanian |
| 2012/0078425 A1 | 3/2012 | Gardenswartz |
| 2012/0089259 A1 | 4/2012 | Williams |
| 2012/0092154 A1 | 4/2012 | Petite |
| 2012/0095604 A1 | 4/2012 | Alexanian |
| 2012/0101637 A1 | 4/2012 | Imes |
| 2012/0109387 A1 | 5/2012 | Martin |
| 2012/0123817 A1 | 5/2012 | Hohenberger |
| 2012/0135759 A1 | 5/2012 | Imes |
| 2012/0175425 A1 | 7/2012 | Evers |
| 2012/0203383 A1 | 8/2012 | Holindrake |
| 2012/0215366 A1 | 8/2012 | Redmond |
| 2012/0215725 A1 | 8/2012 | Imes |
| 2012/0216881 A1 | 8/2012 | Donoghue |
| 2012/0232708 A1 | 9/2012 | Ensworth |
| 2012/0239211 A1 | 9/2012 | Walker |
| 2012/0239807 A1 | 9/2012 | Davis |
| 2012/0253529 A1 | 10/2012 | Carlson |
| 2012/0254784 A1 | 10/2012 | Vander Griend |
| 2012/0259473 A1 | 10/2012 | Nickerson |
| 2012/0290140 A1 | 11/2012 | Groeneveld |
| 2012/0303168 A1 | 11/2012 | Halahan |
| 2012/0303768 A1 | 11/2012 | Fiennes |
| 2013/0131874 A1 | 5/2013 | Shupe |
| 2014/0039697 A1* | 2/2014 | Weiler .................. H04L 63/102 700/284 |
| 2014/0129039 A1 | 5/2014 | Olive-Chahinian |
| 2014/0172121 A1 | 6/2014 | Li |
| 2014/0354427 A1 | 12/2014 | Rapaport |
| 2014/0370879 A1 | 12/2014 | Redding |
| 2015/0032274 A1 | 1/2015 | Runge |
| 2015/0097663 A1 | 4/2015 | Sloo |
| 2015/0167861 A1* | 6/2015 | Ferrer Herrera .... F16K 37/0041 239/73 |
| 2015/0230418 A1 | 8/2015 | Woytowitz |
| 2015/0268670 A1 | 9/2015 | Nies |
| 2015/0309496 A1 | 10/2015 | Kah, III |
| 2016/0048135 A1 | 2/2016 | Hill |
| 2016/0100533 A1 | 4/2016 | Bauman |
| 2016/0164575 A1 | 6/2016 | Smith |
| 2016/0171374 A1* | 6/2016 | Kim .......................... G06N 5/04 706/46 |
| 2016/0175858 A1 | 6/2016 | Bell |
| 2016/0198645 A1* | 7/2016 | Weatherill ............. A01G 25/16 700/284 |
| 2016/0202679 A1 | 7/2016 | Bermudez Rodriguez |
| 2016/0255763 A1 | 9/2016 | Canyon |
| 2016/0259309 A1 | 9/2016 | Bangalore |
| 2016/0349765 A1 | 12/2016 | Woytowitz |
| 2016/0371961 A1* | 12/2016 | Narang ................. H04W 8/005 |
| 2017/0006149 A1 | 1/2017 | Namgoong |
| 2017/0006787 A1 | 1/2017 | Weiler |
| 2017/0020089 A1 | 1/2017 | Endrizzi |
| 2017/0052522 A1* | 2/2017 | Klein ...................... H04L 63/20 |
| 2017/0055433 A1 | 3/2017 | Jamison |
| 2017/0105369 A1 | 4/2017 | Shamley |

(56) References Cited

U.S. PATENT DOCUMENTS

| | | |
|---|---|---|
| 2017/0112079 A1 | 4/2017 | Eyring |
| 2017/0118930 A1 | 5/2017 | Bangalore |
| 2017/0147011 A1 | 5/2017 | Klein |
| 2017/0156274 A1 | 6/2017 | Carlson |
| 2017/0170979 A1 | 6/2017 | Khalid |
| 2017/0172078 A1 | 6/2017 | Gonzalez Hernandez |
| 2017/0191695 A1 | 7/2017 | Bruhn |
| 2017/0273258 A1 | 9/2017 | Itzhaky |
| 2017/0273259 A1 | 9/2017 | Eng |
| 2017/0318761 A1 | 11/2017 | Rainone |
| 2017/0322527 A1 | 11/2017 | Ersavas |
| 2017/0322567 A1 | 11/2017 | Klein |
| 2017/0357230 A1 | 12/2017 | Bermudez Rodriguez |
| 2017/0359976 A1 | 12/2017 | Klein |
| 2017/0366596 A1 | 12/2017 | Han |
| 2018/0014480 A1 | 1/2018 | Montgomery |
| 2018/0039243 A1 | 2/2018 | Bangalore |
| 2018/0042188 A1 | 2/2018 | Khabbaz |
| 2018/0042189 A1 | 2/2018 | Klein |
| 2018/0084741 A1 | 3/2018 | Gilliam |
| 2018/0132422 A1 | 5/2018 | Hassanzadeh |
| 2018/0139912 A1 | 5/2018 | Halahan |
| 2018/0184600 A1 | 7/2018 | Charling |
| 2018/0191564 A1 | 7/2018 | Hall |
| 2018/0278581 A1 | 9/2018 | Dyer |
| 2018/0295797 A1 | 10/2018 | Klein |
| 2018/0317407 A1 | 11/2018 | Williams |
| 2019/0035071 A1 | 1/2019 | Klein |
| 2019/0104696 A1 | 4/2019 | Fischman |
| 2019/0261584 A1 | 8/2019 | Olive-Chahinian |
| 2019/0261585 A1 | 8/2019 | Weiler |

FOREIGN PATENT DOCUMENTS

| | | |
|---|---|---|
| WO | 2007050175 | 5/2007 |
| WO | 2008068699 | 6/2008 |

OTHER PUBLICATIONS

U.S. Appl. No. 16/405,762, filed May 7, 2019, Olive-Chahinian Ingrid.

U.S. Appl. No. 16/408,066, filed May 9, 2019, Weiler Steven W.

Mayer, Peter, et al.; "Evaluation of California weather-based "smart" irrigation controller programs"; Aquacraft, Inc., Water Engineering and Management, and National Research Center, Inc.; Jul. 1, 2009; pp. 1-309.

Quicksmart Development; Networked & Wireless Automated Control Systems; EtherRain Networked Sprinkler Controllers; 2012; 4 Pages.

Rain Bird; "Catalog: TBOS Field Transmitter"; published at http://web.archive.org/web/20111218221822/http://rainbird.com/documents/parts/part_TBOS.pdf; Sep. 8, 2011; pp. 1-2; Rain Bird Corporation, Azusa, CA.

Rain Bird; "Manual: TBOS Field Transmitter"; published at http://web.archive.org/web/20111218215847/http://rainbird.com/documents/turf/man_TBOS_FT.pdf; Sep. 8, 2011; pp. 1-30; Rain Bird Corporation, Azusa, CA.

Rain Bird; "Manual: TBOS One, Two, Four and Six Station Control Module"; published at http://web.archive.org/web/20110904171326/http://www.rainbird.com/documents/turf/man_TBOS.pdf; Sep. 8, 2011; pp. 1-20; Rain Bird Corporation, Azusa, CA.

Rain Bird; "Rain Bird TBOS Three-Program Battery-Operated Controller"; published at http://web.archive.org/web/20110908065404/http://www.rainbird.com/landscape/products/controllers/TBOScontroller.htm; Sep. 8, 2011; pp. 1-3; Rain Bird Corporation, Azusa, CA.

Rain Bird; "Tech Specs: TBOS"; published at http://web.archive.org/web/20110812073350/http://www.rainbird.com/documents/turf/ts_TBOS.pdf; Sep. 8, 2011; pp. 1-2; Rain Bird Corporation, Azusa, CA.

Regaber; Skygreen: GPRS/Radio Centralised Irrigation System; published at http://web.archive.org/web/20120526052826/http://www.regaber.com/webregaber/bd/descargas/AP_P0_06_SKgreen.pdf; May 26, 2012; pp. 1-6; Regaber Automatismos y servicios.

Sandu, F., et al.; "Remote and mobile control in donnotics"; IEEE; Optimization of Electrical and Electronic Equipment, 2008. OPTIM 2008. 11th International Conference on Optimization of Electrical and Electronic Equipment; May 22-24, 2018; pp. 1-6.

Souza, Christine; "Irrigation technology: Smart water solutions for state's farmers"; AgAlert; Jul. 9, 2008; pp. 1-6.

* cited by examiner

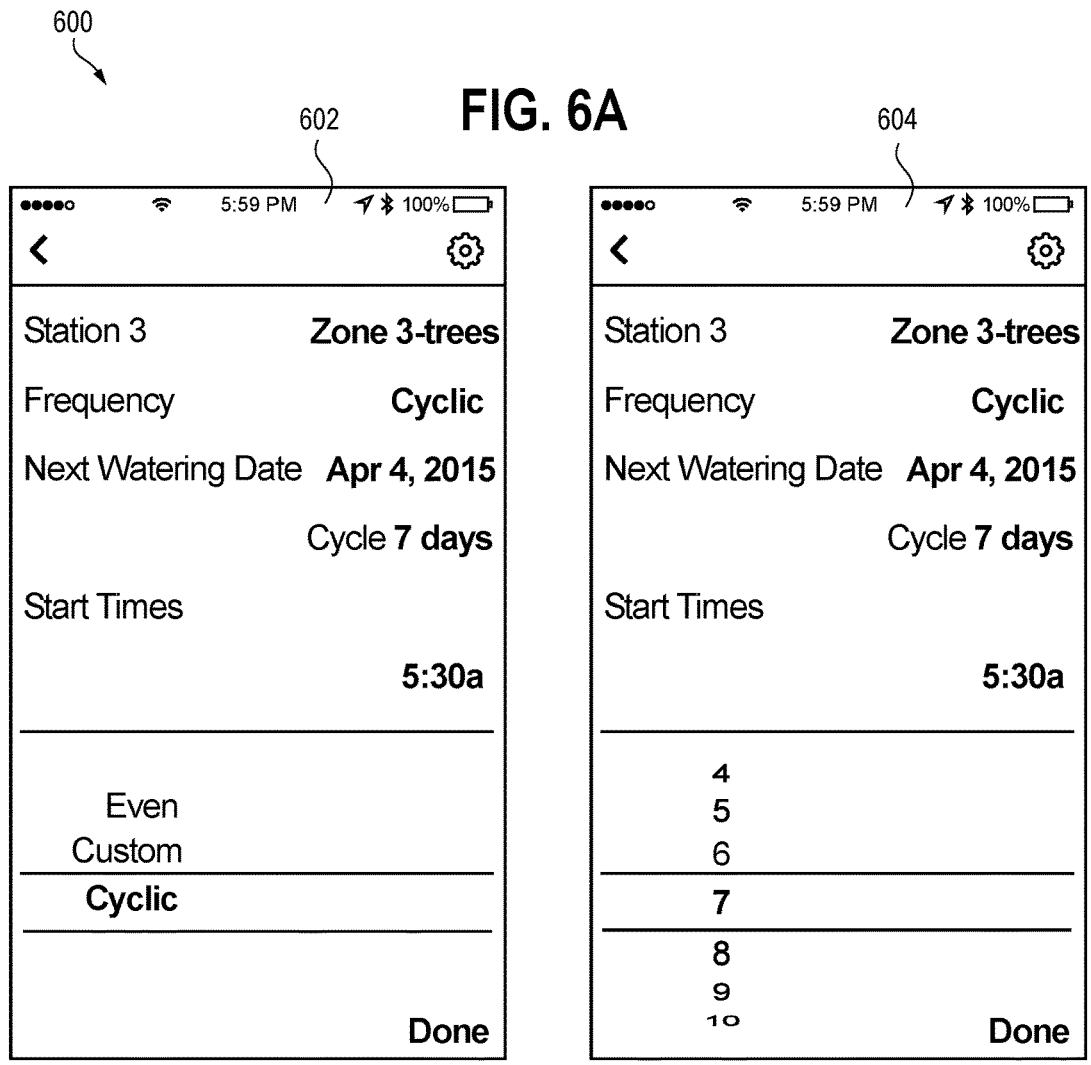

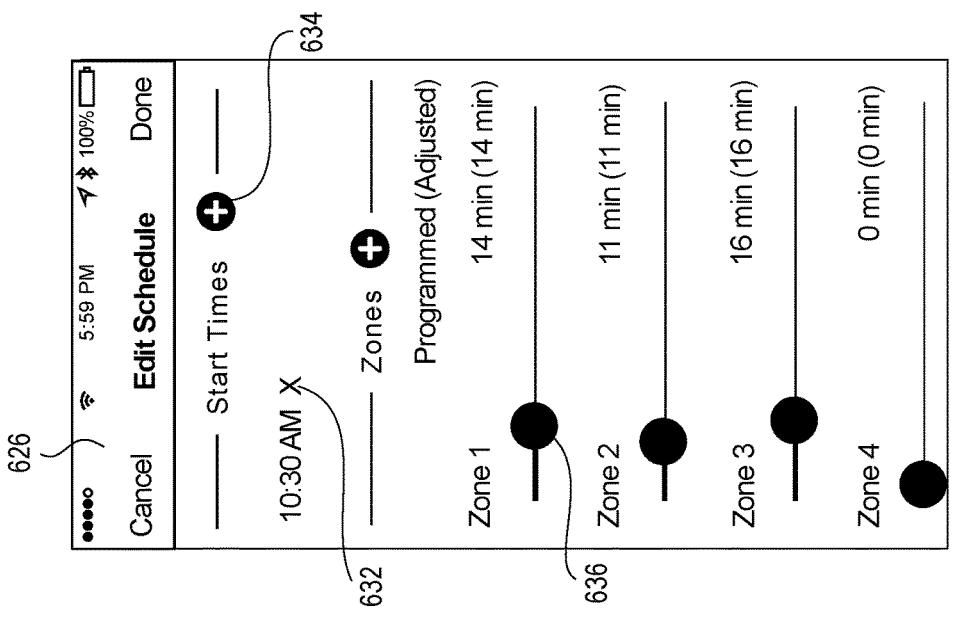
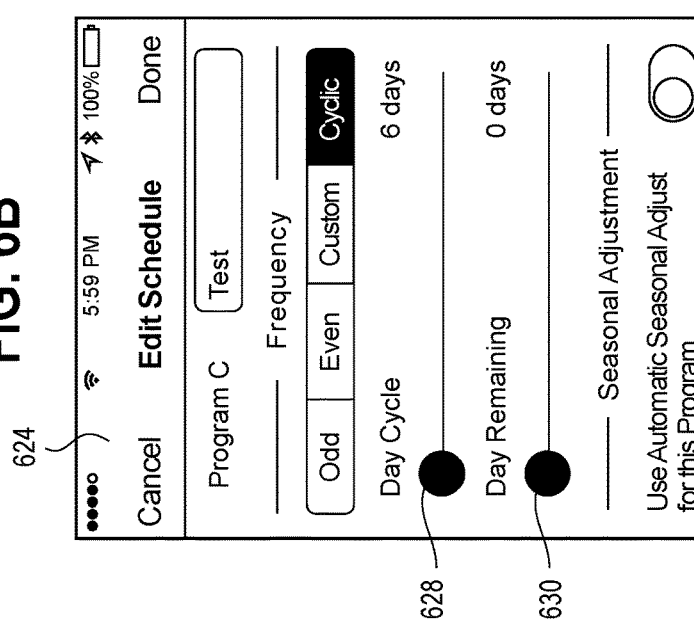
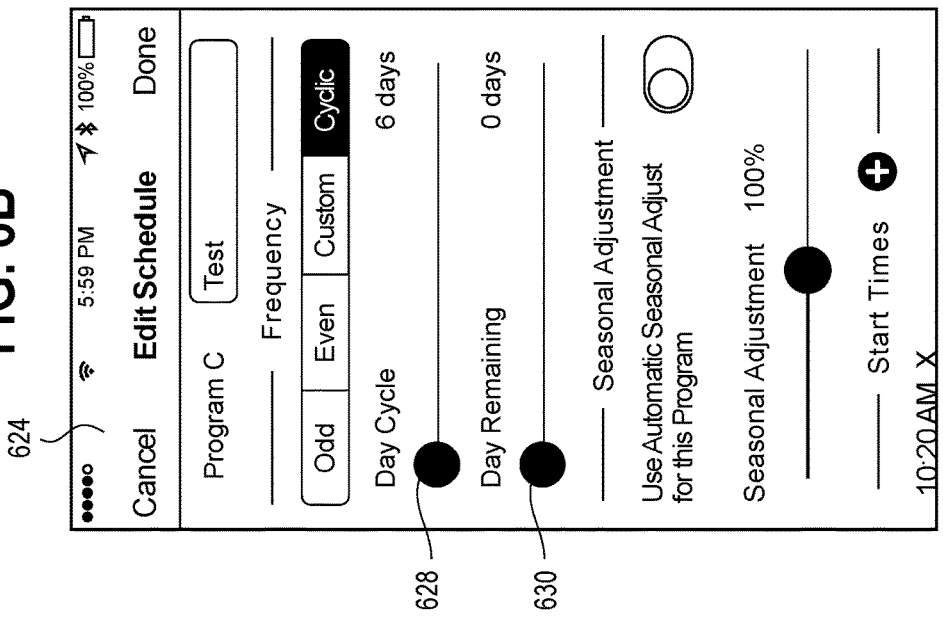
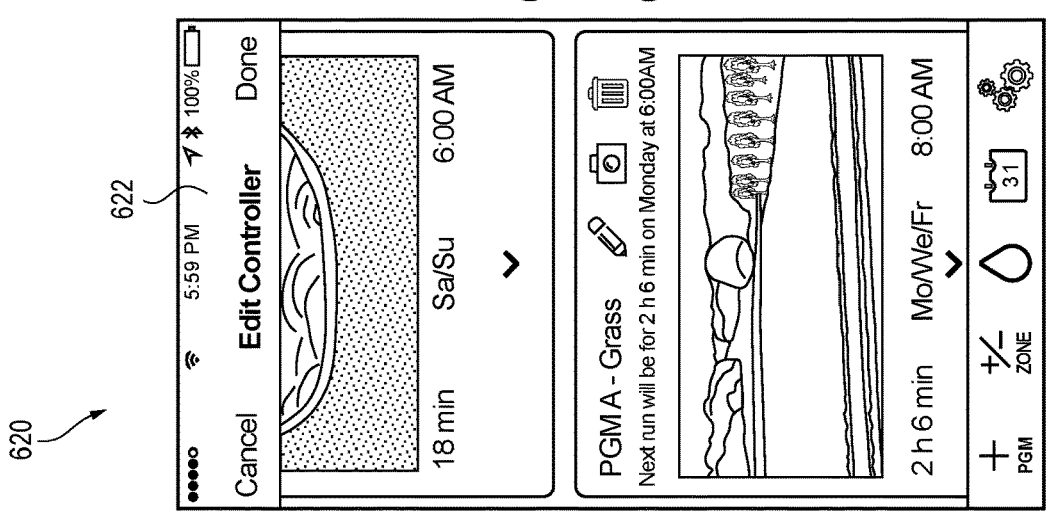
FIG. 6B

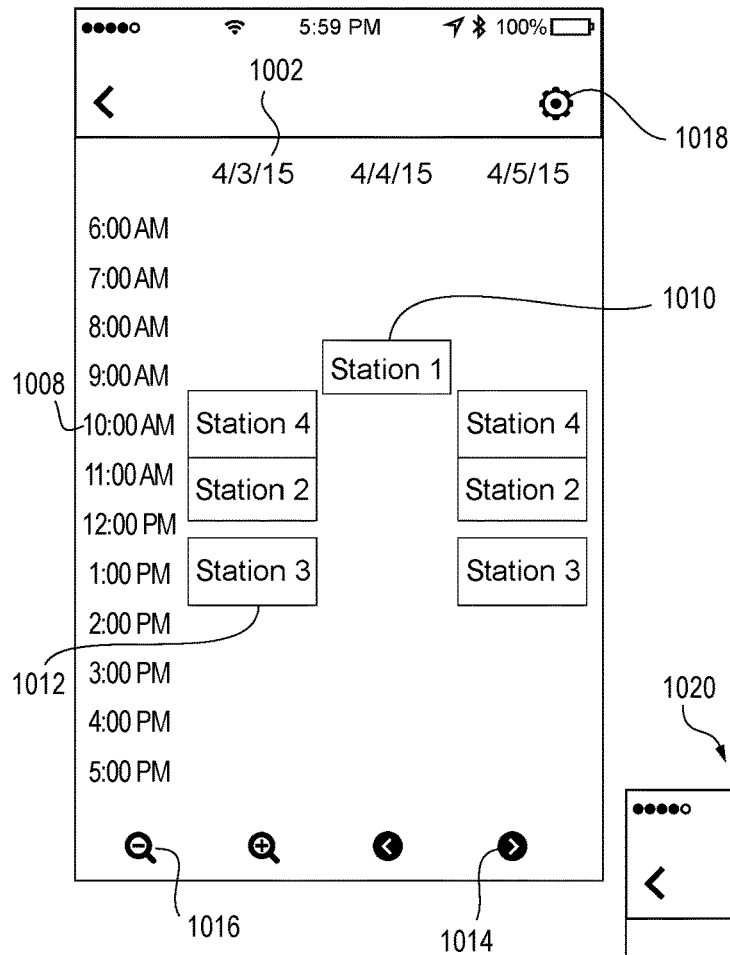
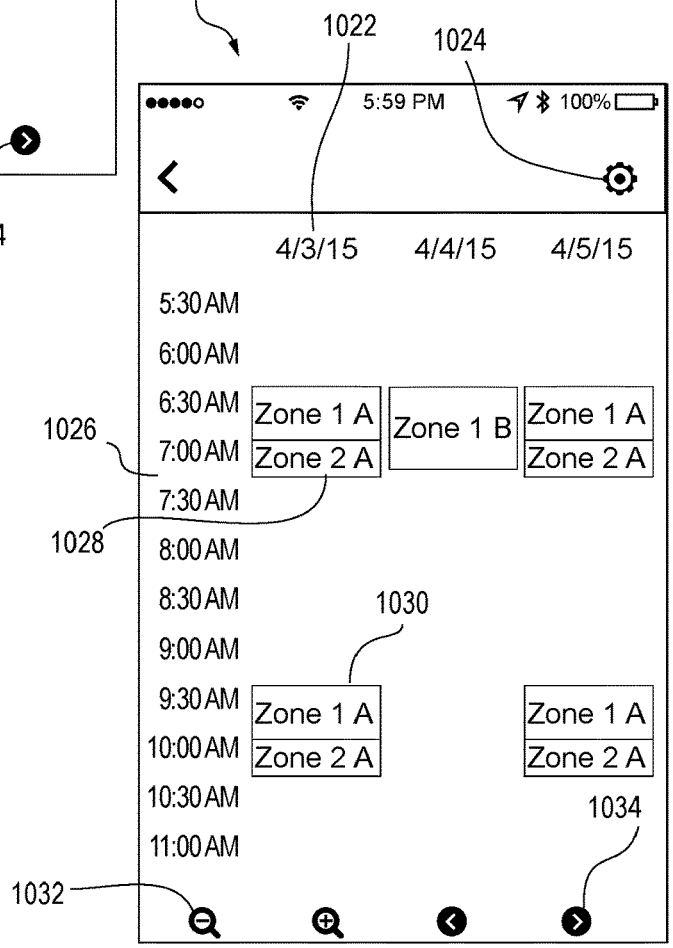

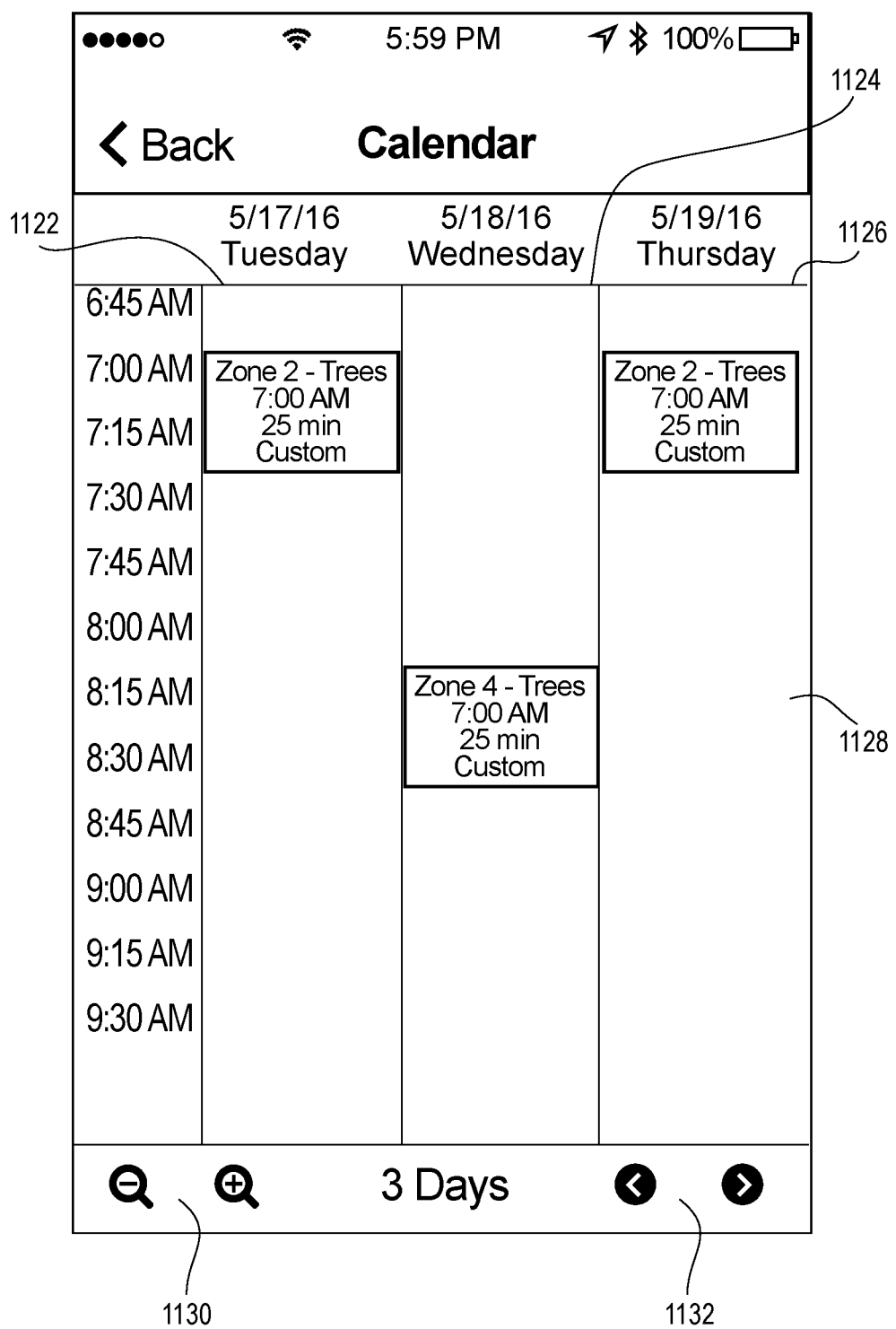

FIG. 17

| | | Zones | | Done |
|---|---|---|---|---|
| Cancel | | | | |

Wired/Not Wired

| # | Zone | Toggle |
|---|---|---|
| 1 | Zone 1 — 1702 | 1706 ● (on) |
| 2 | Zone 2 | ○ |
| 3 | Zone 3 — 1710 | ● |
| 4 | Zone 4 | ○ |
| 5 | Zone 5 — 1712 | ● |
| 6 | Zone 6 — 1714 | ● |
| 7 | Zone 7 — 1716 | ● |
| 8 | Zone 8 | ○ |
| 9 | Zone 9 | ○ |
| 10 | Zone 10 | ○ |
| 11 | Zone 11 | ○ |
| 12 | Zone 12 | ○ |
| 13 | Zone 13 | ○ |
| 14 | Zone 14 | ○ |
| 15 | Zone 15 | ○ |
| 16 | Zone 16 | ○ |

1700, 1718, 1720

US 10,609,878 B2

WIRELESS REMOTE IRRIGATION CONTROL

RELATED APPLICATION(S)

This application claims the benefit of U.S. Provisional Application No. 62/363,170, filed Jul. 15, 2016, entitled WIRELESS REMOTE IRRIGATION CONTROL, which is incorporated in its entirety by reference.

FIELD OF THE INVENTION

This invention relates generally to irrigation systems and, more particularly, to irrigation controllers.

BACKGROUND OF THE INVENTION

Irrigation controllers cooperate with valves on a property to irrigate the property. Some irrigation controllers allow a user to define a schedule that the irrigation controller implements to control the valves. Typically, the user interacts with the irrigation controller through a control panel located on the irrigation controller. The control panel usually includes one or more buttons, dials, switches, displays, and lights which allow the user to define an irrigation schedule. Consequently, the user needs to be present to interact with the irrigation controller (i.e., manipulate the buttons, dials, switches, etc. included in the control panel). Requiring a user to be present at an irrigation controller can be difficult and inconvenient for a user.

BRIEF DESCRIPTION OF THE DRAWINGS

Embodiments of the invention are illustrated in the figures of the accompanying drawings in which:

FIG. 6B depicts a second embodiment of a GUI 620 in a programming mode, according to some embodiments.

FIG. 8 depicts a GUI 800 in a zone control mode, according to some embodiments.

FIG. 9A depicts a GUI 900 in a programming mode, according to some embodiments.

FIG. 10A depicts a first embodiment of a GUI 1000, according to some embodiments.

FIG. 10B depicts a second embodiment of a GUI 1020, according to some embodiments.

FIG. 11B depicts a GUI 1120 depicting a schedule in a three-day view, according to some embodiments.

FIGS. 17-18 depict enabling and disabling zones of an irrigation system via a GUI, according to some embodiments.

DETAILED DESCRIPTION

Introduction

As previously discussed, a user must be present at a typical irrigation controller to set an irrigation schedule or otherwise interact with the irrigation controller. Such a requirement can be difficult and burdensome for the user. Embodiments of the systems, methods, and apparatuses described herein allow a user to interact with an irrigation controller remotely. For example, embodiments may allow a user to interact with the irrigation controller via a mobile device (e.g., a smart phone, tablet computer, personal digital assistant, etc.). In some embodiments, a wireless adapter is coupled to the irrigation controller and allows the mobile device to communicate with the irrigation controller via the wireless adapter. The wireless adapter allows irrigation controllers that are otherwise unable to communicate with a mobile device to perform such communications. Additionally, in some embodiments, the wireless adapter can provide additional functionality to irrigation controllers that have the ability to communicate with a mobile device.

Figure 1:
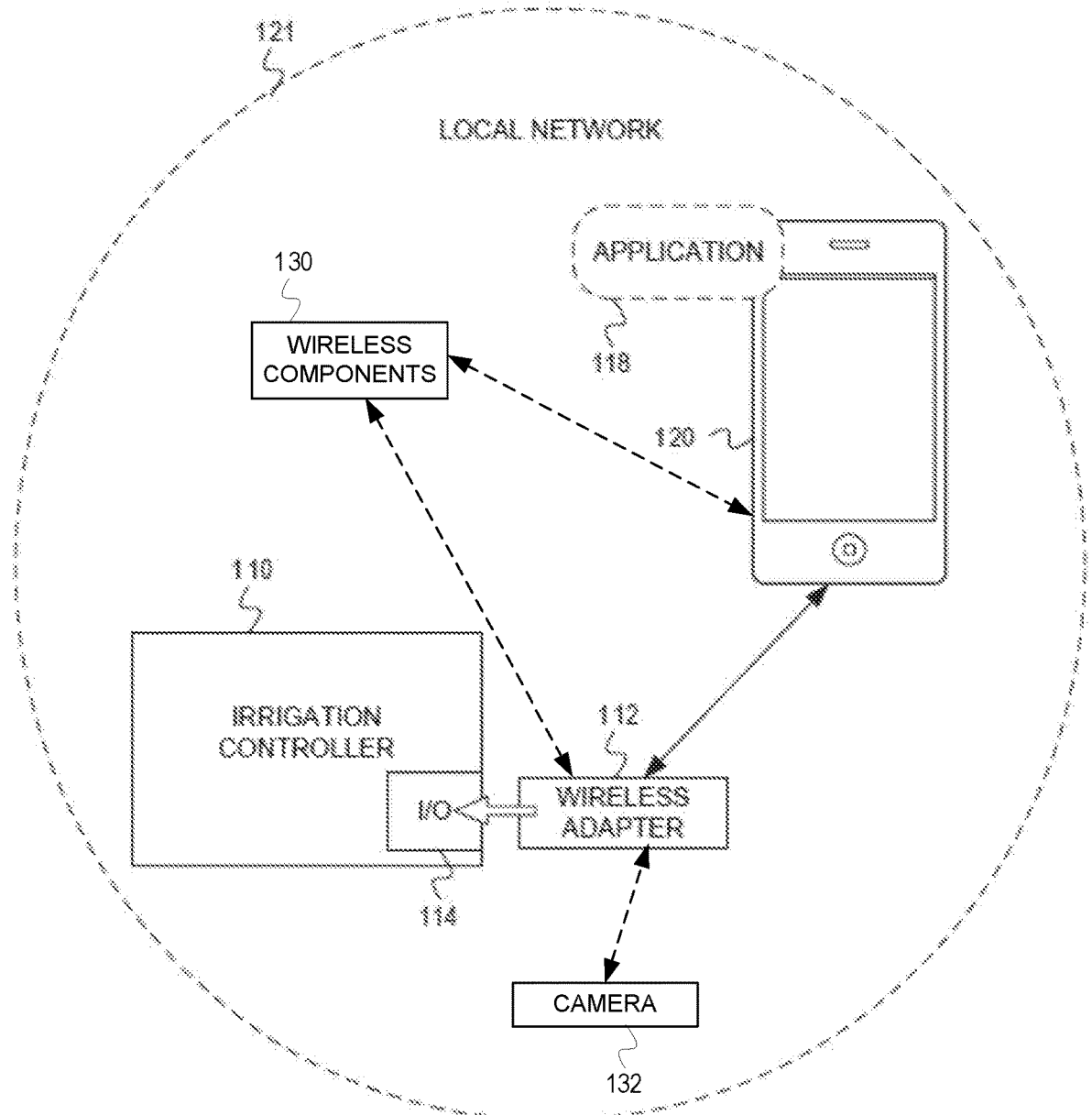
FIG. 1 depicts a mobile device 120 communicating directly with a wireless adapter 112, according to some embodiments.
Figure 2:
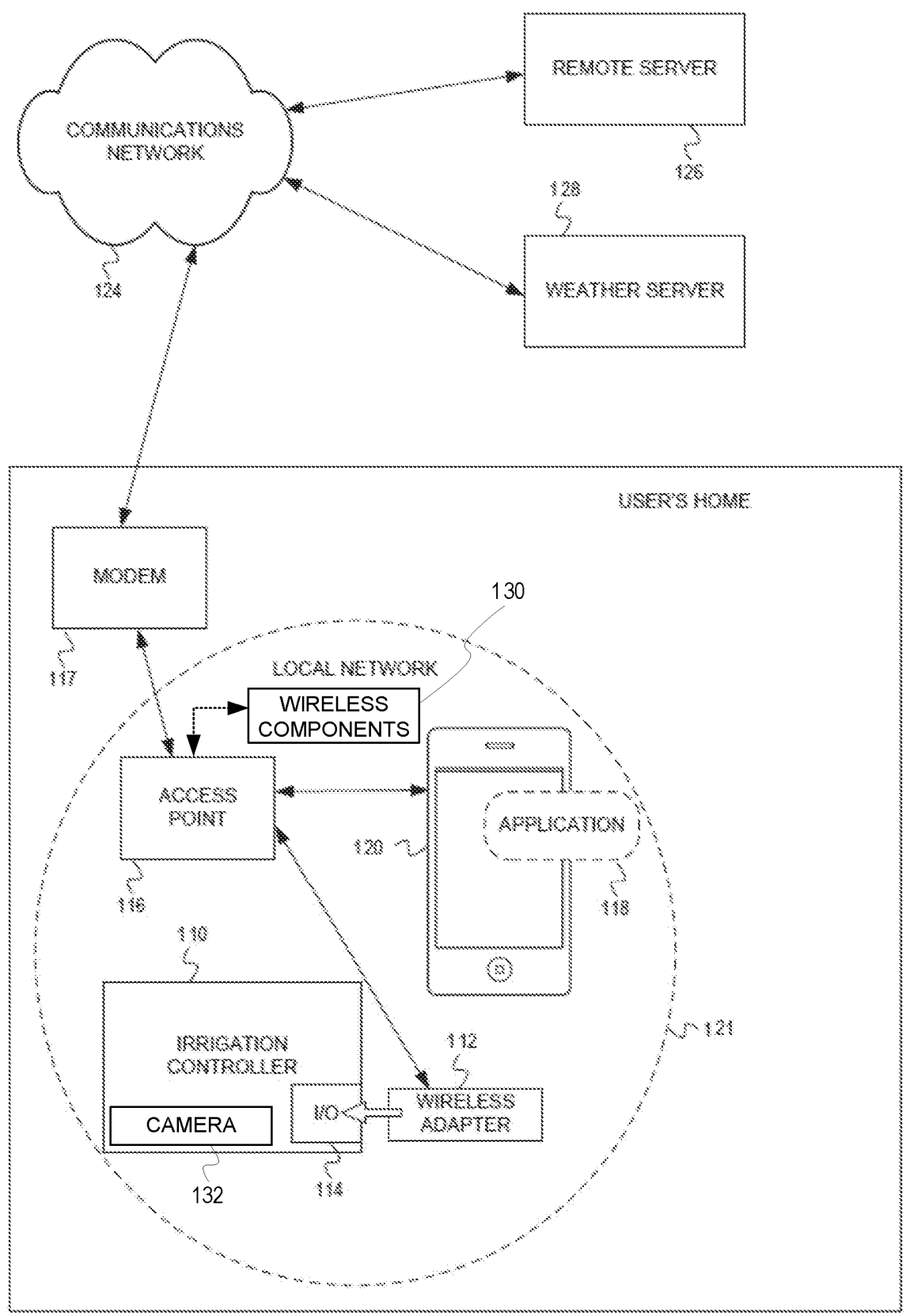
FIG. 2 depicts a mobile device 120 communicating with a wireless adapter 112 via an access point 116, according to some embodiments.
Figure 3:
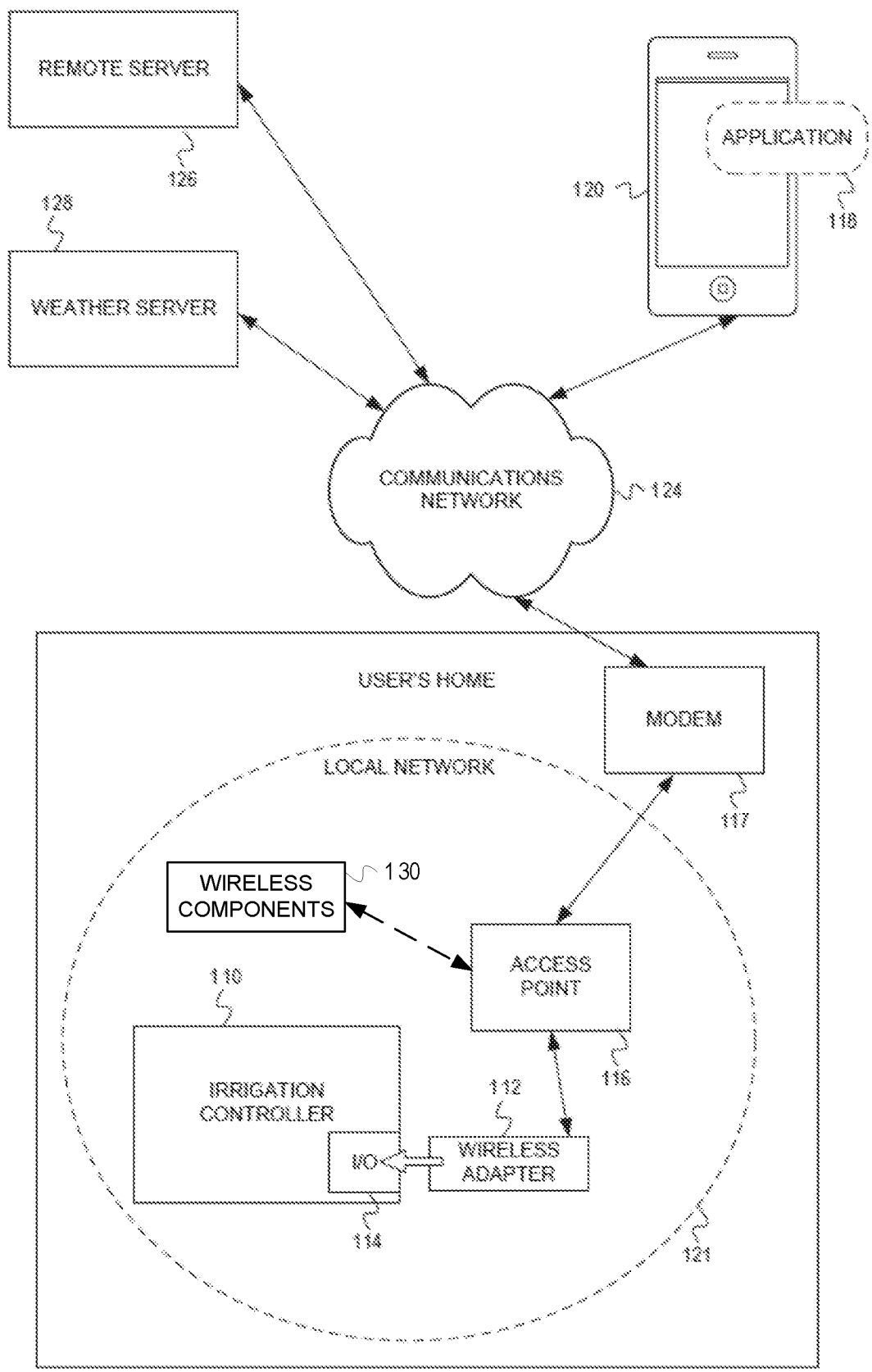
FIG. 3 depicts a mobile device 120 communicating with a wireless adapter 112 via a remote server 126, according to some embodiments.

FIGS. 1-3 and the related text provide general information regarding a system that allows communication between a mobile device and an irrigation controller, e.g., through the use of a wireless adapter coupled to the irrigation controller. FIGS. 1-3 depict a variety of communication channels between a mobile device and an irrigation controller.

General

FIG. 1 depicts a mobile device 120 communicating directly with a wireless adapter 112, according to some embodiments. The system depicted in FIG. 1 includes the mobile device 120, the wireless adapter 112, and an irrigation controller 110. The wireless adapter 112 connects to an input/output port 114 of the irrigation controller 110. In some embodiments, the irrigation controller 110 can also include a camera 132 (or other image capture device). The mobile device 120 connects directly to, and communicates directly with, the wireless adapter 112. For example, in some embodiments, the wireless adapter 112 can create a local network 121 (e.g., a network which conforms to the 802.11 standards). The mobile device 120 can communicate with the wireless adapter 112 via the local network 121. The mobile device 120 can include an application 118 which allows the user to interact with the irrigation controller 110 via the wireless adapter 112. For example, the user can define and/or adjust an irrigation schedule, set parameters, send commands to the irrigation controller, receive information from the irrigation controller 110, and/or take other actions. Although not depicted in FIG. 1, the wireless adapter 112 can communicate with remote servers and other computing devices via a communications network such as the Internet. Additionally, in some embodiments, the mobile device 120 can communicate with other wireless components 130 configured to use the same or compatible wireless communication protocol as used by the mobile device. The other wireless components, for example, can include devices that are components of an irrigation system (e.g., valves, flow meters, regulators, sprinkler heads, etc.) as well as devices that are part of other systems, such as home security systems (e.g., image sensors, sound sensors, motion sensors, light sensors, control panels, etc.), home theatre systems, home automation systems, cameras 132 and the like. In some embodiments, the mobile device 120 communicates with the wireless components via the local network 121 created by the wireless adapter 112. That is, the wireless adapter 112 relays communications from/to the mobile device 120 to/from the wireless components 130. Alternatively, or additionally, the mobile device 120 can communicate directly with the wireless components 130. The mobile device 120 communicates with the wireless components 130 to receive information from, and transmit commands to, the wireless components 130. For example, the application 118 can present information about a home theatre system on the mobile device 120, as well as receive commands via the mobile device and transmit those commands to the home theater system.

In some embodiments, the wireless adapter 112 can be completely configured while communicating directly with the mobile device 120. For example, the user can configure all parameters and all settings of the wireless adapter 112 (i.e., not only an initial setup of the wireless adapter 112, but also perform all other functions described herein, such as configuring irrigation programs) while communicating directly between the mobile device 120 and the wireless adapter 112. During configuration, the mobile device 120 can provide the wireless adapter 112 with user information which can include a user-defined password. The wireless adapter 112 may later require communications transmitted to the wireless adapter 112 to include the password. The mobile device 120 can also provide network information (for later communication via a network, such as a local area network) to the wireless adapter 112. For example, if communicating according to a Wi-Fi standard, the mobile device 120 can provide the wireless adapter 112 with a service set identifier (SSID) and key associated with an access point. Once connected to the access point, the wireless adapter 112 is addressable from remote locations. Configuring the wireless adapter 112 and the mobile device 120 while the mobile device 120 is communicating directly with the wireless adapter 112 is advantageous because configuration requires only two devices (i.e., the mobile device 120 and the wireless adapter 112). Consequently, the wireless adapter 112 does not need to communicate with, or pass information to, any remote servers to configure and use the wireless adapter 112. In some embodiments, the wireless adapter 112 does not need to communicate with, or pass information to, any remote components because the system is not account-based. That is, the user does not need to login with an account via a remote server to access the wireless adapter 112 from the mobile device 120. Additionally, in some embodiments, the wireless adapter 112 can authenticate with the irrigation controller 110. In one form however, the wireless adapter 112 and the mobile device 120 can be configured when the mobile device 120 is not communicating directly with the wireless adapter 112 (as described with reference to FIGS. 2 and 3).

In some embodiments, the wireless adapter 112 can also transmit information directly to the mobile device 120. For example, the wireless adapter 112 can transmit notifications, alerts, and other data directly to the mobile device 120. As one example, the wireless adapter 112 can push a notification to the mobile device 120 indicating that the irrigation controller 110 had lost power. When the irrigation controller 110 reboots, the wireless adapter 112 and/or controller may not be aware of how long power was lost (i.e., may not know the current time). The wireless adapter 112 can push a notification to the mobile device 120 alerting the user that the wireless adapter 112 and/or irrigation controller 110 rebooted and/or request the current time from the mobile device 120. In some embodiments, the wireless adapter 112 can perform similar operations as those discussed above while not communicating directly with the mobile device 120 (as described with reference to FIGS. 2 and 3). It is understood that any number of notifications may be provided from the wireless adapter to the wireless device, e.g., notifications indicating any status changes, or when a user manually places the wireless adapter into direct communication mode (e.g., by pressing an input button on the wireless adapter). For example, see FIG. 30 for several illustrated notification examples.

In some embodiments, when the mobile device 120 communicates directly with the wireless adapter 112, the mobile device 120 does not transmit the password in the communications. For example, the mobile device 120 may only transmit the password to the wireless adapter 112 in communications that are relayed through other devices (e.g., access points, as described with reference to FIG. 2 and remote servers, as described with reference to FIG. 3). In such embodiments, if the user forgets the password or the password is lost, the user can recover (or change) the password by communicating directly with the wireless adapter 112 via the mobile device 120.

In some embodiments, after the user configures the wireless adapter 112, the user receives a welcome notification. As on example, the application 118 can cause a welcome email to be sent to the user. The welcome notification can include instructions and information about the wireless adapter 112, the irrigation controller 110, and/or the application 118.

While the mobile device depicted in FIG. 1 communicates with the wireless adapter directly, the mobile device of FIG. 2 communicates with the wireless adapter indirectly via an access point.

FIG. 2 depicts a mobile device 120 communicating with a wireless adapter 112 via an access point 116, according to some embodiments. The system depicted in FIG. 2 includes the mobile device 120, the wireless adapter 112, the access point 116, wireless components 130, a modem 117, a communications network 124, a remote server 126, and a weather server 128. The mobile device 120 communicates with the wireless adapter 112 indirectly. As depicted in FIG. 2, the mobile device 120 communicates with the access point 116. The access point 116 transmits messages to the wireless adapter 112 based on the communications between the mobile device 120 and the access point 116. In one embodiment, the access point 116 is a router and the access point 116 creates a local network 121 (i.e., a wired and/or wireless local area network ("LAN")). In such embodiments, the mobile device 120 and the wireless adapter 112 communicate with the access point 116 via the local network 121. This method of communication is useful where an internet connection is not required for the mobile device 120 to communicate with the wireless adapter 112, for example, if an internet connection to a server has failed or not available.

The access point accesses a wide area network ("WAN") (e.g., the Internet) via the modem 117 and communications network 124. The WAN can include the remote server 126 and the weather server 128. In some embodiments, the remote server 126 can obtain weather data from a weather server 128, determine schedule adjustments based on weather data, and send a weather adjustment factor and/or percentage adjustment to the wireless adapter 112. The wireless adapter 112 receives the weather adjustment factor and/or percentage adjustment from the remote server 126 (via the communications network 124, the modem 117, and the access point 116) and transmits the weather adjustment factor and/or percentage adjustment to the irrigation controller 110. In some embodiments, the irrigation controller 110 adjusts scheduled run times based on the weather adjustment factor and/or percentage adjustment.

When the mobile device 120 communicates with the wireless adapter 112 indirectly (e.g., via an access point or remote server), the mobile device 120 transmits the password with the communication. The wireless adapter 112 stored the password during configuration. If the password transmitted in the communication from the mobile device 120 does not match the password stored at the wireless adapter 112, the wireless adapter 112 ignores the communication.

While the mobile device of FIG. 2 communicates with the wireless adapter indirectly via an access point, the mobile device of FIG. 3 communicates with the wireless adapter indirectly via a remote server. The description of FIG. 3 will also discuss some functionality and features of both the remote server and the application running on the mobile device. Although the discussion of this functionality and features is presented with the discussion of FIG. 3, this functionality and the features apply to the communication scenarios described with respect to both FIGS. 1 and 2 as well.

FIG. 3 depicts a mobile device 120 communicating with a wireless adapter 112 via a remote server 126, according to some embodiments. The system depicted in FIG. 3 includes an irrigation controller 110, the wireless adapter 112, an access point 116, wireless components 130, a modem 117, a communications network 124, a weather server 128, the remote server 126, and the mobile device 120. When the mobile device 120 is not connected to the same local network as the wireless adapter 112, the mobile device 120 transmits commands and requests to the remote server 126. This method of communication is useful in that the mobile device 120 can communicate with the wireless adapter 112 anywhere in the world so long as the mobile device 120 and the wireless adapter 112 have access to the Internet. The remote server 126 relays these commands and requests to the wireless adapter 112 via the communications network 124. Consequently, the remote server 126 functions as a relay for communications between the mobile device 120 and the wireless adapter 112. In some embodiments, the remote server 126 does not store user account information. Additionally, in some embodiments, the remote server 126 does not function as a user interface to users. For example, the remote server 126 may not serve web pages or other user interfaces to users for presentation on the mobile device 120 (or other devices capable of presenting such media). In such embodiments, an application 118 running on the mobile device 120 provides the user interface.

In some embodiments, the remote server 126 receives notifications from the wireless adapter 112 and transmits the notifications to the mobile device 120. For example, the irrigation controller 110 can output a notification (e.g., an alarm, alert condition, etc.) to the I/O port 114. The wireless adapter 112 receives the notifications and transmits the notifications to the remote server 126. The remote server 126 then causes the notification to be transmitted to the mobile device 120 to inform the user of the alert. In some embodiments, the remote server 126 transmits the notification directly to the mobile device. As one example, the remote server 126 can transmit a text message to the mobile device 120. Additionally, or alternatively, the remote server 126 can transmit the notification to the mobile device 120 indirectly. For example, the remote server 126 can transmit the notification to a third party (e.g., a manufacturer of the mobile device 120 or a service provider for the mobile device 120). In such embodiments, the third party transmits the notification to the mobile device 120, for example, for presentation in a notification center on the mobile device 120. The notification can be transmitted as one or more of an application notification to the application 118, a push notification to an identifier (e.g., a phone number) associated with the mobile device 120, and a text message to an identifier (e.g., a phone number) associated with the mobile device 120. In some embodiments, the remote server 126 simply relays the notifications and no (or little) information regarding the notification is stored or saved.

In addition to communicating with the wireless adapter 112 via the remote server 126, in some embodiments, the mobile device 120 communicates with the wireless adapter 112 directly. That is, the mobile device 120 can communicate with the wireless adapter 112 without the aid of the remote server 126. The determination of the mode with which the mobile device 120 will communicate with the wireless adapter 112 can be performed manually (e.g., by the user) and/or automatically. For example, as will be discussed in more detail with respect to FIG. 4), the wireless adapter can include a button (e.g., a hard or soft button, switch dial, etc.) that when selected, forces the wireless adapter 112 to communicate in the direct communication mode. Additionally, or alternatively, the user can select which mode will be used via the application 118. If the determination of the mode with which the mobile device 120 will communicate with the wireless adapter 112 is performed automatically, this determination can be based on any suitable scheme. For example, in one embodiment, the mobile device 120 will default to communicating with the wireless adapter 112 via the access point 116. The wireless adapter 112 may default to this communication mode because it will be a faster connection that relaying communications through the remote server 126. In some embodiments, when the user opens the application 118 on his or her mobile device 120, the application 118 will check to see if the mobile device 120 is connected to the local area network. If the mobile device 120 is connected to the local area network 121, the application will attempt to communicate with the wireless adapter 112 via the access point 116.

Remote Server Functionality

In some embodiments, the remote server 126 determines and transmits weather based corrections to the wireless adapter 112. The remote server 126 can obtain historical and predicted weather information from the weather server 128. The weather information can include temperatures, humidity, rainfall, etc. Based on the historical weather information (e.g., temperature, humidity, wind speed, solar radiation, rainfall, etc.), the remote server 126 can determine an evapotranspiration (ET) value using any known approach. As is well known, ET is typically determined using values of temperature, humidity, wind speed, and solar radiation. ET values are then often adjusted based on rainfall data. ET values and rainfall can be used to determine whether any scheduled watering should be reduced of increased. Additionally, if it is predicted to rain and/or be colder than normal in a given area, then the remote server 126 can determine to reduce or suspend future scheduled irrigation. Conversely, if the weather patterns are warmer and/or dryer than normal for a given area, the remote server 126 can determine that scheduled watering should be increased. In some embodiments, the remote server 126 calculates a weather adjustment factor and transmits the weather adjustment factor to the wireless adapter 112. In some embodiments, the remote server 126 determines weather adjustment factors based on geographic location (e.g., state, county, city, zip code, etc.), received or calculated weather or ET information, and so on. In such embodiments, the remote server 126 transmits the weather adjustment factors based on the geographic locations. For example, the remote server 126 can transmit geographic-based weather adjustment factor to all wireless adapters in a zip code.

In one embodiment, a user can configure the wireless adapter 112 to indicate whether the user would like the irrigation controller 110 to be adjusted based on the received weather adjustment factor. The wireless adapter 112 can store this configuration information in its internal memory. Additionally, if the user wishes the irrigation controller 110 to be adjusted based on the received weather adjustment factor, the user can configure the wireless adapter 112 to indicate whether the user would like the adjustment to be global (i.e., to all programs and/or stations) or define specific programs, zones, and/or stations to which the weather adjustment factor should be applied.

Not all irrigation controllers include the functionality to accept weather adjustment factors. For example, some irrigation controllers may only include the functionality to accept "seasonal adjust values" (i.e., a value, such as a percentage, that an irrigation controller uses to scale any scheduled watering duration). In some embodiments, the wireless adapter 112 can query the irrigation controller 110 to determine if the irrigation controller 110 includes the functionality to accept weather adjustment factors. In order for the wireless adapter 112 to adjust the irrigation schedule, the wireless adapter 112 needs to be aware of certain information relating to the irrigation controller 110. In one embodiment, the wireless adapter 112 stores the number of programs at the irrigating controller 110 (e.g., configuration information received from the application 118), the programs selected by the user to be adjusted (e.g., configuration information received from the application 118), and whether a command translation is needed. In some embodiments, the wireless adapter 112 is unaware of a type of the irrigation controller 110. In such embodiments, the wireless adapter 112 sends a command to the irrigation controller 110 querying the irrigation controller 110 when first connected. Additionally, the wireless adapter can transmit information regarding the irrigation controller type to the mobile device 120. The application 118 can use this information to configure settings, images, controls, etc. of the application 118. For example, the application 118 can present a representative image of the irrigation controller 110, the type of the irrigation controller, and one or more controls specific to the type of irrigation controller.

If necessary, the wireless adapter 112 translates the weather adjustment factor received from the remote server 126 into an appropriate command for the irrigation controller 110 (i.e., a command that the irrigation controller 110 can process). If the irrigation controller 110 includes the functionality to accept weather adjustment factors, the wireless adapter 112 transmits received weather adjustment factors directly to the irrigation controller 110 without translation via the I/O port 114. If the irrigation controller 110 does not include the functionality to accept weather adjustment factors, the wireless adapter 112 translates the weather adjustment factor received from the remote server 126 into a format compatible with the irrigation controller 110. For example, if the irrigation controller can accept seasonal adjust values, the wireless adapter 112 can translate the weather adjustment factor into a seasonal adjust value. As an example, a seasonal adjust value of 80% will signal to the irrigation controller 110 to reduce the scheduled watering duration by 20% (i.e., 80% of the scheduled watering duration). That is, if watering was scheduled for 10 minutes, an 80% seasonal adjust will result in watering for only 8 minutes. A seasonal adjust value of 0% will cause the irrigation controller 110 to not irrigate (i.e., there would be 0 minutes of watering). A seasonal adjust value of 150% will signal to the controller to increase the scheduled watering duration by 50% (i.e., 150% of the scheduled watering duration). In this example, a seasonal adjust value of 150% would result in 15 minutes of watering. Because the irrigation controller 110 includes the ability for the user to program a seasonal adjust value, the I/O port 114 protocol allows for this programmed seasonal adjust value to be adjusted by the wireless adapter 112.

In some embodiments, since ET calculations are based in part on weather forecasts, the weather forecast data is later compared to actual historical data for the forecast period and used to make any adjustments in the next weather adjustment factor to be sent to the wireless adapter 112. That is, if the weather forecast for tomorrow indicates cooler weather than normal, this may result in a weather adjustment factor that reduces irrigation. However, if the weather actually was not cooler than normal, the weather adjustment for the next day can be adjusted to include more irrigation than would otherwise be needed (to account for the under-irrigation due to incorrectly forecast data).

General Application Functionality

The application 118 is a client device application. The mobile device 120 can download the application from a server or the mobile device may be provided with the application pre-installed. The application 118 provides a user interface at the mobile device 120. The application 118 allows the user to view information output from the irrigation controller 110, such as scheduling and programming information. The application 118 allows the user to create watering schedules, make programming changes, start and stop manual watering, adjust seasonable adjust values, and so on. Essentially, the application 118 provides a convenient interface for the user to program the irrigation controller 118 without having to be present at the irrigation controller 110. For example, the user can program the irrigation controller 110 from within his/her home (i.e., without having to go outside) or when the user is away from his/her home. In some embodiments, the application 118 also allows contractors (i.e., an irrigation professional hired to setup or troubleshoot the irrigation system or irrigation controller 110) to make programming changes to the user's irrigation controller 110. For example, the contractor can remotely program and/or troubleshoot the irrigation system and/or irrigation controller 110 without having to be present at the user's home. Thus, the application 118 allows the mobile device 120 to be a remote viewing, remote programming, remote controlling, and remote debugging tool to interact with the irrigation controller 110 without requiring that the user physically interact with the irrigation controller 110.

In addition to viewing information from the irrigation controller 110 and programming the irrigation controller 110, the application allows the user to configure whether the irrigation controller 110 will be adjusted by weather adjustment factors. As previously discussed, in some embodiments, a server (e.g., the remote server 126) transmits weather adjustment factors to the wireless adapter 112. This configuration is transferred to, and stored by, the wireless adapter 112. If the user configured the irrigation controller 110 to not be adjusted by weather adjustment factors, the wireless adapter 112 will store this preference and will not transmit weather adjustment factors to the irrigation controller 110. In the case that the user configures the irrigation controller 110 to be adjusted by the weather adjustment factors, the application 118 allows the user to define whether the adjustment should be all programs, zones, and/or stations (i.e., a global adjust) or less than all of the programs, zones, and/or stations. If the user instructs the adjustment to apply to less than all of the programs, zones and/or stations, the application 118 also allows the user to select which programs, zones, and/or stations should be adjusted based on the weather adjustment factors.

Security

To prevent unauthorized wireless interaction with the wireless adapter 112, the user can configure the wireless adapter 112 to require a password. In some embodiments, the wireless adapter 112 requires the mobile device 120 to supply the password before allowing the wireless adapter 112 to be accessed via the mobile device 120. In addition to, or in lieu of, the password, in some embodiments the user can require that a device have the wireless adapter's 112 serial number to communicate with the wireless adapter 112. For example, for the wireless adapter 112 to accept commands from the mobile device 120, both the serial number (or other identifier such as a MAC address) of the wireless adapter 112 and the password must be entered on the mobile device 120. This can be performed during configuration of the wireless adapter 112 and/or the mobile device 120. For example, when the mobile device 120 is in direct communication with the wireless adapter 112 (as depicted in FIG. 1), the user defines a password at the mobile device 120 and the mobile device 120 transmits the password to the wireless adapter 112. In return, the wireless adapter 112 transmits its serial number (or other identifier) to the mobile device 120. After the initial configuration, when the mobile device 120 is not communicating directly with the wireless adapter 112 (e.g., as depicted in FIGS. 2 and 3), the mobile device 120 transmits the password and serial number in a transmission to establish communication with the wireless adapter 112. Alternatively, the mobile device 120 can transmit the password and serial number in all communications with the wireless adapter 112. If the password and serial number are correct, the wireless adapter 112 will act on commands and signals received from the mobile device 120. In some embodiments, the mobile device 120 (and/or mobile devices in addition to the mobile device 120) can be configured to interact with the wireless adapter 112 by entering the password and/or serial number on the mobile device 120 (and/or other mobile devices in addition to the mobile device 120). As an alternative to manual entry of the serial number and password on a second mobile device (i.e., a mobile device that is different than the mobile device 120), in some embodiments the mobile device 120 can transmit the password and/or serial number to the second mobile device. Once the second mobile device has the password and/or serial number, the second mobile device can interact with the wireless adapter 112. In some embodiments, the irrigation controller 110 does not store the password and/or serial number information. Additionally, in some embodiments, the wireless adapter 112 does not have a user interface or other means for password entry (i.e., the wireless adapter 112 must be configured via a second device, such as the mobile device 120).

Wireless Adapter Portability Between Irrigation Controllers

In some embodiments, the wireless adapter is not restricted to use with only one irrigation controller. That is, the wireless adapter is not paired to a single irrigation controller by virtue of configuring the wireless adapter. Instead, the wireless adapter is operable with any irrigation controller with which the wireless adapter's current settings are compatible. In such embodiments, the configuration of the wireless adapter is associated with which types of irrigation controllers the application is configured to communicate. Put simply, the configuration pairs the mobile device to the wireless adapter. For example, the application executing on the mobile device may have a profile (i.e., a "card," as described in more detail with respect to FIG. 10) for irrigation controllers of Type A. So long as the mobile device on which the application is executing is configured to interact with the wireless adapter, the wireless adapter can be used to communicate with any Type A irrigation controller. All that is required is that the wireless adapter be physically connected to the irrigation controller. Such portability is possible because, in some embodiments, the wireless adapter is a communication device used only to facilitate reception of commands at the irrigation controller from a mobile device. In such embodiments, all irrigation information is stored on the irrigation controller. Consequently, when the wireless adapter is connected to the irrigation controller, the wireless adapter can transmit the irrigation information from the irrigation controller to the mobile device. Even more flexibility can be obtained if the mobile device has profiles for additional types of irrigation controllers. The mobile device and a single wireless adapter can be used with any irrigation controller for which the mobile device has a profile. Such portability may be useful to contractors.

Wireless Adapter Connection to Irrigation Controller

Figure 4A:
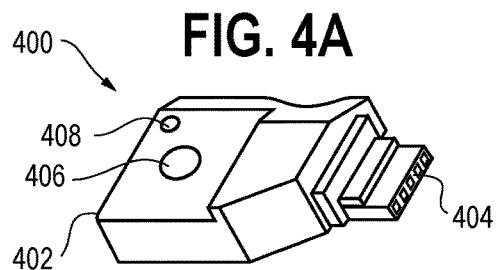
FIG. 4A depicts a wireless adapter 400, according to some embodiments.
Figure 4B:
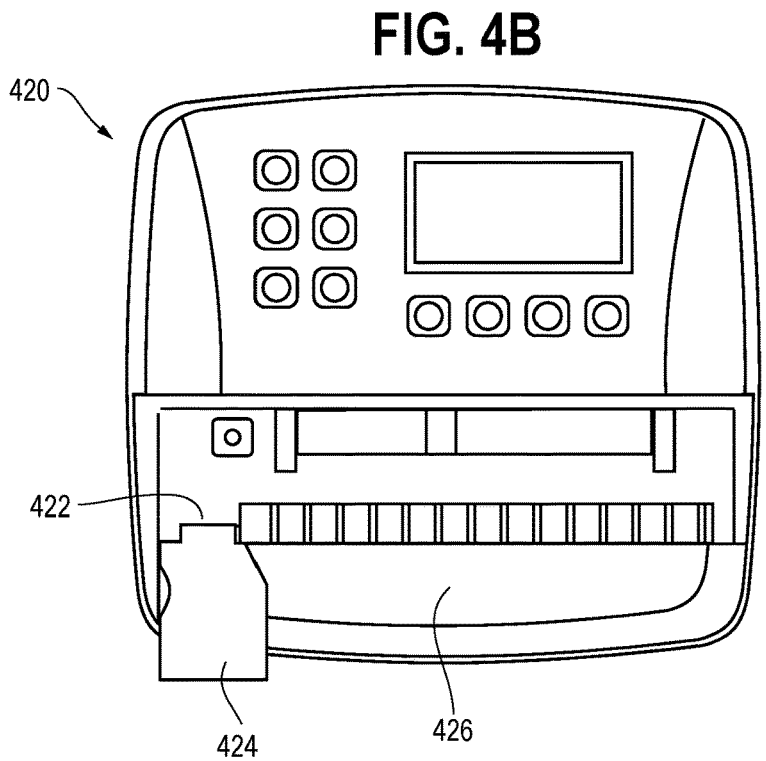
FIG. 4B depicts a wireless adapter 424 connected to an example irrigation controller 420, according to some embodiments.
Figure 4C:
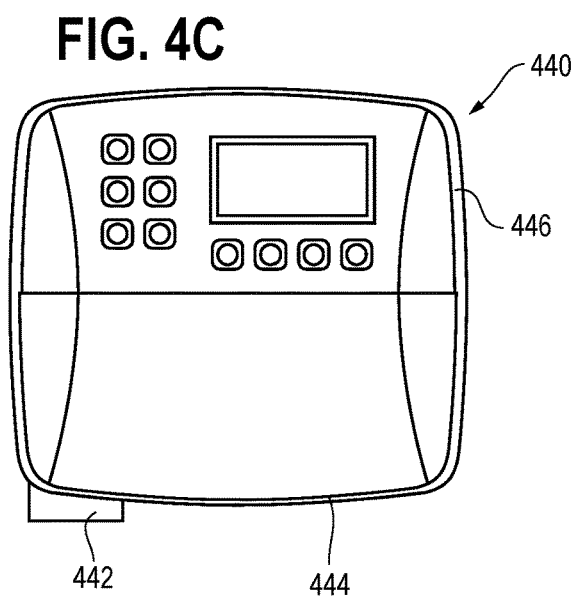
FIG. 4C depicts an example irrigation controller 440 having a door 444 that includes a protrusion 442 to cover a wireless adapter, according to some embodiments.
Figure 5:
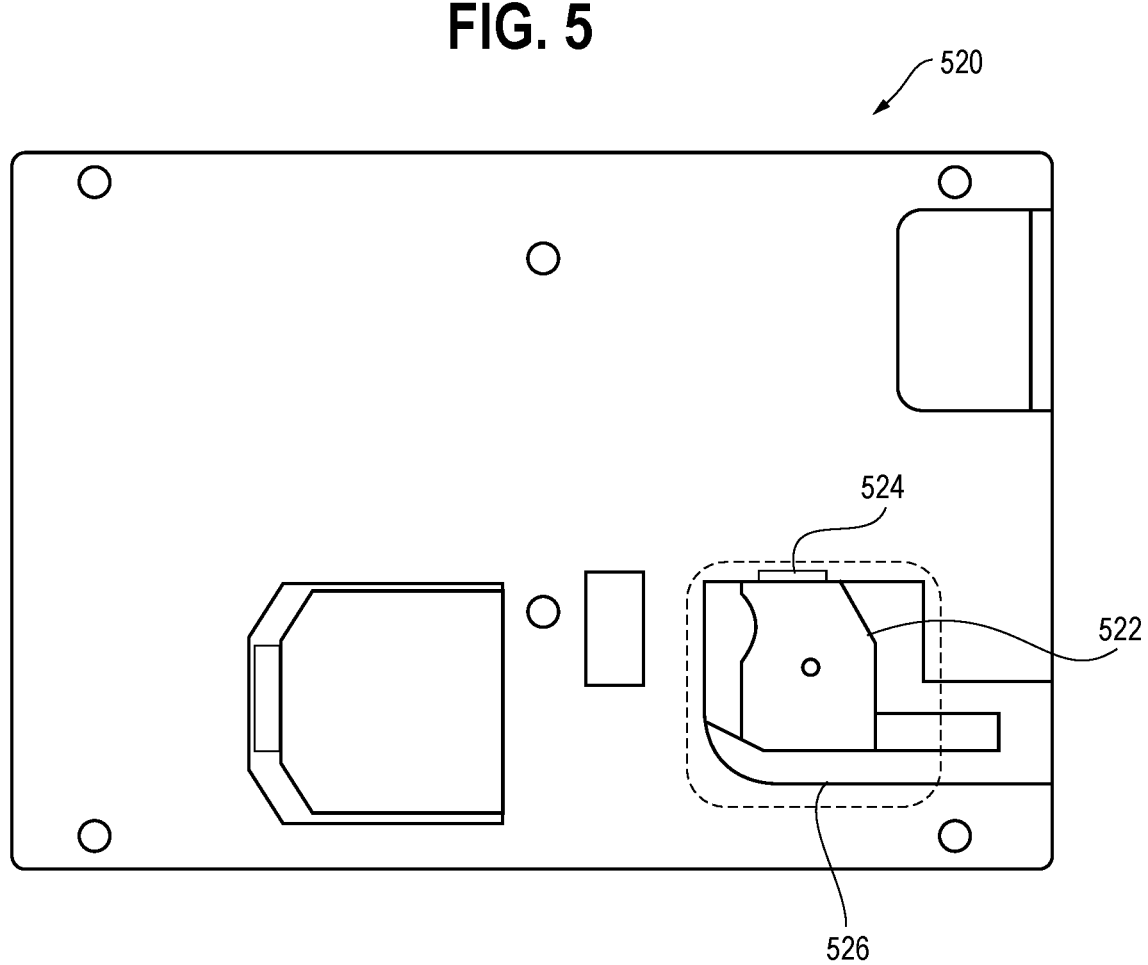
FIG. 5 depicts a wireless adapter 522 connected to an example irrigation controller 520, according to some embodiments.

While FIGS. 1-3 and the related text describe communications between a wireless adapter and several components (e.g., a mobile device, servers, an irrigation controller, etc.), FIGS. 4 and 5 and the related text describe physical connections between a wireless adapter and an irrigation controller in some embodiments. Specifically, FIGS. 4B and 4C depict a first style of irrigation controller while FIG. 5 depicts a second style of irrigation controller.

FIG. 4A depicts a wireless adapter 400, according to some embodiments. The wireless adapter 400 includes a body 402 and a connector 404. The body 402 can be made of any suitable material (e.g., plastic, metal, etc.) and houses internal components (not shown) of the wireless adapter 400. In some embodiments, the internal components include a microcontroller and a wireless chipset (e.g., a Wi-Fi chip on a circuit board). The connector 404 is communicatively coupled to the circuit board and extends from the body 402. The connector 404 couples to a port of an irrigation controller. The connector 404 can be of any type suitable for communication between the wireless adapter 400 and the irrigation controller. For example, the connector 404 can be a USB type connector, a FireWire type connector, a proprietary type connector, or any other type of connector. In some embodiments, the wireless adapter 400 simply plugs into the irrigation controller via the connector 404. In other embodiments, the wireless adapter 400 must be installed onto a circuit board of the irrigation controller and connected via the connector 404.

The wireless adapter 400 includes one or more physical inputs, such as button 406. Activation of the button 406 can force the wireless adapter 400 to communicate in one or more of the operational modes (as described with reference to FIGS. 1-3). For example, activation of the button 406 can cause the wireless adapter 400 to operate in a mode in which the wireless adapter 400 communicates directly with a mobile device (as described with reference to FIG. 1). In some embodiments, a user can press the button 406 to force the wireless adapter 400 to communicate only in this direct communication mode. The wireless adapter 400 can also include an indicator, such as an LED 408, that indicates a connection status. For example, the LED 408 can illuminate when the wireless adapter 400 is connected to the mobile device.

FIG. 4B depicts a wireless adapter 424 connected to an example irrigation controller 420, according to some embodiments. The irrigation controller 420 depicted in FIG. 4B is a first type or irrigation controller in which the wireless adapter is connected at the front of the irrigation controller 420. The irrigation controller 420 includes a port 422, such as an input/output (I/O) port. The port 422 can be any suitable type of port (a USB port, a FireWire port, a proprietary port, etc.). The wireless adapter 424 connects to the irrigation controller 420 via the port 422. As depicted in FIG. 4B, when connected, the wireless adapter 424 extends through a housing 426 of the irrigation controller 420. Such a configuration however is not required (e.g., the wireless adapter could be a smaller form that fits within the space illustrated).

In some embodiments, like that depicted in FIG. 4C, an irrigation controller 440 can include a door 444 that covers the wireless adapter. If the wireless adapter extends beyond the housing 446 of the irrigation controller 440, the door 444 can include a protrusion 442 that covers the wireless adapter. The door 444, as well as the protrusion, can provide protection for the wireless adapter and the interior of the irrigation controller 440. In some embodiments, rather than having a protrusion to cover the wireless adapter, the door may simply be enlarged to cover the wireless adapter. For example, the door may be larger or extend further than to cover the wiring bay. That is, the length of the bottom edge of the door illustrated in FIG. 4C may extend lower in the illustration so that the door still covers the wireless adapter but does not have the protrusion. In such cases, the door will overhang other portions of the wiring bay.

FIG. 5 depicts a wireless adapter 522 connected to an example irrigation controller 520, according to some embodiments. The irrigation controller 520 depicted in FIG. 5 is a second type of irrigation controller in which the wireless adapter 522 is connected at the rear of the irrigation controller 520. The irrigation controller 520 includes a port 524 at the rear of the irrigation controller 520. The port 524 can be of any suitable type. The wireless adapter 522 connects to the irrigation controller 520 via the port 524. The rear of the irrigation controller 520 also includes a recessed bay 526. The recessed bay 526 is configured to accommodate the wireless adapter 522.

Application Functionality

While FIGS. 1-5 and the related text describe interactions between a wireless adapter and irrigation controller, FIGS. 6-18 and the related text describe functionality of an application associated with the wireless adapter.

Figure 6A:
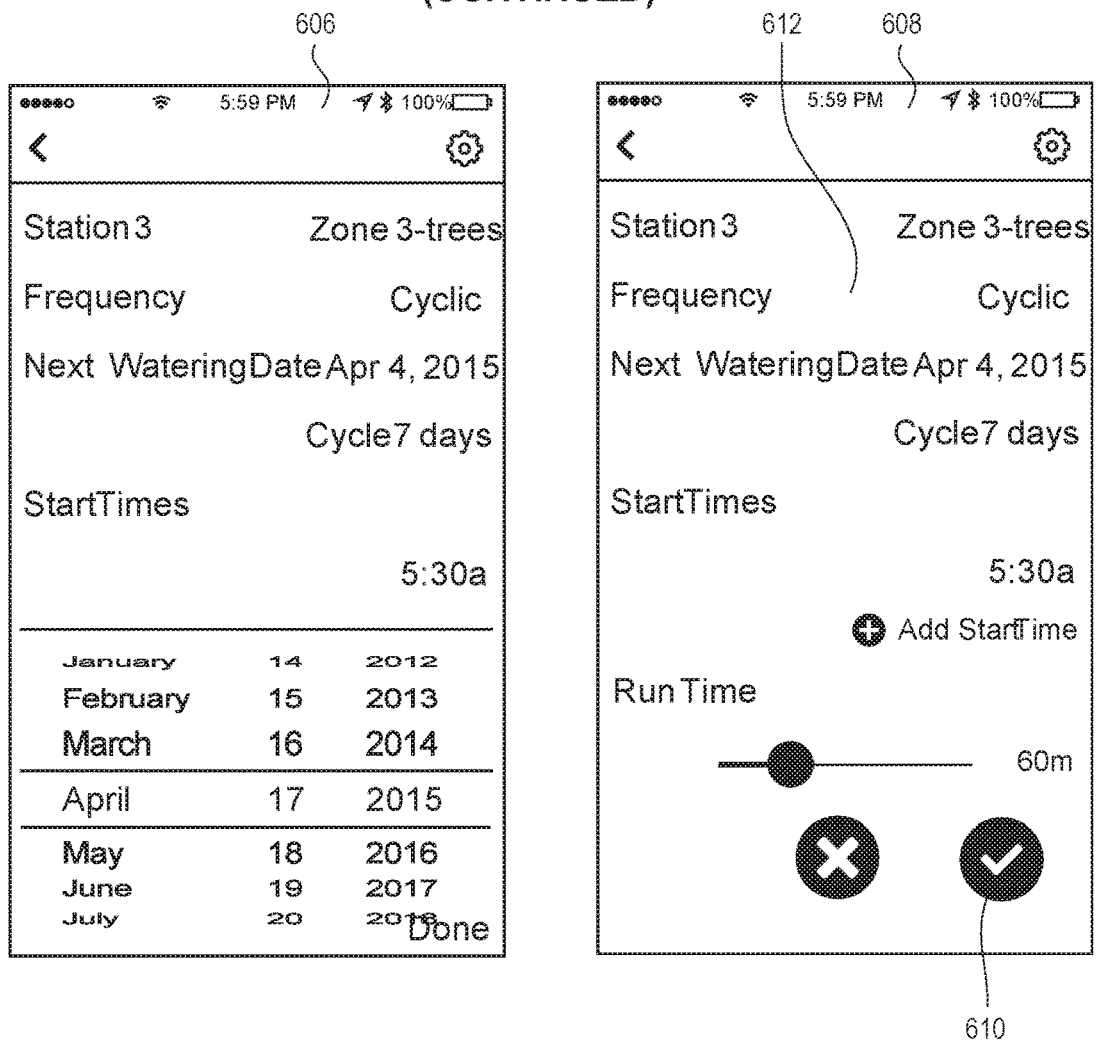
FIG. 6A depicts a first embodiment of a GUI 600 in a programming mode, according to some embodiments.

FIGS. 6A and 6B depict an example GUI in a programming mode. FIG. 6A depicts a first embodiment of a GUI 600 in a programming mode. FIG. 6A depicts four different screens 602, 604, 606, and 608 of the first embodiment of the GUI 600 in the programming mode. In the programming mode, the user can define the frequency of irrigation, including odd, even, custom, and cyclic frequencies. Additionally, the user can set times for irrigation, duration of irrigation, and other parameters for irrigation. As depicted in FIG. 6A, the user has selected a cyclic frequency in the first screen 602. As depicted in the second screen 604, the user has selected the cyclic period to be seven days. As depicted in the third screen 606, the user has selected the cyclic irrigation to begin on Apr. 17, 2015 with a start time of 5:30 AM. In the fourth screen 608, the user can select a run time (i.e., duration) for the irrigation and can confirm the settings with confirmation controls 610. In some embodiments, the user can set irrigation schedules for each zone or area of the irrigation system, as indicated by the station selection 612. As can be seen, the frequency, the cycle and next watering date are selected by touching the given area and then touch scrolling through the options at the bottom portion of the display and making a selection. In the illustrated embodiment, the run time is selected in screen 608 by touching and dragging the circle icon left or right until the selected number of minutes is displayed.

FIG. 6B depicts a second embodiment of a GUI 620 in a programming mode. The second embodiment of the GUI 620 is shown with three screens 622, 624, and 626. The first screen 622 depicts a menu from which a user can select a program. If the device presenting the GUI 620 includes a touchscreen, the user can select a desired program by touching the desired program. As depicted in the second screen 624, the user has selected "Program C-Test." The user has selected a cyclic irrigation frequency with cyclic period of two days, the beginning of the cycle starting in zero days (today). That is, the user can define the period of the cycle (Day Cycle) and how long before the cycle begins (Days Remaining). The user can adjust the period of the cycle and how long before the cycle begins by manipulating the appropriate sliders 628, 630. The irrigation schedule will begin at 10:30 AM, as depicted in the third screen 626. The user can modify the current start time (e.g., by deleting the currently selected start time via the "X" 632 or adding a new start time via the "+" sign 634). Zones 1, 2, and 3 will be included in this irrigation schedule, as indicated by the third screen 626. The user can also adjust the run time of the zones by moving the slider associated with each of the zones. For example, the run time for Zone 1 can be adjusted by manipulating the slider 636.

Figure 7A:
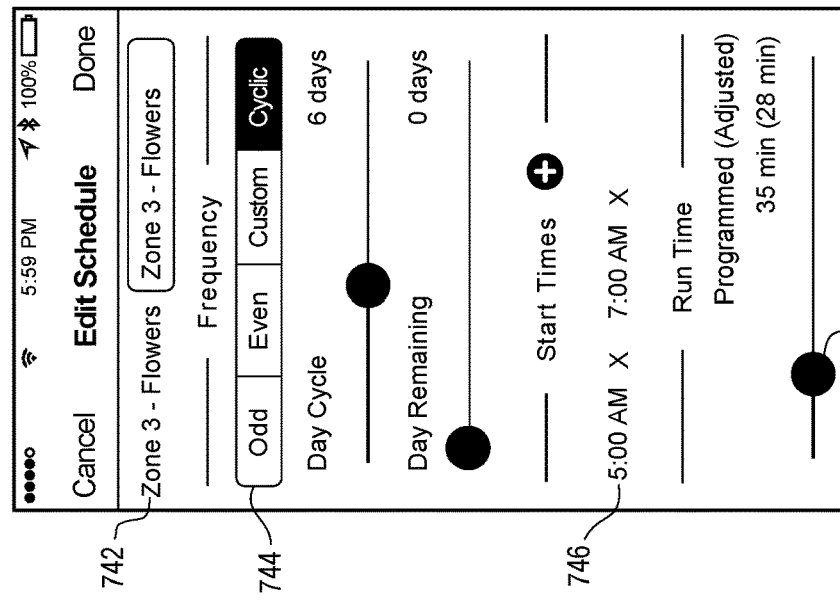
FIG. 7A depicts a first image of a third embodiment of a GUI 700 in a programming mode, according to some embodiments.

FIG. 7A depicts a first image of a third embodiment of a GUI 700 in a programming mode, according to some embodiments. In the first image, the GUI 700 is being used to configure an irrigation schedule for Zone 1 with a custom frequency. The GUI 700 includes a zone naming section 702, frequency section 704, a start time section 708, and a run time section 712. The zone section 702 indicates for which zone the schedule is being set. As indicated by the zone section 702, the schedule is being set for Zone 1. The frequency section 704 allows a user to change the frequency with which the schedule will run. For example, the user can select between odd days, even days, a custom schedule, or a cyclic schedule. As indicated by the frequency section 704, the user has selected a custom frequency. Because the user has selected a custom frequency, the GUI 700 presents a day section 706 from which the user can select the days on which the irrigation will occur. As indicated by the day section 706, the user has selected Monday, Wednesday, and Friday as the days on which the irrigation will occur. The start time section 708 allows the user to select the time at which the irrigation will begin. As indicated by the start time section 708, the irrigation will begin at 6:00 AM. The run time section 712 indicates the length of time for which the irrigation will occur. In some embodiments (including the embodiment depicted in FIG. 7A), the GUI 700 indicates a programmed run time and an adjusted run time. The run time section 712 includes a slider 710. The user can adjust the run time via the slider 710.

Figure 7B:
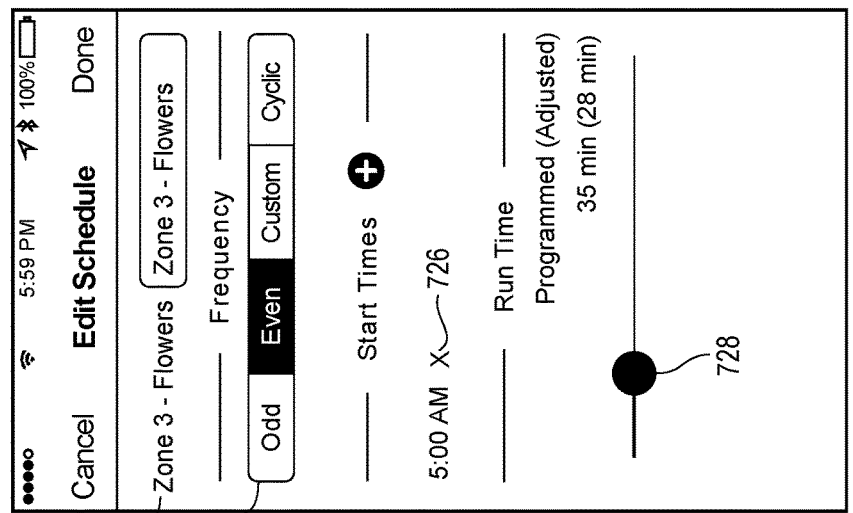
FIG. 7B depicts a second image of a third embodiment of a GUI 720 in a programming mode, according to some embodiments.

FIG. 7B depicts a second image of a third embodiment of a GUI 720 in a programming mode, according to some embodiments. The GUI 720 includes a zone naming section 722, a frequency section 724 (from which the user can select one of the boxes), a start time section 726, and a run time section 728. In FIG. 7B, the user has selected an even frequency for Zone 3 to begin at 5:00 AM. The user has also adjusted the run time to 28 mins (from the programmed 35) via a slider 728.

Figure 7C:
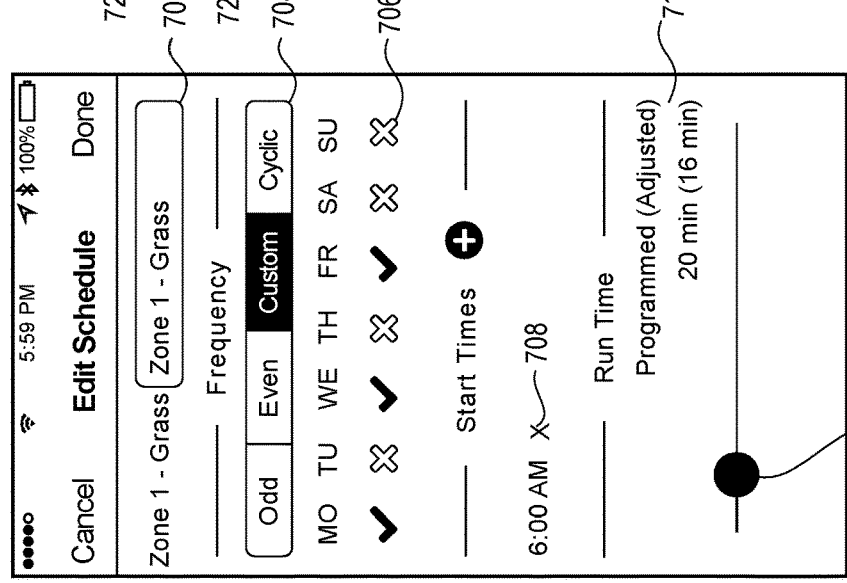
FIG. 7C depicts a third image of a third embodiment of a GUI 740 in a programming mode, according to some embodiments.

FIG. 7C depicts a third image of a third embodiment of a GUI 740 in a programming mode, according to some embodiments. The GUI 740 includes a zone naming section 742, a frequency section 744, and a start time section 746.

In FIG. 7C, the user has selected a cyclic frequency (e.g., every six days) for Zone 3, the beginning of the cycle starting in zero days (today). That is, the can define the period of the cycle (Day Cycle) and how long before the cycle begins (Days Remaining). As shown, the user has selected to start times: 5:00 AM and 7:00 AM. In some embodiments, the user can select multiple start times. Selection of multiple start times can be beneficial to allow for greater water absorption. For example, irrigating for ten minutes twice as opposed to irrigating for 20 minutes once may allow for greater water absorption as the ground may become saturated and no longer absorb water after 10 minutes of irrigating. The user has also adjusted the run time to 28 mins (from the programmed 35) via a slider 748.

Figure 8:
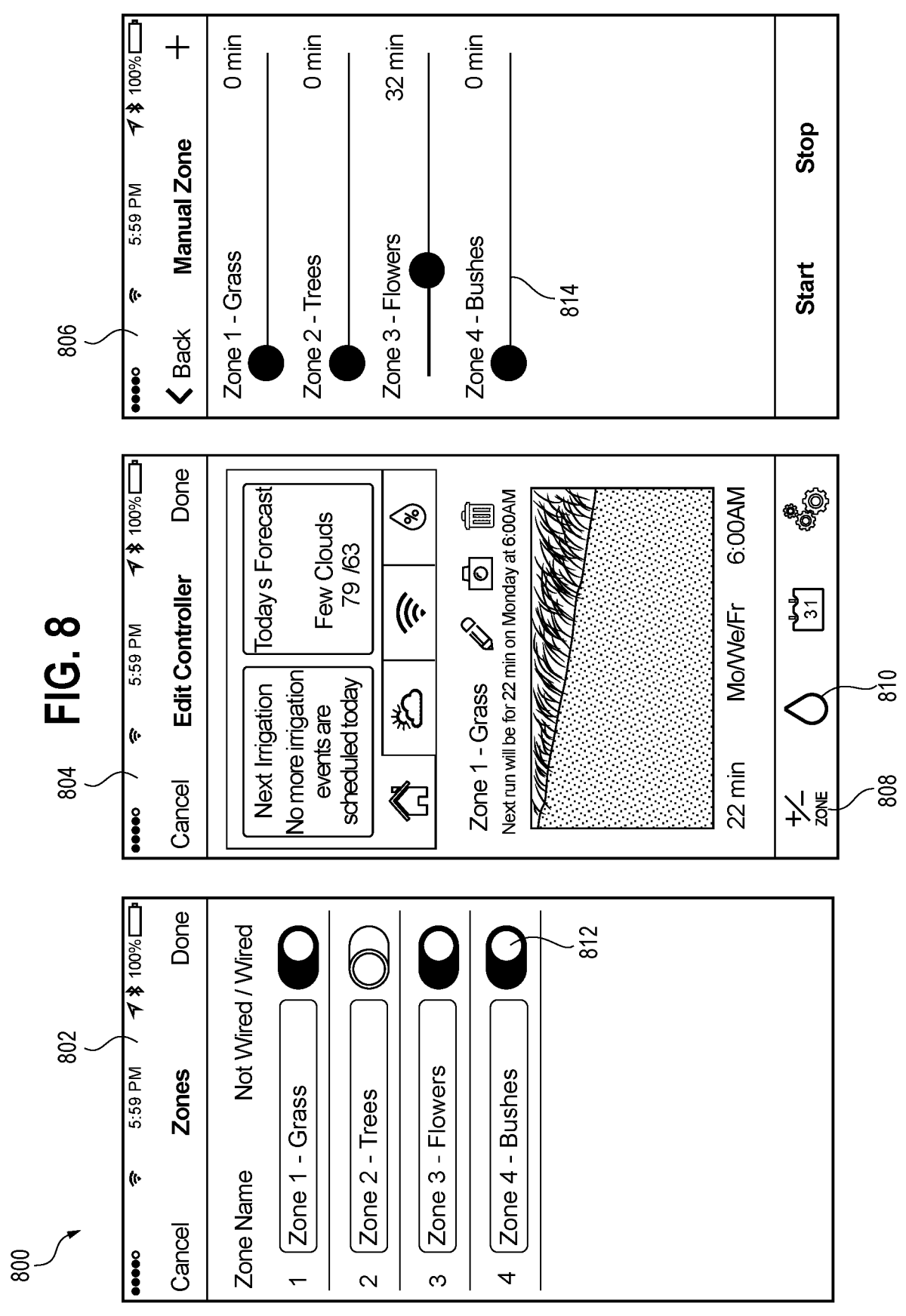

FIG. 8 depicts a GUI 800 in a zone enable/disable mode, according to some embodiments. FIG. 8 depicts three screens: a first screen 802, a second screen 804, and a third screen 806. The second screen 804 is a home screen. From the second screen 804, the user can enter a disable/enable zone mode (depicted in the first screen 802) or a manual zone run mode (depicted in the third screen 806). In the example depicted in FIG. 8, the user enters the disable/enable zone mode by selecting a first button 808. When in the disable/enable zone mode, the user can toggle zones on and off using toggle switches 812. For example, the user can disable zones that are not wired or being used. In some embodiments, the user can select zones to be enabled or disabled independent of whether valves or control devices are actually attached to the zones of the controller. This can allow a user to test or design schedules and programming without requiring a valve or other control device being connected to the irrigation controller. In the example depicted in FIG. 8, the user enters the manual zone run mode by selecting a second button 810. From the manual zone run mode, the user can manually cause irrigation of one or more zones via the sliders 814. As depicted in the third screen, the user has manipulated the slider for Zone 3 to cause irrigation to occur in Zone 3 for 32 minutes. In the event durations are selected for manually irrigating multiple zones, the manual run will execute a manual run of the first zone for the first selected time duration, and then sequentially go to the next selected zone and manually water for the selected duration, and so on.

Figure 9A:
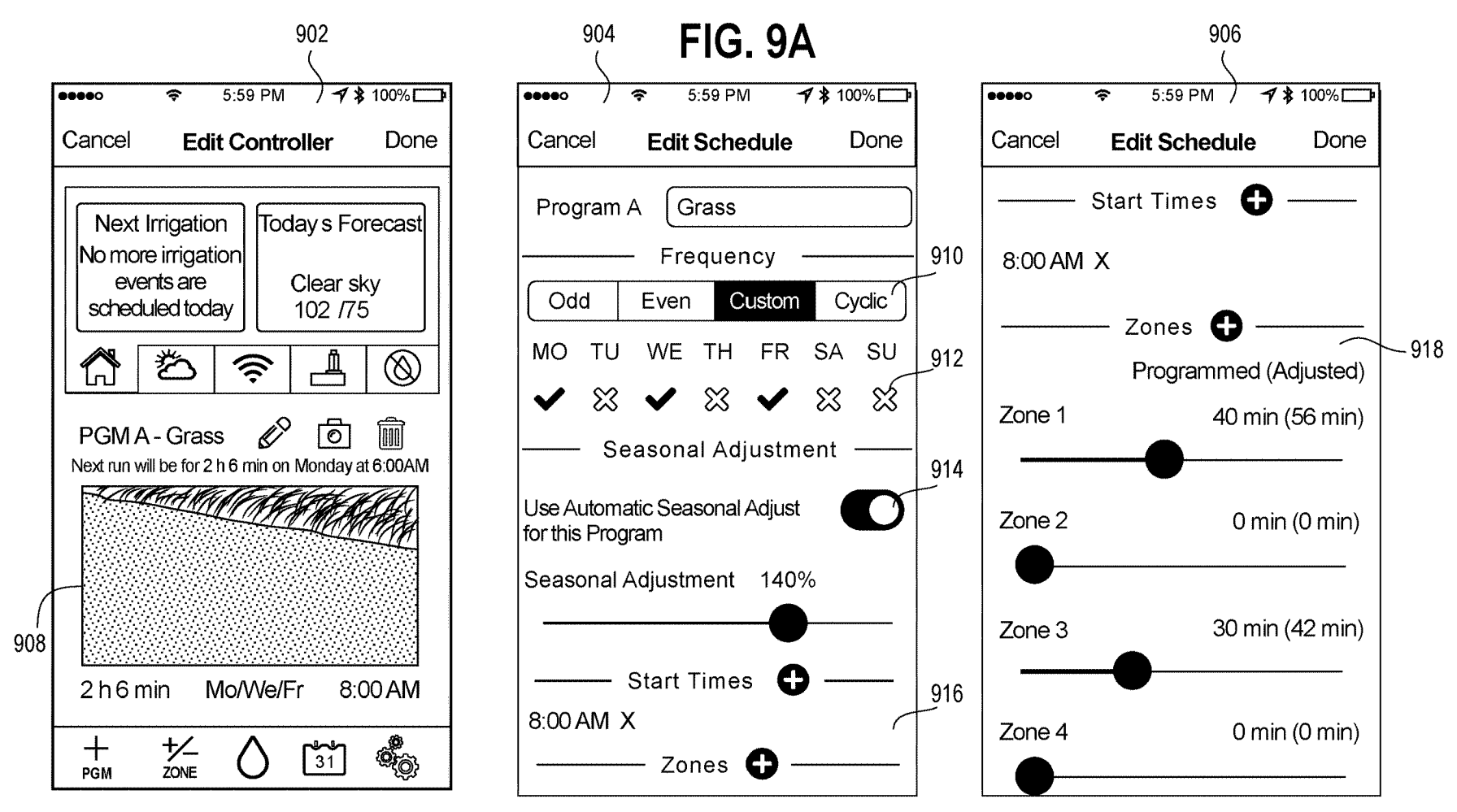

FIG. 9A depicts a GUI 900 in a programming mode, according to some embodiments. FIG. 9A includes three screens: a first screen 902, a second screen 904, and a third screen 906. The first screen 902 is a home screen. The home screen can include cards 908 that are associated with programs. In some embodiments, a user can modify the cards 908 to include a name of the program, a picture of zones associated with the program, and other information about the program. In some embodiments, the user can enter a menu to create an irrigation program (e.g., accessed by tapping or clicking the "pencil" icon) from the home screen. The second screen 904 and the third screen 906 depict an example programming menu. The second screen includes a frequency section 910, a day selection section 912, a seasonal adjustment selection section 914, and a start time selection section 916. The frequency selection section 910 allows the user to set a frequency with which irrigation will occur (e.g., odd days, even days, a custom frequency, or a cyclic frequency). The user can also select the days on which irrigation will occur via the day selection section 912. For example, as depicted in FIG. 9, the user has selected a custom irrigation frequency for which irrigation will occur on Mondays, Wednesdays, and Fridays. The user can set the irrigation schedule to adjust based on seasonal adjustments via the seasonal adjustment selection section 914. The start time selection section 916 allows the user to set a start time for the irrigation schedule. As depicted in the third screen 906, some embodiments allow the user to set irrigation durations for zones included in the program via a zones section 918. As depicted in FIG. 9A, the user has adjusted Zone 1 to increase the duration of irrigation in Zone 1. As depicted, the duration of irrigation for Zone 1 was programmed as forty minutes. The user has adjusted the irrigation duration of Zone 1 to be fifty-six minutes.

Figure 9B:
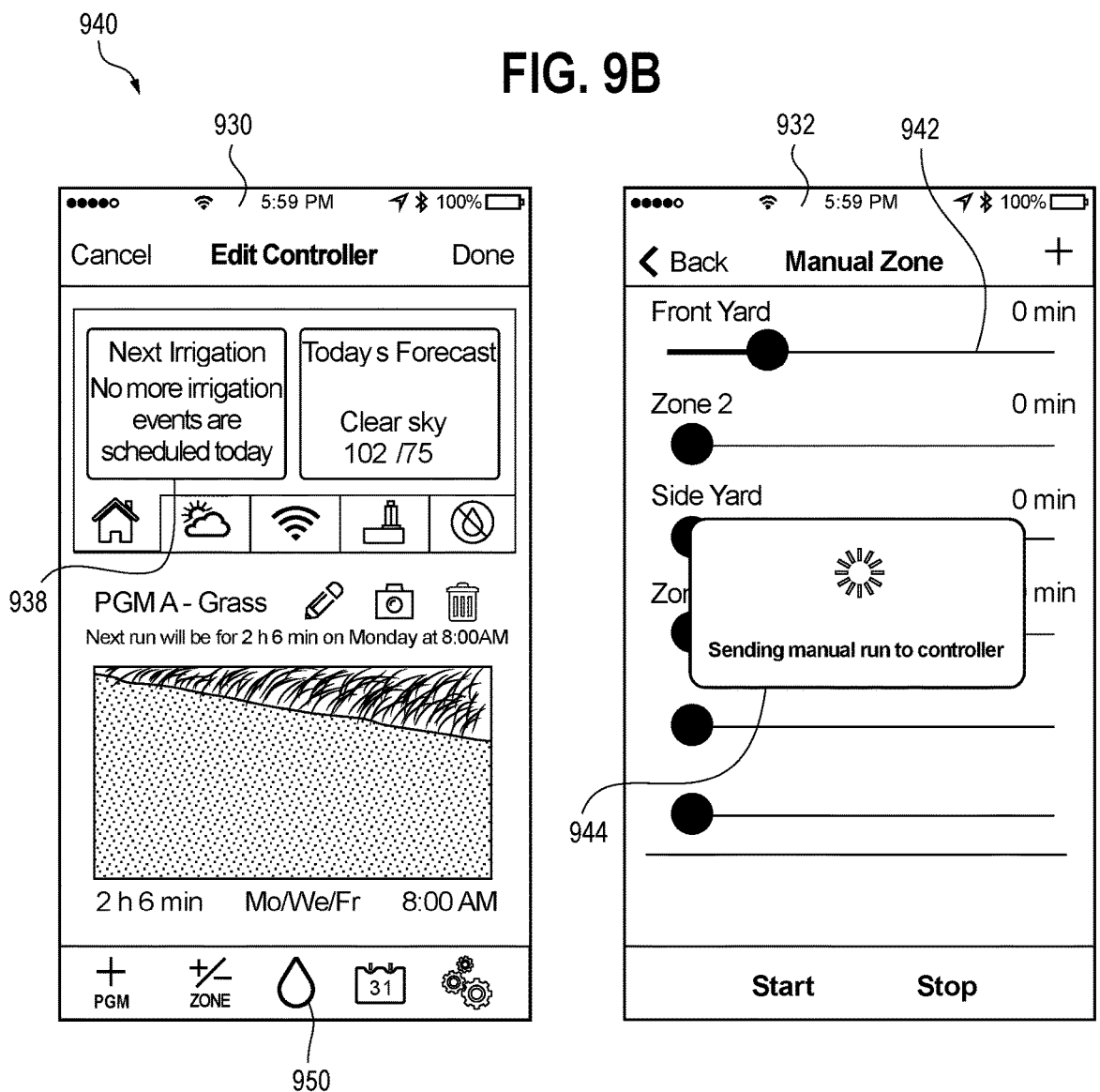
FIG. 9B depicts a GUI 940 in a manual run mode, according to some embodiments.
Figure 9B:
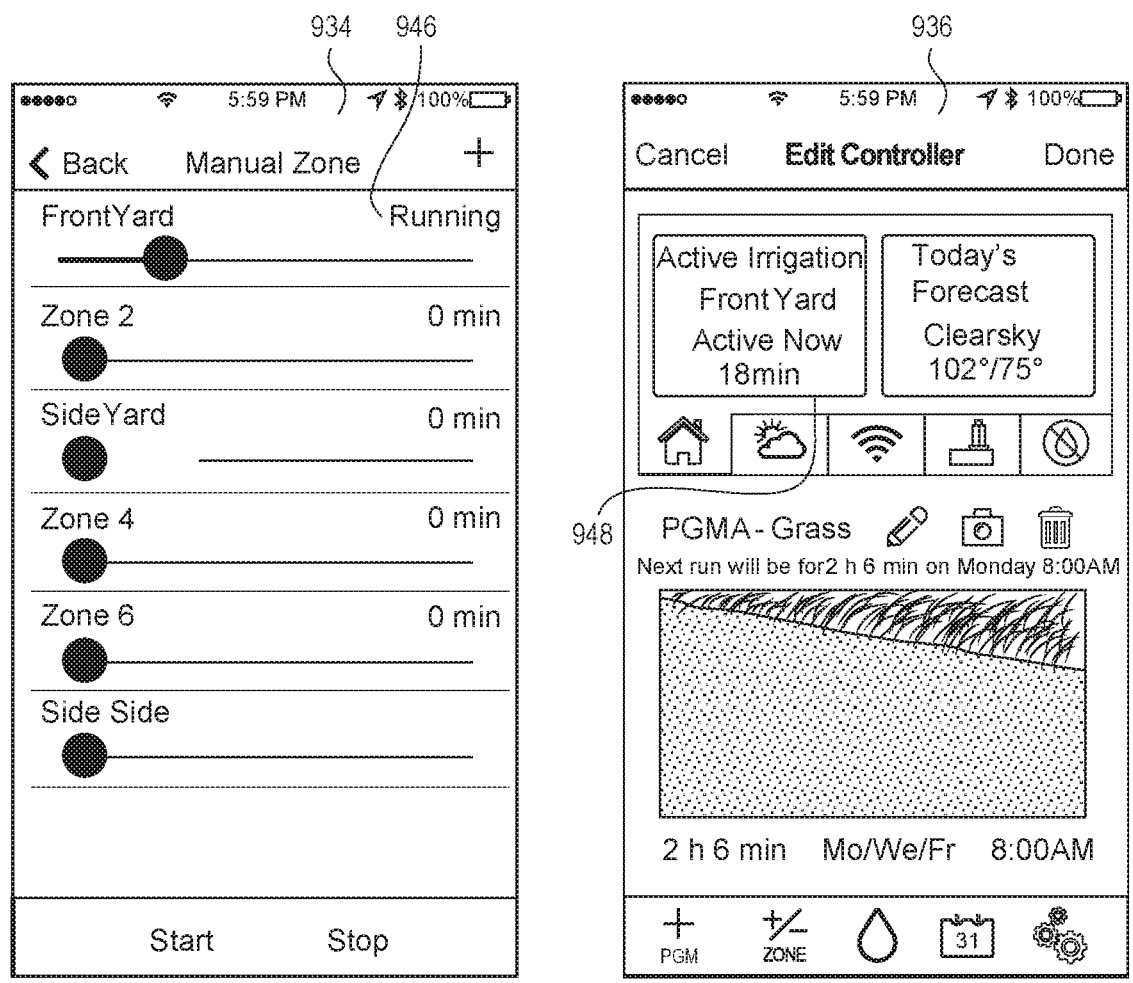

FIG. 9B depicts a GUI 940 in a manual run mode, according to some embodiments. In the manual run mode, the user can select one or more zones to manually run and the duration for which the one or more zones should run. FIG. 9B includes four screens: a first screen 930, a second screen 932, a third screen 934, and a fourth screen 936. The first screen 930 depicts a home screen while no irrigation is occurring. The home screen includes an irrigation indicator 938 that indicates whether any irrigation is currently occurring. As can be seen in the first screen 930, the irrigation indicator 938 indicates that no irrigation is occurring. Because no irrigation is occurring, the irrigation indicator 938 indicates when the next irrigation will occur (if scheduled). From the home screen, the user selects an icon 950 to enter the manual run mode. From the second screen 932, the user can choose zones to irrigate. Additionally, the user can select an irrigation duration. The user can choose zones and select an irrigation duration via the sliders 942. As depicted in the second screen 932, the user has chosen to irrigate a zone named "Front Yard" for 10 minutes. In some embodiments, the GUI 940 presents a processing notification 944 while processing user requests. The third screen 934 results once the irrigation command has been sent. As depicted by activity indicator 946, the manually selected irrigation is running. The fourth screen 936 depicts the home screen when irrigation is occurring. As indicated by the irrigation indicator 948 of the fourth screen 936, the zone named "Front Yard" is active and will remain active for ten minutes.

FIGS. 10A and 10B depict an example graphical user interfaces (GUI) in a calendar display mode, according to some embodiments. FIG. 10A depicts a first GUI 1000 according to a first embodiment. An electronic device (e.g., a mobile device) presents the GUI 1000. The GUI 1000 includes columns 1002, where each column 1002 corresponds to a day, and rows 1008, where each row 1008 corresponds to a time. The GUI 1000 includes three columns 1002 (i.e., for three days), although some embodiments may show greater, or fewer, than three columns 1002. Additionally, in some embodiments, the number of columns 1002 can be user adjustable or vary based on the type of mobile device on which the GUI 1000 is presented. The number of rows 1008, and the time period reflected by each row 1008, can also vary from that depicted in FIG. 10A and/or be user adjustable. Each block in the GUI 1000 represents an irrigation schedule. The blocks can represent different zones or areas and be distinguished by different colors, labels, hashing, or any other indicator. For example, the block 1012 represents a different zone than the block 1010. The GUI 1000 also includes directional arrows 1014 which allow the user to navigate through different days (i.e., present different columns 1002 on the GUI 1000). The GUI 1000 can also include magnification controls 1016 which allow the user to magnify the GUI 1000. In some embodiments, the GUI 1000 can also support gestures and a user can navigate the calendar display mode via the gestures. The gestures can include single touch and multi-touch gestures (swipes, pinches, rotations, etc.). In some embodiments, the GUI 1000 includes a settings control 1018. Selection of the settings control 1018 causes presentation of a settings menu in which the user can adjust setting associated with the application, wireless adapter, and/or irrigation controller.

FIG. 10B depicts a second embodiment of a GUI 1020. Much like the first embodiment of the GUI (depicted in FIG. 10A), the second embodiment of the GUI 1020 includes columns 1022 that represent days, rows 1026 that represent time periods, blocks 1028 and 1030 that represent zones, magnification controls 1032 and directional arrows 1034. The blocks 1028 and 1030 can represent different zones or areas and be visually distinguishable based on the zone or area represented. For example, the block 1028 represents a different zone than the block 1030.

Whether the GUI is of the first embodiment or the second embodiment (or any other type of presentation), the calendar display mode presents a current irrigation schedule. In some embodiments, the calendar display mode is "read only" in that the user cannot modify the irrigation schedule in the calendar display mode, (i.e., the user must navigate to programming screens.

Figure 11A:
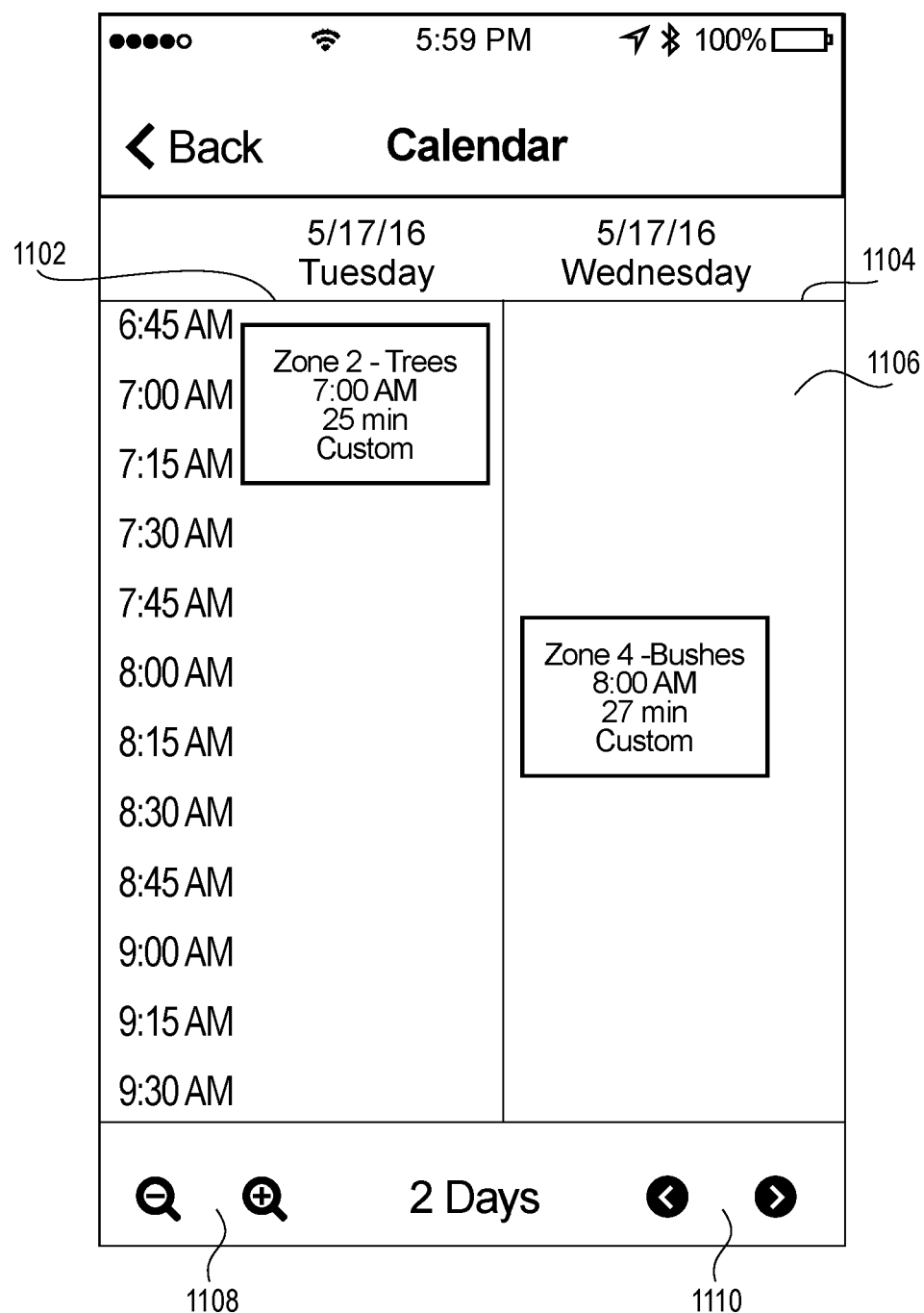
FIG. 11A depicts a GUI 1100 depicting a schedule in a two-day view, according to some embodiments.

FIGS. 11A and 11B depict another embodiment of a calendar display mode. Specifically, FIG. 11A depicts a GUI 1100 presenting an irrigation schedule in a two-day view, according to some embodiments. The GUI 1100 includes two columns, a first column 1102 and a second column 1104. Each column represents a day. The GUI 1100 includes a number of rows 1106. Each row represents a time period. The intersection of the columns and rows 1106 forms cells. The GUI 1100 presents the irrigation schedule within these cells. For example, the GUI 1100 indicates that Zone 2 will be watered for 25 minutes on Tuesday and Zone 4 will be watered for 27 minutes on Wednesday. The cells can include additional information, such as a description of the zone, a start time, and any other detail about the irrigation schedule (e.g., frequency). The GUI 1100 also includes magnification controls 1108 and navigation controls 1110. The magnification controls 1108 can be used to adjust the magnification of the GUI 1100. The navigation controls 1110 can be used to navigate through the irrigation schedule.

FIG. 11B depicts a GUI 1120 presenting an irrigation schedule in a three-day view, according to some embodiments. In a three-day view, the GUI 1120 includes three columns, a first column 1122, a second column 1124, and a third column 1126. The GUI 1120 also include rows 1128 indicating time periods. The columns and rows 1128 intersect to form cells. The irrigation schedule is indicated within the cells. The GUI 1120 also includes magnification controls 1130 and navigation controls 1132. In some embodiments, the magnification controls can be used to change between the two-day view and the three-day view (or any other number-of-day view).

Figure 12:
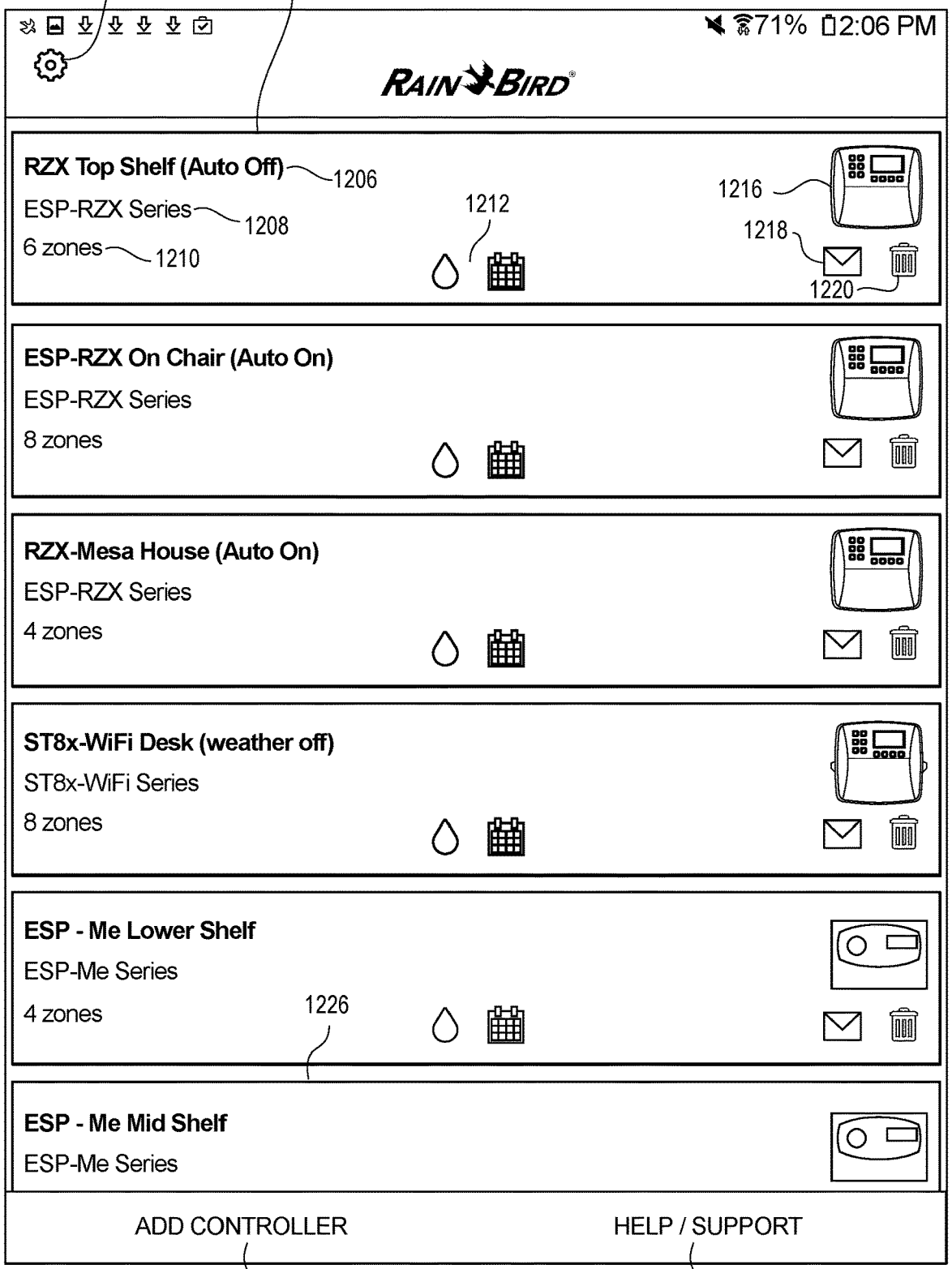
FIG. 12 depicts a home screen of a GUI 1000, according to some embodiments.

FIG. 12 depicts a home screen of a GUI 1200, according to some embodiments. The home screen includes a plurality of cards 1226. Each card 1226 is associated with a device or group of devices. That is, each card 1126 is a visual representation of a device or group of devices. The device(s) can be irrigation controllers or any other suitable devices (e.g., flow meters, lighting controllers, etc.). Because of the ability to present a plurality of cards 1226, the application allows the mobile device to be associated or paired with multiple devices. If a user has only one device associated with the application, the GUI 1200 will only include one card 1226. Each card 1226 indicates the device with which it is associated. For example, the first card 1204 is associated with an irrigation controller having the name "RZX Top Shelf (Auto Off)," as indicated by the name label 1206. The first card 1204 also includes the type 1208 of device represented by the card (i.e., the type of irrigation controller in the example depicted) and any other suitable information associated with the device, such as the number of zones 1210 associated with the irrigation controller, and an image 1216 identifying the irrigation controller, etc., in the case of an irrigation controller. Each card also includes controls to perform actions. For example, the first card 1204 includes controls 1212 for causing the irrigation system associated with the irrigation controller to run and to modify an irrigation schedule for the irrigation controller. Additionally, in some embodiments, the user can select one of the cards 1226 to view more information about the device associated with the card 1226. For example, in the case of an irrigation controller, the controls can allow the user to set and/or modify an irrigation schedule for the irrigation controller, change settings for the irrigation controller and/or wireless adapter, and modify the card (e.g., changing its position on the home screen, renaming the irrigation controller, etc.).

The first card also includes a mail icon 1218 which, upon selection, allows a user to send wireless adapter credentials to themselves, a family member, a friend, a technician or contractor, etc., and a delete icon 1220 which allows the user to remove the first card 1204 from the home screen. In some embodiments, the credentials include an identification of a wireless adapter and a key for the wireless adapter. For example, the credentials can include a media access control (MAC) address and password for the wireless adapter. The home screen also includes a settings icon 1202, an add controller icon 1222, and a help/support icon 1224. In some embodiments, the application allows the user to pair or associate devices other than irrigation controllers with the mobile device. For example, the mobile device can be paired with weather stations, flow meters, thermostats, security systems, or any other Internet-connected devices. In such embodiments, the GUI 1200 presents cards for the other devices (i.e., devices other than irrigation controllers) and the user can access and/or control the other devices via the application on the mobile device.

Each card 1226 contains the information necessary for the application to render the GUI when the card is selected. That is, while the card 1226 is presented to the user as a visual icon or representation, the card 1226 is a container having information or data stored in memory as a data structure. The data stored in the data structure can include graphical elements, associations, organizational parameters, configurations parameters, etc. Additionally, the data structure includes the information required to access the wireless adapter (e.g., the credentials for the wireless adapter). For example, each card contains details about the device associated with the card 1226, formatting instructions for a display associated with the card 1226, etc. In some embodiments, the actual irrigation programming parameters are not stored with or connected with the card. For example, the irrigation controller itself stores all programming parameters. When the user activates the mobile application and selects a card, the mobile application retrieves the information from the card to allow the application to connect to the wireless adapter and controller using the mobile device, and it retrieves the currently programmed scheduling parameters that are displayed in the mobile application (such as shown in FIGS. 6-7C). These parameters are stored in temporary memory of the mobile device such that they can be displayed, but these parameters are not stored in connection with the card in the memory of the mobile device. In other embodiments, the card may be configured to contain or point stored programming parameters on the mobile device.

In some embodiments, the application also allows the user to change the order with which the cards 1226 are presented in the GUI 1200. For example, the user can drag and drop the cards 1226 to reorder the cards 1226. In some embodiments, the cards 1226 may allow the user to more easily organize and find irrigation controllers. In a further embodiment, the application can automatically reorder the cards 1226 based on use. For example, the application can reorder the cards 1226 in the GUI 1200 so that the most frequently used cards are presented near the top. The application may allow a user to disable such an automatic reordering feature.

Figure 13:
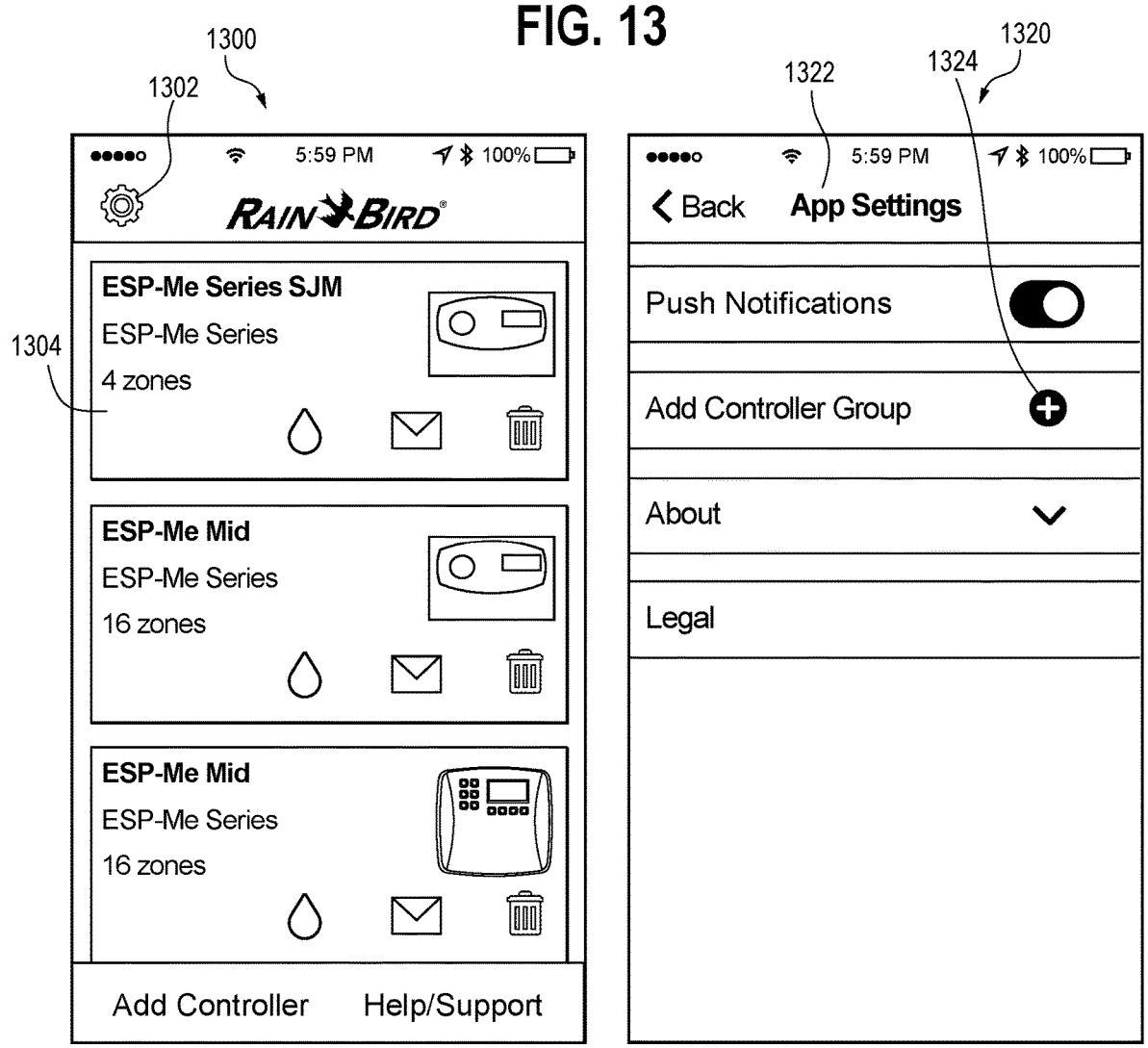
FIGS. 13-15 depict creating groups of irrigation controllers via a GUI, according to some embodiments.
Figure 14:
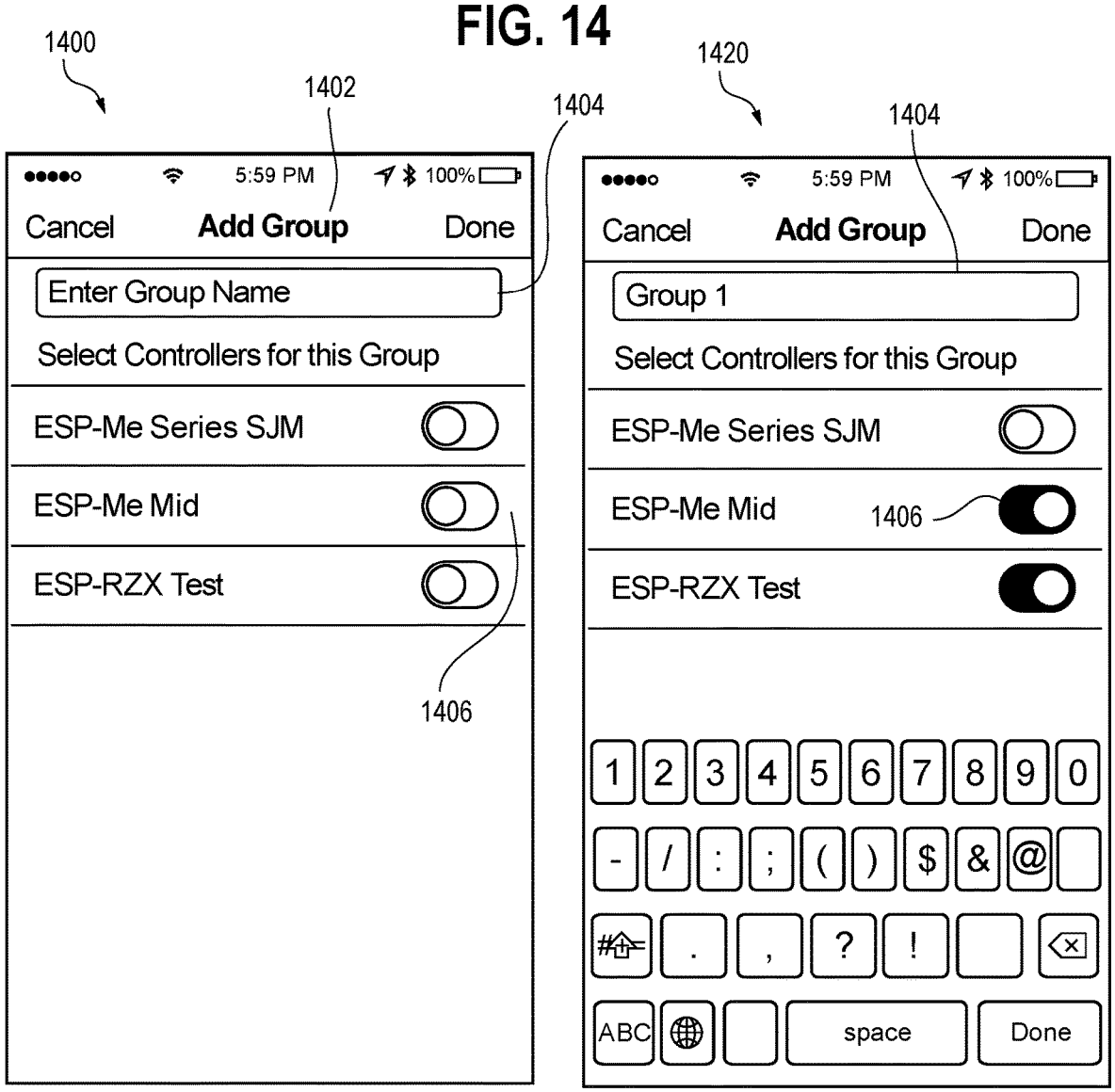
Figure 15:
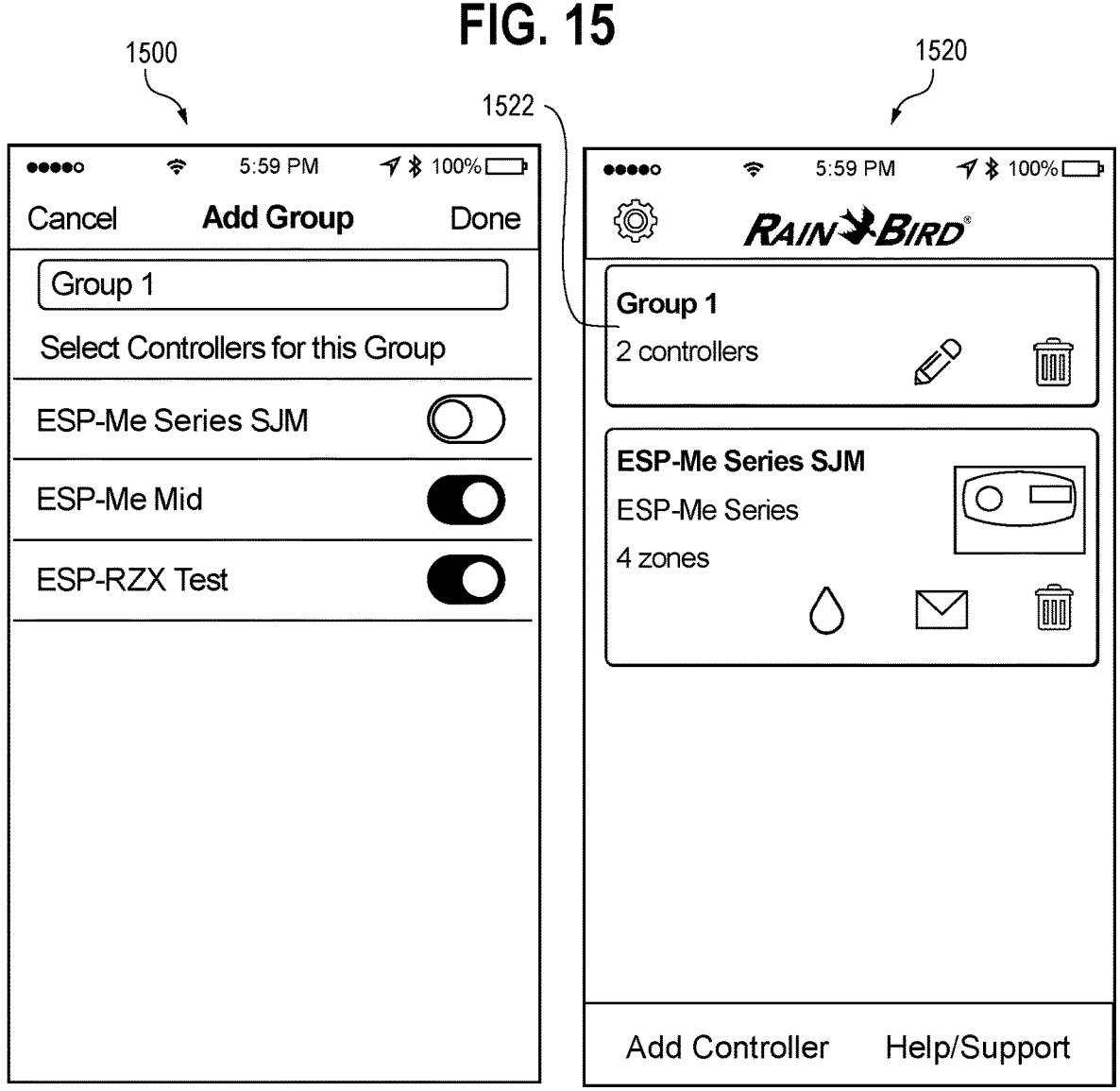

FIGS. 13-15 depict creating and saving groups of irrigation controllers via a GUI, according to some embodiments. While the example provided in FIGS. 13-15 is directed towards irrigation controllers, similar operations can be performed to create and save groups of devices of any suitable type. Additionally, it is not required that all devices in a group be of the same type. For example, a group can include an irrigation controller, a lighting controller, and a flow meter. As discussed with respect to FIG. 12, irrigation controllers are represented as cards. In some embodiments, a group of irrigation controllers can be represented by a card. For example, if a user has two irrigation controllers at his/her home and two irrigation controllers at his/her lake house, the user can group the two irrigation controllers at his/her home into a first group and the two irrigation controllers at his/her lake house in a second group. The user can create, and save, these groups on a mobile device. As another example, a contractor may manage irrigation controller for several homes in a subdivision. The contractor can place all irrigation controllers associated with homes in the subdivision in a group. When in a group, all of the irrigation controllers associated with the group are represented by a single card. FIG. 13 depicts a first screen 1300 for an irrigation system which includes three irrigation controllers (i.e., "ESP-ME Series SJM," "ESP-Me Mid," and "ESP-RZX Test"). Each irrigation controller is represented by a separate card 1304. None of the irrigation controllers have been grouped together. The first screen 1300 also includes a settings button 1302. Upon selection of the settings button 1302, the GUI presents a settings menu. A second screen 1320 depicts an example settings menu. The settings menu includes a button 1324 that allows a user to add or create a controller group. Selection of the button 1324 causes the GUI to present an add group menu 1402. A third screen 1402 of FIG. 14 depicts an example add group menu 1402. The add group menu 1402 includes an entry area 1404 and toggles 1406 associated with irrigation controllers of the irrigation system. The user can enter a name for the group via the entry area 1404, as depicted in a fourth screen 1420. In the example provided, the user has named the group "Group 1." The user has also selected the toggles 1406 associated with the irrigation controllers named "ESP-Me Mid" and "ESP-RZX Test." The result of this action is depicted in a fifth screen 1500 of FIG. 15. The fifth screen 1500 indicates that the user would like to group the irrigation controllers named "ESP-ME Mid" and "ESP-RZX Test" into a group called "Group 1." After completion of the operations described above, the GUI now includes a card for "Group 1" and a card for the irrigation controller named "ESP-Me Series SJM," as depicted in a sixth screen 1520. In some embodiments, the user can apply a command to all irrigations controllers in a group. For example, a contractor could set a rain delay for all irrigation controllers in a group. Other examples of commands can include a command to place all controllers in the group into a winter mode, e.g., transitioning the controllers from auto mode to OFF mode, and vice versa. In program based controllers, commands can be sent to adjust a given program, and any controller executing that program will implement the command. A controller in the group that is not program-based will ignore that command.

Many irrigation controller groupings can be configured in the application based on different needs. As one example, a contractor can assign projects to employees by transferring credentials for a group of irrigation controllers. The contractor can place all of the irrigation controllers in a group and transmit the group of credentials to the employee's device. In some embodiments, the credentials include access rights. The access rights can be based on time periods, days of the week, locations, etc. and restrict access to one or more of the irrigation controllers based on the access rights. In some embodiments, the cards in the group of irrigation controller can be automatically arranged for the employee. For example, the application can determine locations for each irrigation controller in the group and arrange the cards based on their locations. Further, the employee can mark the cards as "complete" after the employee has completed all tasks associated with the card.

In some embodiments, the user can add notes, names, and/or pictures to a group of irrigation controllers. The user can transmit the notes, names, and/or pictures as part of the credentials for the irrigation controllers in the group. Additionally, in some embodiments, different mobile devices that are associated with the wireless adapter can have different notes, names, and/or pictures for groups of irrigation controllers or individual irrigation controllers. For example, a contractor can name a zone differently than the user, associate a different picture with the zone than the user, etc.

Figure 16:
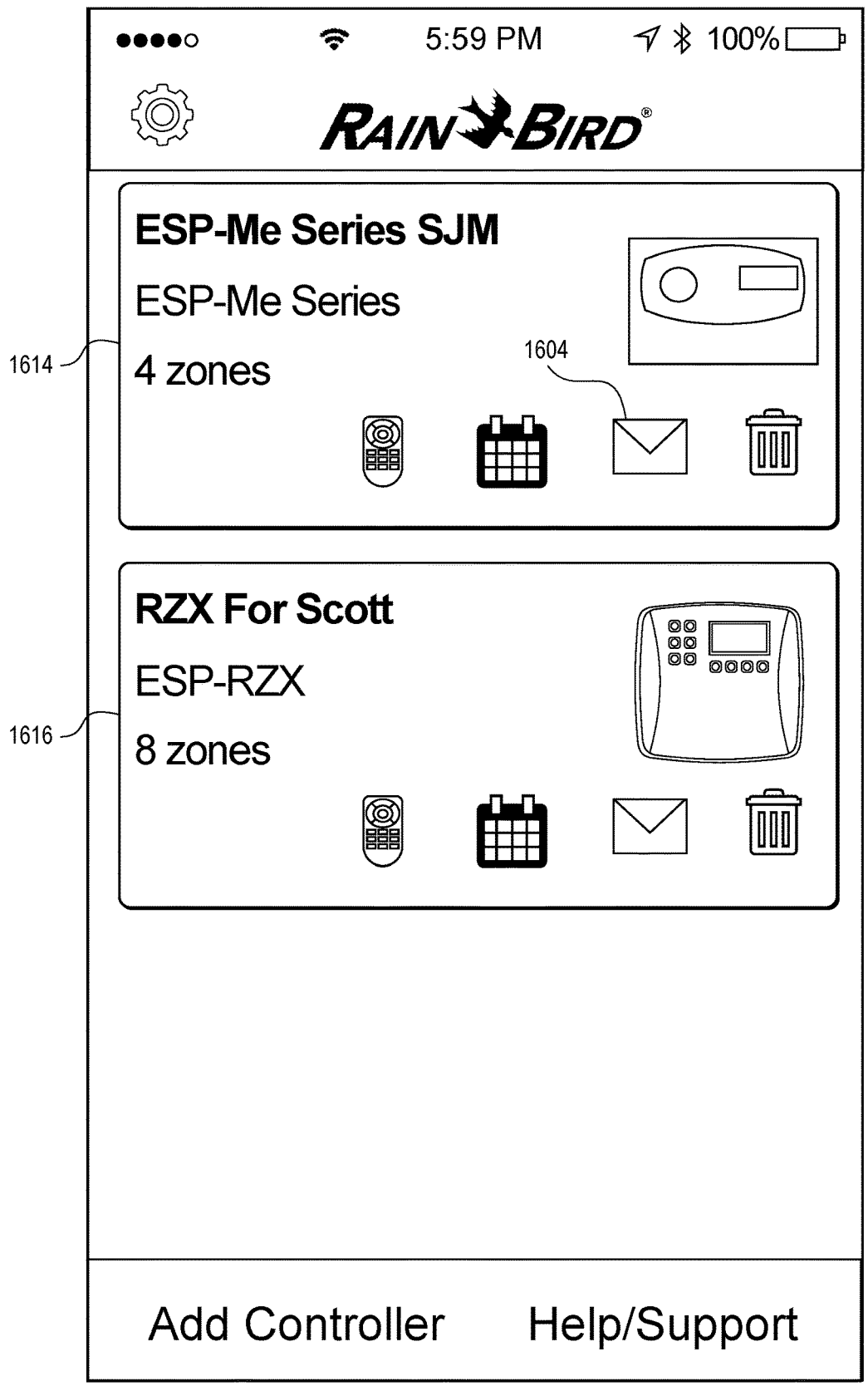
FIG. 16 depicts a GUI 1600 for sending irrigation controller credentials, according to some embodiments.

FIG. 16 depicts a GUI 1600 for sending irrigation controller credentials, according to some embodiments. While the example provided in FIG. 16 refers to sending irrigation controller credentials, it should be understood that credentials for other types of devices can be sent using similar operations. In some embodiments, the application allows a user to send credentials for his/her irrigation controller to another device. Such sending of credentials allows the user to allow another person to access his/her irrigation controller quickly and easily.

The application creates a file that includes the credentials for the irrigation controller (e.g., an irrigation controller identifier, password, etc.). The user can then transmit the file to another device, such as a friend's mobile device or a contractor's mobile device. The receiving mobile device can then use the credentials to access the user's irrigation controller. In some embodiments, the application encrypts the irrigation controller credentials. Additionally, in some embodiments, the application (on the receiving mobile device) does not present the credentials. In such embodiments, the friend or contractor will not have access to the password or other irrigation controller credentials.

The GUI 1600 depicts one example of a user interface presented by the application for sending irrigation controller credentials. The GUI 1600 includes two cards, a first card 1614 and a second card 1616. Each of the cards is associated with an irrigation controller. The first card 1614 is associated with an irrigation controller named "ESP-ME Series SIM" and the second card 1616 is associated with an irrigation controller named "RZX For Scott." A user can transmit credentials for the irrigation controller associated with the first card 1614 by selecting a mail icon 1604. Upon selection of the mail icon 1604, the application prepares a file including credentials for the irrigation controller named "ESP-ME Series SIM." For example, the file is transmitted to a receiving mobile device as a card, similar to the first card 1614. That is, when the file is opened on the receiving mobile device, it is presented in a manner similar to that in which the first card 1614 is presented. In some embodiments, selection of the mail icon 1604 causes the mobile device to open a messaging application (e.g., an email application, a text message application, etc.). The messaging application creates a message that is populated with the file. In other embodiments the file is transmitted via the application.

In some embodiments, in the event that the user wishes to prevent the friend or contractor from being able to access the user's irrigation controller, the user can simply change the password from his/her mobile device. In such embodiments, changing the password does not cause the application to transmit to the new password to the receiving device. Consequently, once the user changes the password, the friend or contractor will no longer have access to the user's irrigation controller.

As an additional security feature, in some embodiments access to an irrigation controller may "expire" after a period of time or the occurrence of an event. For example, the person to whom the credentials are sent may no longer be able to access the irrigation controller after twenty-four hours. That is, the access "expires" after twenty-four hours. Additionally, or alternatively, the access may expire after the occurrence of an event (e.g., after a contractor addresses an issue or visits the user's home). The user can set the condition (for example the time period or occurrence of the event) upon which the access will expire. Additionally, or alternatively, the application may have default settings for when the access will expire. In some embodiments, these default conditions can be based on the identity of a recipient. For example, if the recipient is a contractor, the access, by default, may expire after the contractor visits the property. However, in some embodiments the user can modify or alter this default, for example, so that the access expires after the contractor visits the property twice. In some embodiments, access to irrigation controllers is managed by a remote server. When the user sends the credentials to, for example, a guest, a token is created on the server. The token can indicate a time, or the occurrence of an event, upon which the access will expire. When the guest attempts to access the wireless adapter via the credentials, the request goes through the remote server (i.e., the guest's mobile device attempts to communicate with wireless adapter via the remote server). Before the remote server relays communications between the guest's mobile device and the wireless adapter, the remote server examines the token to see if the token has expired. If the token has expired, the remote server will not allow communications between the guest's mobile device and the wireless adapter.

An additional benefit of sending credentials for a wireless adapter is that a contractor will be able to easily access specifics of the user's irrigation system. For example, if the user sends credentials for his/her irrigation system to a contractor, the contractor will have a card (e.g., the first card 1614) on his/her device for the user's irrigation system. The card can contain diagnostic information and information regarding components used in the user's irrigation system. If the user contacts the contractor and indicates that he/she is having problems with, for example, Zone 3 of his/her irrigation system, the contractor can access the card associated with the user's irrigation controller and quickly identify what components Zone 3 of the user's irrigation system utilizes. This may help the contractor diagnosis the problem and/or allow the contractor to bring the correct components to the user's home, increasing the efficiency of repairs.

In some embodiments, the application includes location functionality that can leverage the GPS functionality of the mobile device. A user can create a map of an irrigation system using this location functionality. For example, the user can stand near components of the irrigation system and mark the location of the components. The GUI can include a map and a "pin" button. When the user is near a component, the user can pin the location to the map. The user can then enter a title or description (e.g., manually or from a list of prepopulated titles or descriptions) of the component. The application can aggregate all of the components as they are marked by the user and create and map of the user's irrigation system based on the components. Additionally, in some embodiments, a user can transmit this map to another user, such as a friend or contractor. The mobile device can transmit the map, or the map coupled with the credentials for the user's wireless adapter. The receiving mobile device can download the map and present the map to the friend or the contractor via the application. In some embodiments, the application can also provide directions to the components based on the map. For example, the application can provide a direction, distance, heading, route, etc. that should be followed to locate the component.

Figure 18:

FIGS. 17-18 depict enabling and disabling zones of an irrigation system via a GUI, according to some embodiments. Many irrigation controllers have the ability to control a greater number of zones than a user's irrigation system includes. For example, an irrigation controller may have the ability to separately control twenty-two zones, but the user's irrigation system includes only five zones (i.e., only five zones are wired at the irrigation controller). The application includes functionality that allows the user to hide or otherwise prevent presentation of the unused zones. FIG. 17 depicts an example GUI 1500 for hiding one or more zones. The GUI 1700 includes rows 1718 for each zone that the irrigation controller is capable of supporting. Each row 1718 includes a switch 1720 that toggles presentation of an associated zone on and off. As depicted in FIG. 17, the user has selected Zone 1 1702, Zone 3 1710, Zone 5 1712, Zone 6 1714, and Zone 7 1716 to be presented by the application. Accordingly, the "Edit Program" GUI 1800 presented in FIG. 18 includes only the zones selected by the user in the zones section 1808 of the GUI 1800. In some embodiments, the GUI 1700 may present icons next to zones that are active/wired or automatically hide zones that are inactive/unwired. These features allow a user to simplify the "Edit Program" GUI 1800 by eliminating inactive/unwired zones. Via the "Edit Program" GUI 1800, the user can also change settings for a seasonal adjust (i.e., whether the irrigation schedule will account for season adjust values) with a seasonal adjust switch 1810, as well as adjust the seasonal adjust using the slider 1804. The user can also set run times for each zone with the slider 1806 of the "Edit Program" GUI 1800.

In some embodiments, the GUI 1800 depicts both a programmed run time and an adjusted run time, the adjusted run time based on a weather or seasonal adjust. The GUI 1800 depicts an adjustment of 45%. An adjustment of 45% causes the zones to run for 45% of the programmed run time. For example, Zone 1 is programmed to run for 40 minutes. Because of the adjustment of 45%, Zone 1 will now only run for 18 minutes (i.e., 45% of the 40 minute programmed run time). The GUI 1800 the programmed run time for Zone 1 as well as the adjusted run time based on the 45% adjustment. While the example described above refers to a scale in which an adjustment of 100% would cause irrigation to occur for the entire programmed run time and an adjustment of 0% would cause irrigation not to occur, run times can be similarly adjusted when different scales are used. For example, a scale could range from 0% to 200%, where 0% cause no irrigation to occur, 100% causes irrigation to occur for the entire programmed run time, and 200% causes irrigation to occur for twice the programmed run time.

In some embodiments, the GUI 1800 includes the ability for the user to adjust all zones (or all active/wired zones) without having to adjust each zone individually (a "global adjust"). In such embodiments, the GUI 1800 includes a global adjust adjustment (not shown), such as a slider, dial, or other input mechanism. The user can adjust the global adjust adjustment to quickly and easily adjust the duration of all zones. Additionally, in some embodiments, the user can adjust the zones of all irrigation controllers (e.g., all irrigation controllers in a group—as discussed with reference to FIGS. 13-15, all irrigation controller associated with the mobile device, etc.) with a similar global adjust type mechanism.

Figure 19:
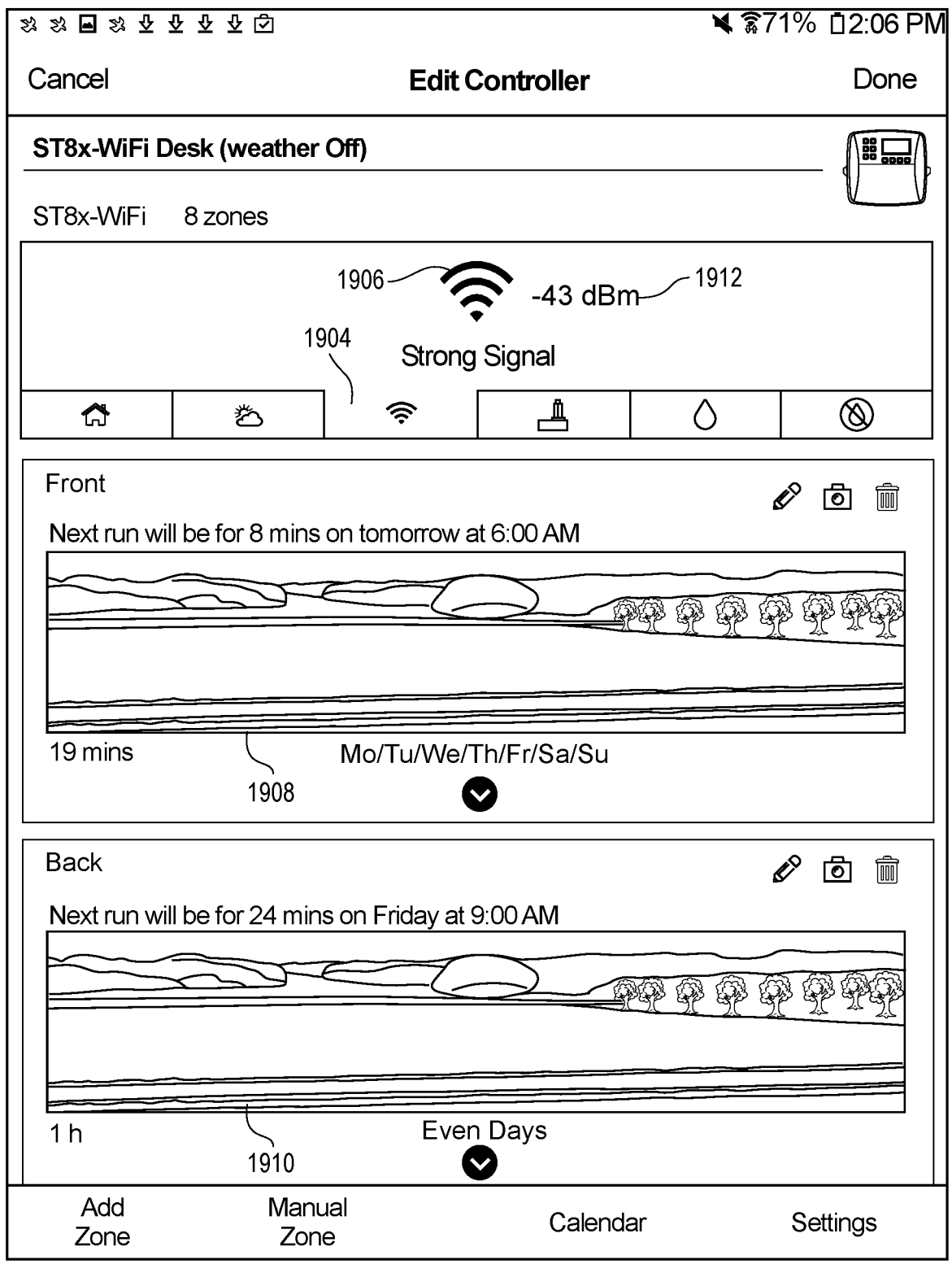
FIG. 19 depicts a GUI 1900 indicating signal strength of a wireless connection for an irrigation controller, according to some embodiments.

FIG. 19 depicts a GUI 1900 indicating signal strength of a wireless connection for an irrigation controller, according to some embodiments. Users could possibly have difficulty configuring the wireless adapter based on connectivity issues between the wireless adapter and the user's home network. In some cases, the connectivity issues are related to how far the irrigation controller is from an access point in the user's home network. In some embodiments, the application includes a network signal strength indicator 1906 (e.g., a Wi-Fi signal strength indicator). For example, the application can include an "Edit Controller" GUI 1900 that, among other things, includes a network tab 1904. Upon selection of the network tab 1904, the GUI 1900 presents the network signal strength indicator 1906. The network signal strength indicator 1906 represents the strength of the signal as determined by the wireless adapter. This value is transmitted from the wireless adapter to the application of the mobile device, and then displayed as indicator 1906. In troubleshooting connection issues, it may be helpful for the user of the mobile device to see the signal strength from the perspective of the wireless adapter. For example, the wireless signal strength received at the mobile device may be adequate, but the irrigation controller and wireless adapter are located such that the signal strength they receive is considerably less (e.g., there is interference, shielding or the controller is at the edge of network range). Further, in some embodiments, information regarding the signal strength of the wireless connection can be included in addition to, or in lieu of, the signal strength indicator 1906. For example, the GUI 1900 can present a received signal strength indicator (RSSI) value 1912.

Figure 20:
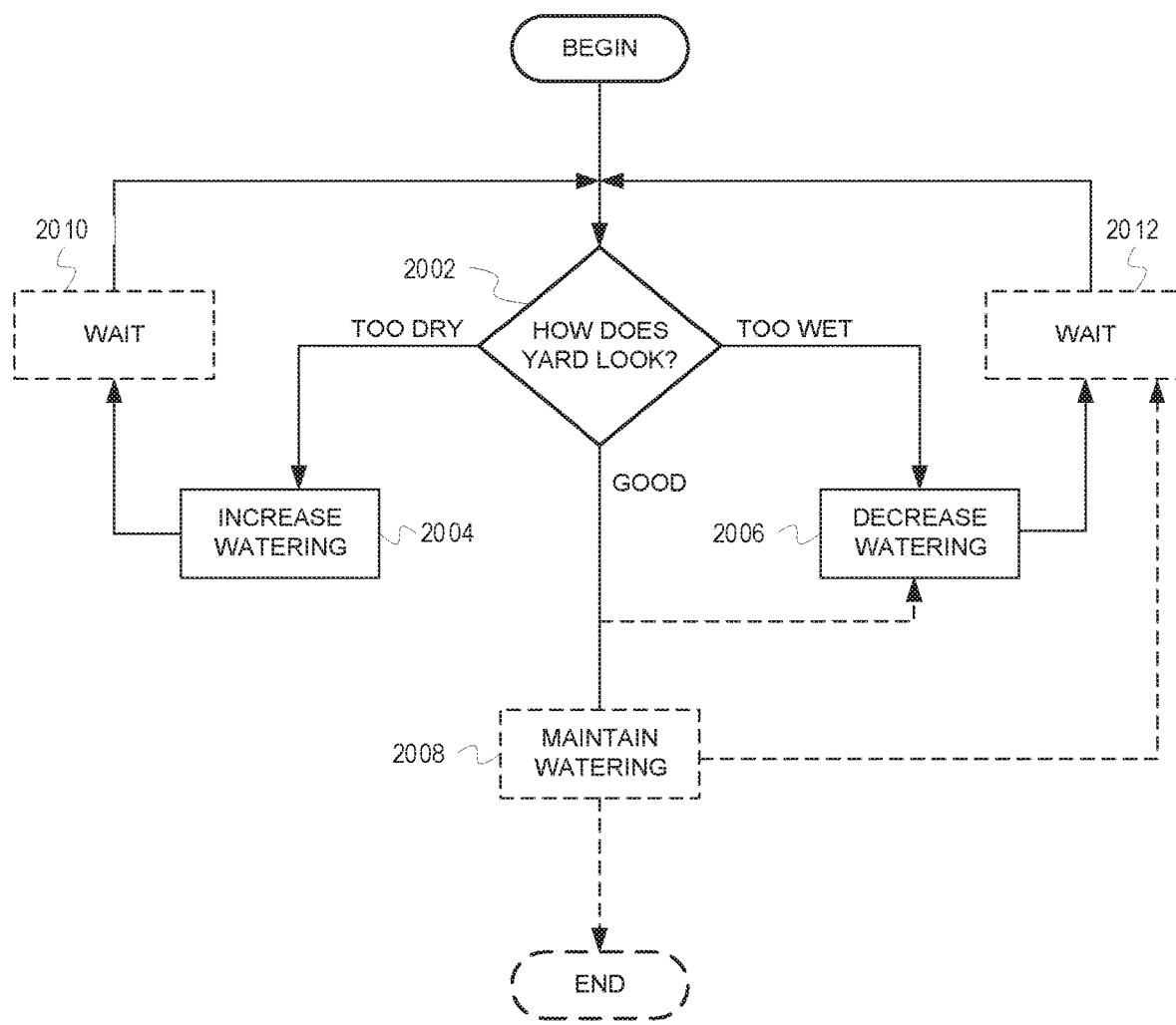
FIG. 20 is a flow chart depicting example operations for determining a duration for irrigation, according to some embodiments.

FIG. 20 is a flow chart depicting example operations for determining a duration for irrigation, according to some embodiments. The flow begins at decision diamond 2002.

At decision diamond 2002, a user is asked about the current state of his/her yard (or other property being irrigated). For example, the application, via a mobile device, can present a prompt to the user asking him/her about the current state of his/her yard and/or the irrigation duration. In some embodiments, the application asks the user "how does your yard look?" and prompts the user to answer "too dry," "too wet," or "good." In other embodiments, the application can prompt the user to rate the look of his/her yard based on a scale, whether continuous (e.g., a slider with seemingly limitless resolution of adjustability) or discrete (e.g., a specific number of responses, categories, numbers, etc.). In either embodiment, the application receives user input and determines, based on the user input, whether to increase or decrease watering. If the user indicates that the watering is insufficient (e.g., the yard is "too dry"), the flow continues at block 2004. If the user indicates that the watering is excessive (e.g., the yard is too "wet"), the flow continues at block 2006. If the user indicates that the watering acceptable (e.g., the yard looks "good"), the flow can either 1) continue at block 2008 or 2) continue at block 2006.

At block 2004, the application instructs the irrigation controller (e.g., via a wireless adapter) to increase the watering duration. If the prompt at decision diamond 2002 was simply whether the yard was too dry or too wet, the application can determine an amount between previous watering durations for which the application has feedback (or if there is no prior feedback, select a new duration based on any suitable factors). If the prompt requested a response on a scale, the application can determine to increase the watering duration based on the magnitude of the user's response (e.g., if the user responds that the yard was "extremely dry," the application can increase the watering duration a greater amount than if the user responds that the yard is "slightly dry"). After increasing the watering duration, the flow continues at decision diamond 2002. In some embodiments, the flow can proceed to block 2010 before continuing to decision diamond 2002. In such embodiments, the application can wait for a duration of time before again querying the user as to the condition of his/her yard. For example, the application can wait until after a number of irrigation cycles, days, etc.

As previously discussed, if the user indicates that the watering is excessive at decision diamond 2002, the flow continues at block 2006. At block 2006, the application instructs the irrigation controller to decrease the watering duration. If the prompt at decision diamond 2002 was simply whether the yard was too dry or too wet, the application can determine an amount between previous watering durations for which the application has feedback (or if there is no prior feedback, select a new duration based on any suitable factors). If the prompt requested a response on a scale, the application can determine to decrease the watering duration based on the magnitude of the user's response (e.g., if the user responds that the yard was "extremely wet," the application can decrease the watering duration a greater amount than if the user responds that the yard is "slightly wet"). After decreasing the watering duration, the flow continues at decision diamond 2002. In some embodiments, the flow can proceed to block 2012 before continuing to decision diamond 2002. In such embodiments, the application can wait for a duration of time before again querying the user as to the condition of his/her yard. For example, the application can wait until after a number of irrigation cycles, days, etc.

As previously discussed, if the user indicates that the watering is acceptable at decision diamond 2002, the flow can either 1) continue at block 2008 or 2) continue at block 2006.

In a first embodiment, the flow continues at block 2008 and the watering duration is maintained. From block 2008, the flow can either end (i.e., the optimum duration for irrigation has been achieved and the application no longer queries the user) or proceed to block 2012. At block 2012, the application waits for a duration of time before again querying the user as to the condition of his/her yard.

In a second embodiment, the flow continues at block 2006, where the application instructs the irrigation controller to decrease the watering duration. Additionally, the flow can proceed to block 2012 before continuing to decision diamond 2002. In such embodiments, the application waits for a duration of time before again querying the user as to the condition of his/her yard. Although the user indicated that the watering was acceptable, the user may be satisfied with slightly decreased water and/or may not notice that the watering was decreased from the previous level that he/she indicated as acceptable. Assuming that the user once again indicates that the watering is acceptable after the decreases, the process can continue until the user indicates that the watering is insufficient. The application can then increase the watering slightly until the user again indicates that the watering is acceptable. The application can continue this process in an effort to determine a minimum amount of watering that the user will find acceptable in an effort to minimize utility usage (e.g., water, electricity, etc.).

Figure 21:
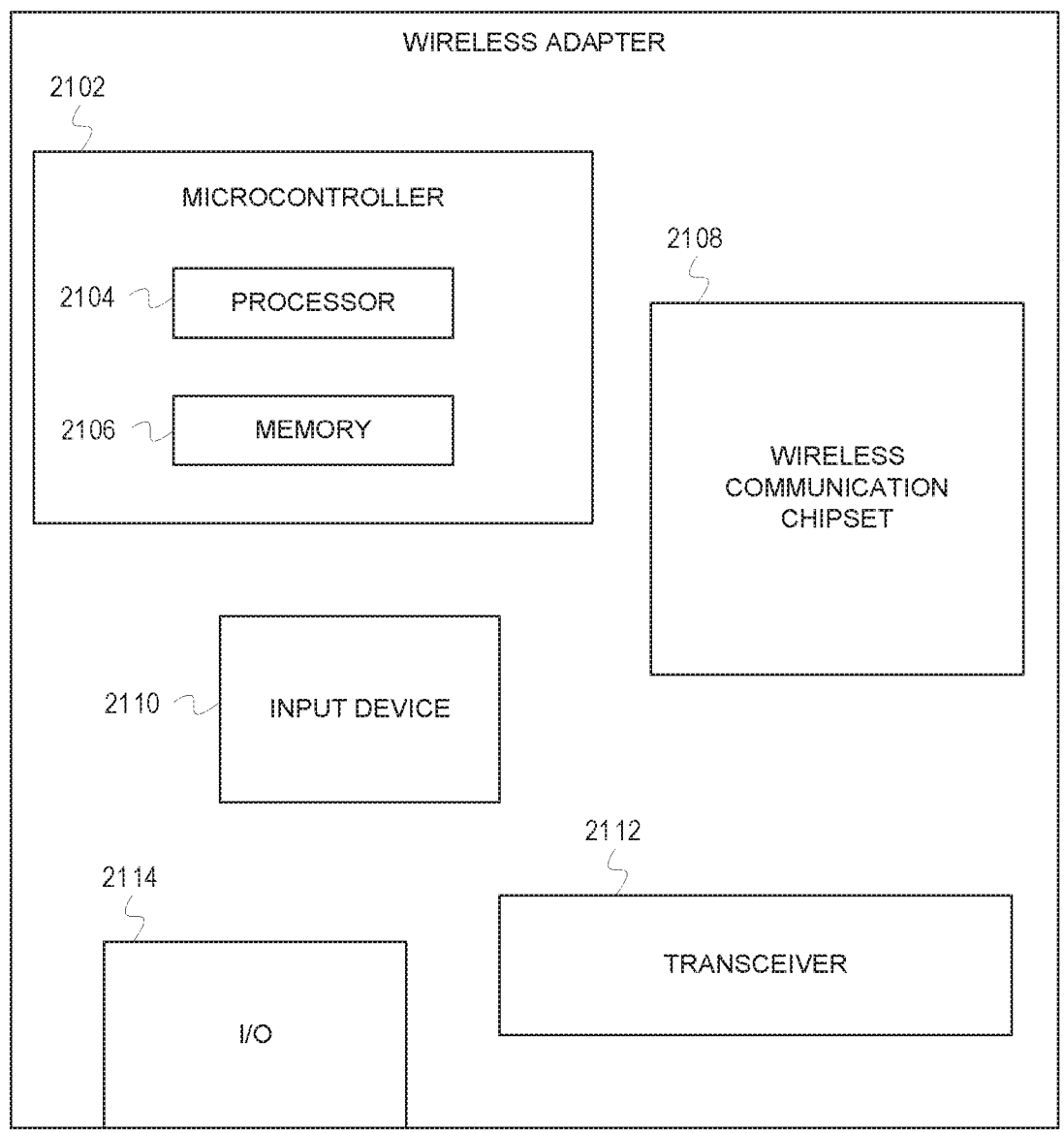
FIG. 21 depicts a block diagram of an example wireless adapter 2100.

FIG. 21 is a block diagram of an example wireless adapter 2100. The wireless adapter 2100 includes a microcontroller 2102, a wireless communication chipset 2108, an input device 2110, a transceiver 2112, and an input/output (I/O) mechanism 2114. The microcontroller 2102 includes a processor 2104 and memory 2106. The processor 2104 executes code and provides commands to other components of the wireless adapter 2100. The wireless communication chipset 2108, via the transceiver 2112, allow the wireless adapter 2100 to communicate wirelessly. The wireless communication chipset 2108 can be of any suitable type, such as a Wi-Fi chip, an NFC chip, a Bluetooth chip, etc. The wireless adapter 2100 communicates with an irrigation controller via the I/O mechanism 2114. For example, the I/O mechanism 2114 can be a connector that facilitates a physical connection between the wireless adapter 2100 and the irrigation controller. In some embodiments, the wireless adapter 2100 can also include an input device 2110. The input device 2110 can be a hard or soft button. The input device 2110 allows a user to interact with the wireless adapter 2100. For example, the user can press the input device 2110 to force the wireless adapter 1900 to operate in a "local only" mode or allow the wireless adapter 2100 to pair with a mobile device.

Figure 22:
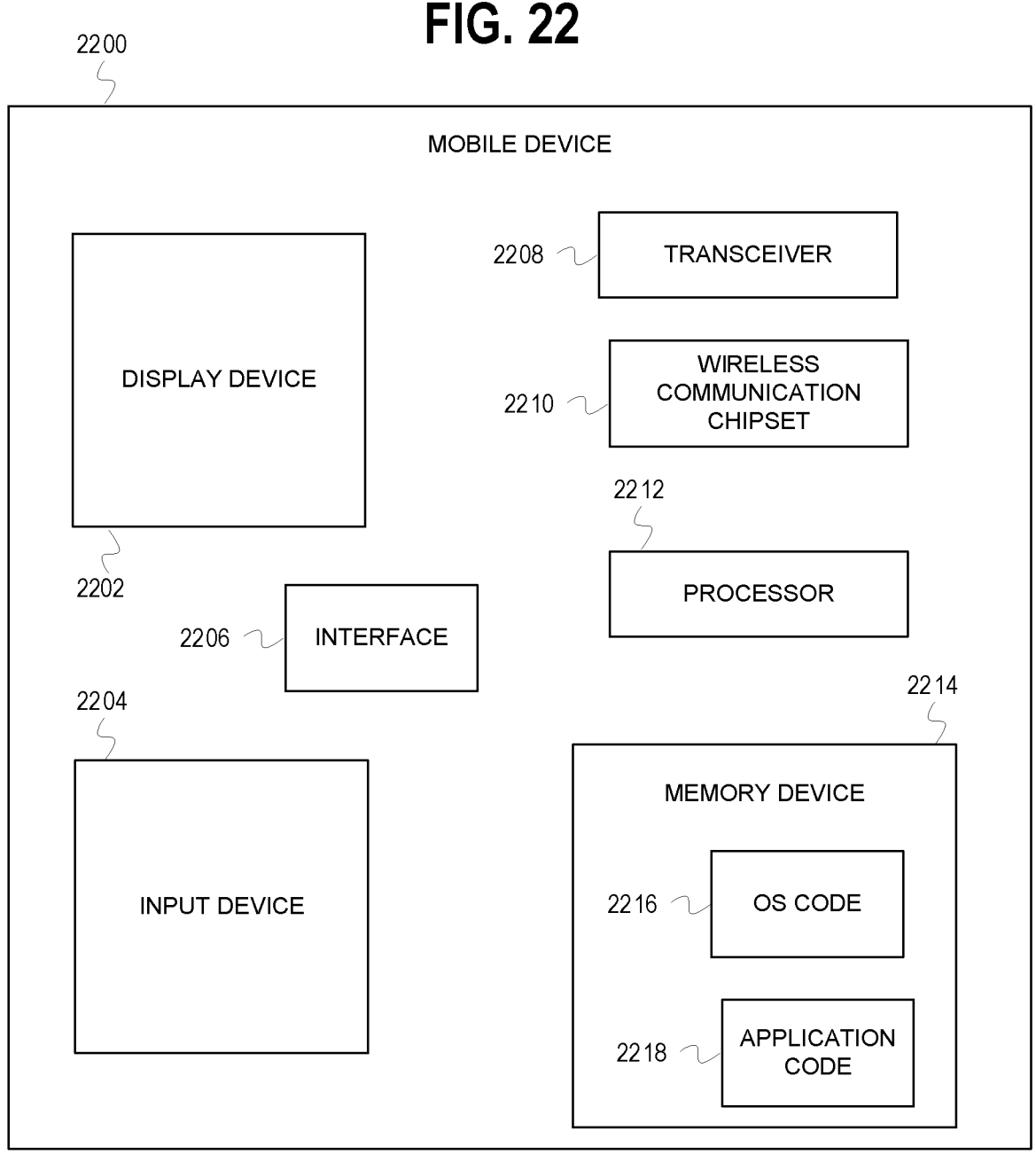
FIG. 22 depicts a block diagram of a mobile device 2200, according to some embodiments.

FIG. 22 depicts a block diagram of a mobile device 2200, according to some embodiments. The mobile device 220 includes a display device 2202, an interface 2206, an input device 2204, a transceiver 2208, a wireless communication chipset 2210, a processor 2212, a and a memory device 2214. Although FIG. 22 depicts the display device 2202 and the input 2204 as distinct components, this is not required. For example, the display device 2202 and the input device 2204 can be integrated into a signal device receiving input and presenting output, such as a touchscreen. The memory device 2214 contains software, such as operating system code 2216 and application code 2218.

The display device 2202 presents the user interface for the application (e.g., based on the application code). The input device 2204 received user input via the user interface, and provides the user input, in the form of commands, to the application. The processor 2212 executes code (e.g., the operating system code 2216 and the application code 2218) and provides commands to other components of the mobile device 2200. The wireless communication chipset 2210, via the transceiver 2208, allow the mobile device 2200 to communicate wirelessly. Specifically, the mobile device 2200 can communicate wirelessly with the wireless adapter, or any other wireless devices (e.g., access points, alarm systems, home theatre systems, etc.). The wireless communication chipset 2208 can be of any suitable type, such as a Wi-Fi chip, an NFC chip, a Bluetooth chip, etc.

Figure 23:
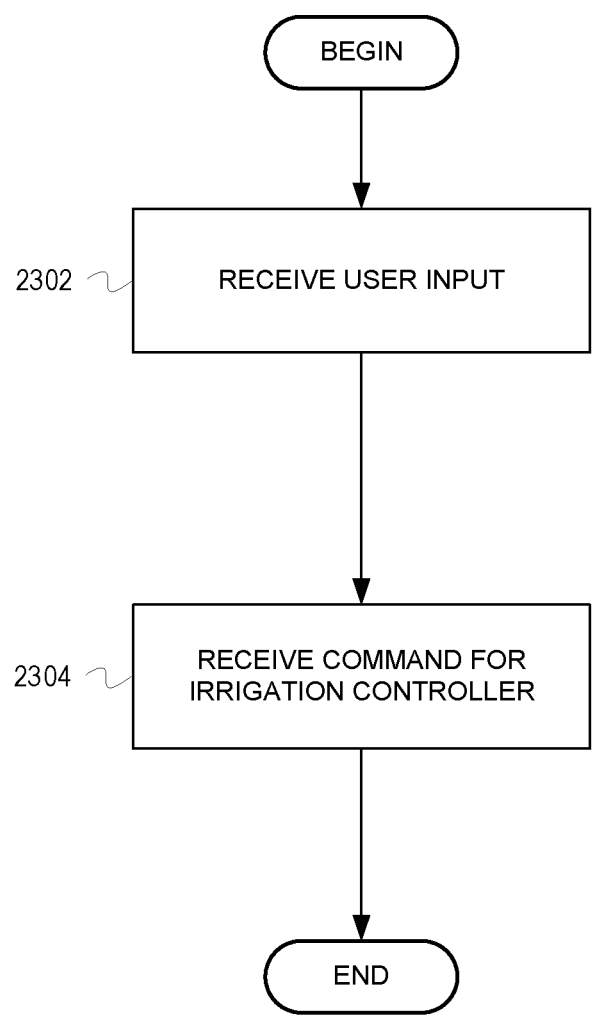
FIG. 23 is a flow chart depicting example operations for receiving commands for an irrigation controller, according to some embodiments.

FIG. 23 is a flow chart depicting example operations for receiving commands for an irrigation controller, according to some embodiments. The flow begins at block 2302.

At block 2302, user input is received. For example, user input is received at a mobile device. The user input can be received at the mobile device via a user interface associated with an irrigation control application. The user input indicates a command for an irrigation controller. The command can cause irrigation to occur, stop irrigation from occurring, change a program, create a card, send credentials, lock a panel of an irrigation controller, query components of an irrigation system, etc. The flow continues at block 2304.

At block 2304, the command for the irrigation controller is received. For example, the command for the irrigation controller can be received from the mobile device. The command for the irrigation controller can be received from the mobile via one of three communications modes: 1) a direct communication mode, in which the mobile device communicates directly with the wireless adapter, 2) a first indirect communication mode, in which the mobile device communicates directly with the access point and the mobile device is within the coverage area of a first local area network, and 3) a second indirect communication mode, in which the mobile device communicates with the access point via a wide area network and the mobile device is outside of the coverage area of the first local network.

Figure 24:
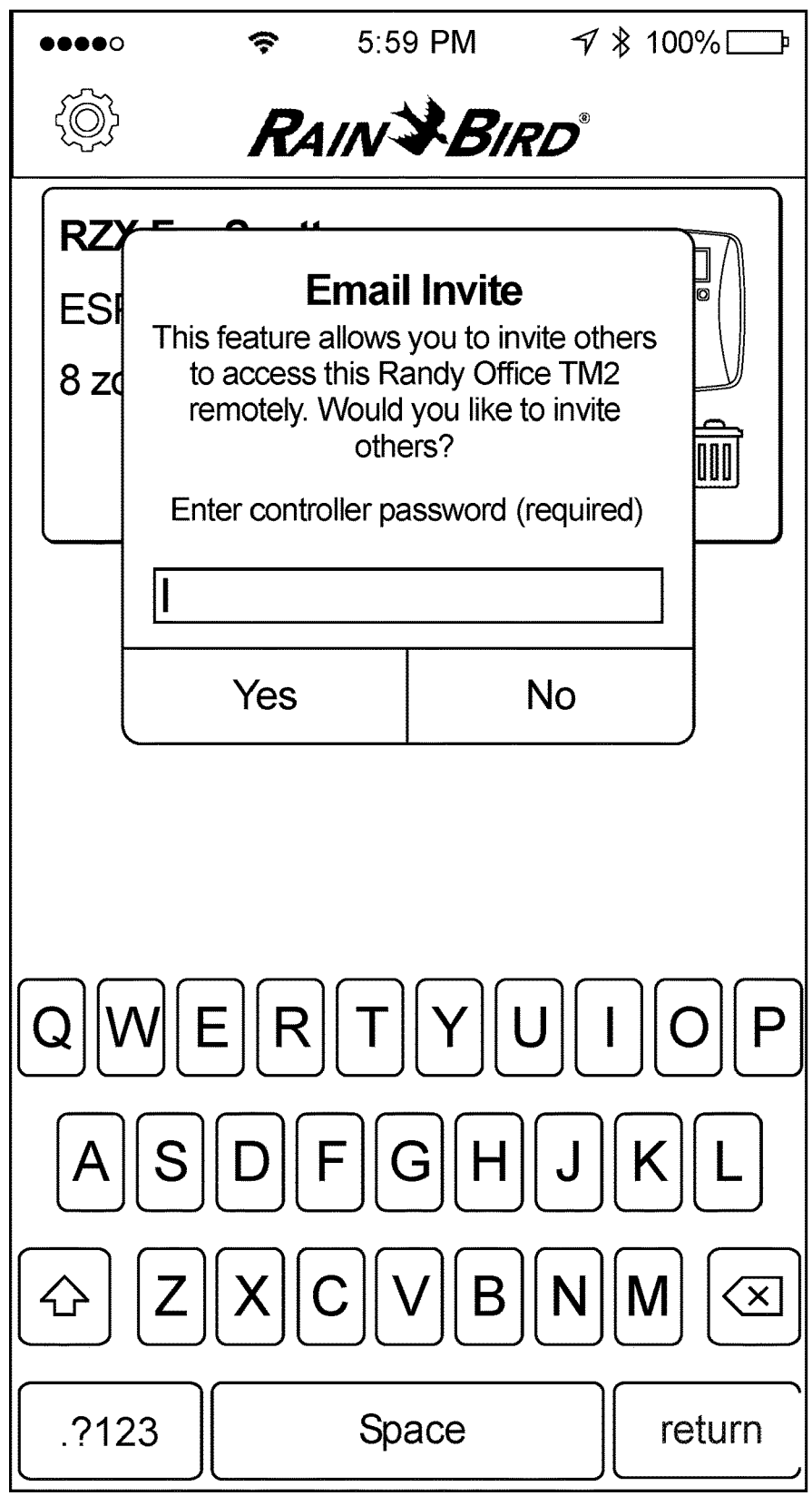
FIG. 24 depicts a GUI 2400 resultant from selecting share credentials for a wireless adapter, according to some embodiments.

FIG. 24 depicts a GUI 2400 resultant from selecting share credentials for a wireless adapter, according to some embodiments. As previously discussed, with respect to FIG. 16, in some embodiments, a user can transmit credentials to others, such as family members, friends, and contractors. The credentials are for a wireless adapter and allow access to the wireless adapter. In some embodiments, as depicting in the GUI 2400, a user may be required to enter a password for an irrigation controller or wireless adapter before being able to send credentials.

Figure 25:
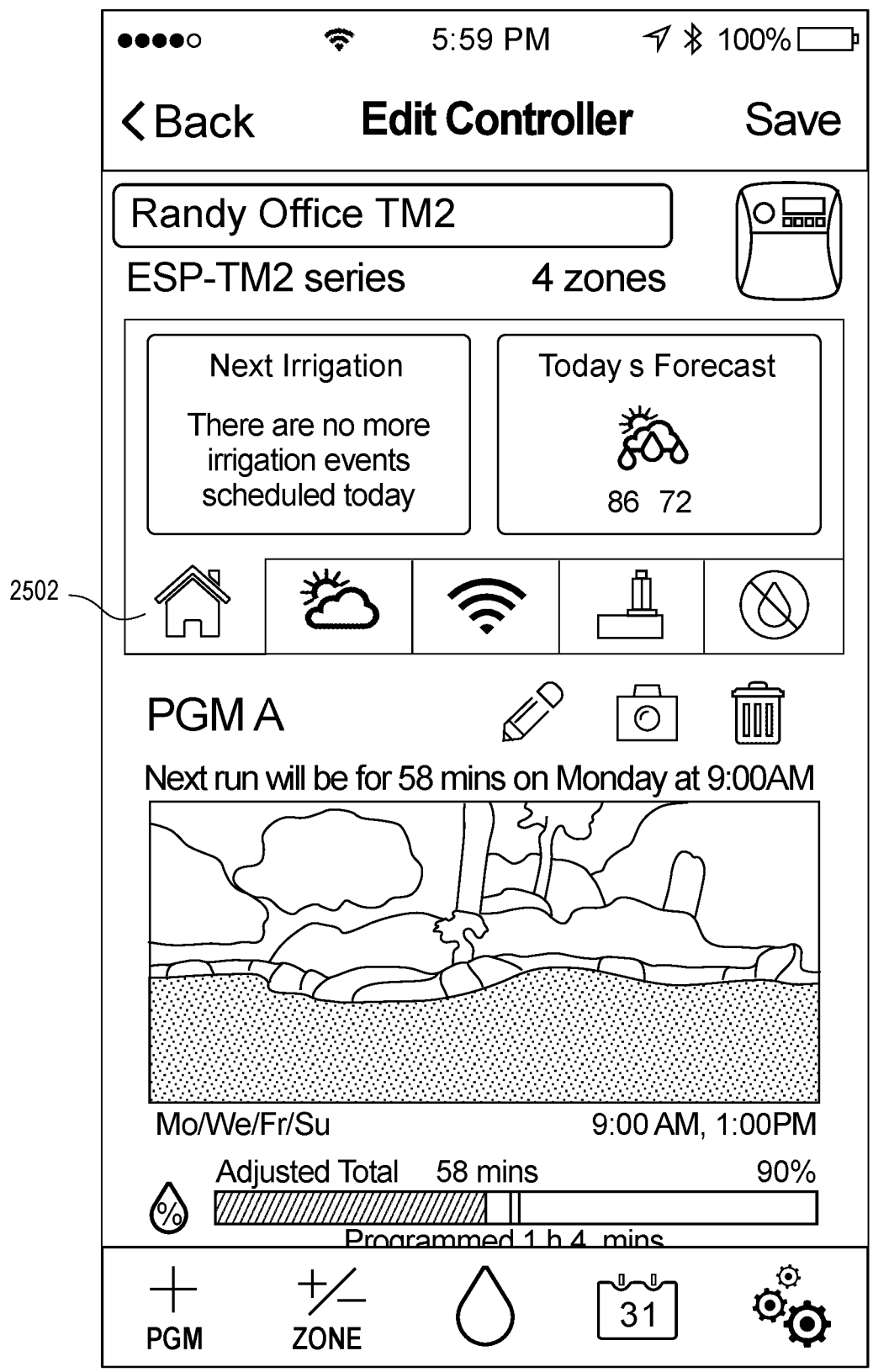
FIG. 25 depicts a home screen GUI 2500, according to some embodiments.

FIG. 25 depicts a home screen GUI 2500, according to some embodiments. In some embodiments, as part of the home screen, a user can see programs and modify programs (as discussed with respect to FIG. 6). The GUI 2500 also includes an indication of the next irrigation that is scheduled as well as the forecast for the day. The GUI 2500 includes a menu having multiple soft buttons 2502. The menu includes soft buttons 2052 (from left to right) for the home screen, the weather, network information, rain sensor bypass, and watering delay.

Figure 26:
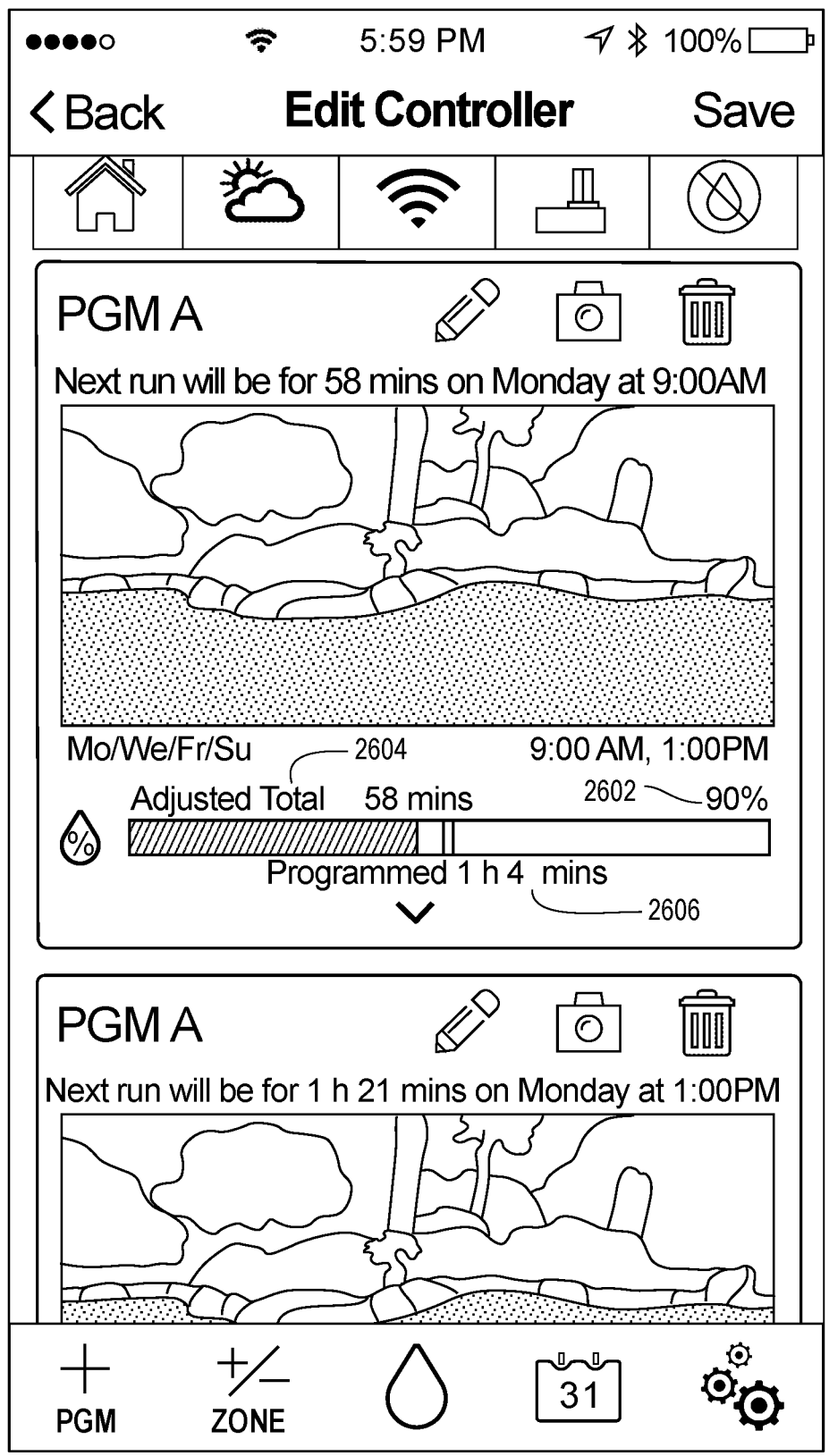
FIG. 26 depicts another image of a home screen GUI 2600, according to some embodiments.

FIG. 26 depicts another image of a home screen GUI 2600, according to some embodiments. The GUI 2600 shows the irrigation time for the program "PGM A." As can be seen "PGM A" was scheduled or 1 hour and 4 minutes 2606, was adjusted by 90% 2602, and has an adjusted total of 58 minutes. As can be seen, by scrolling from the home screen, the user can view and modify programs.

Figure 27:
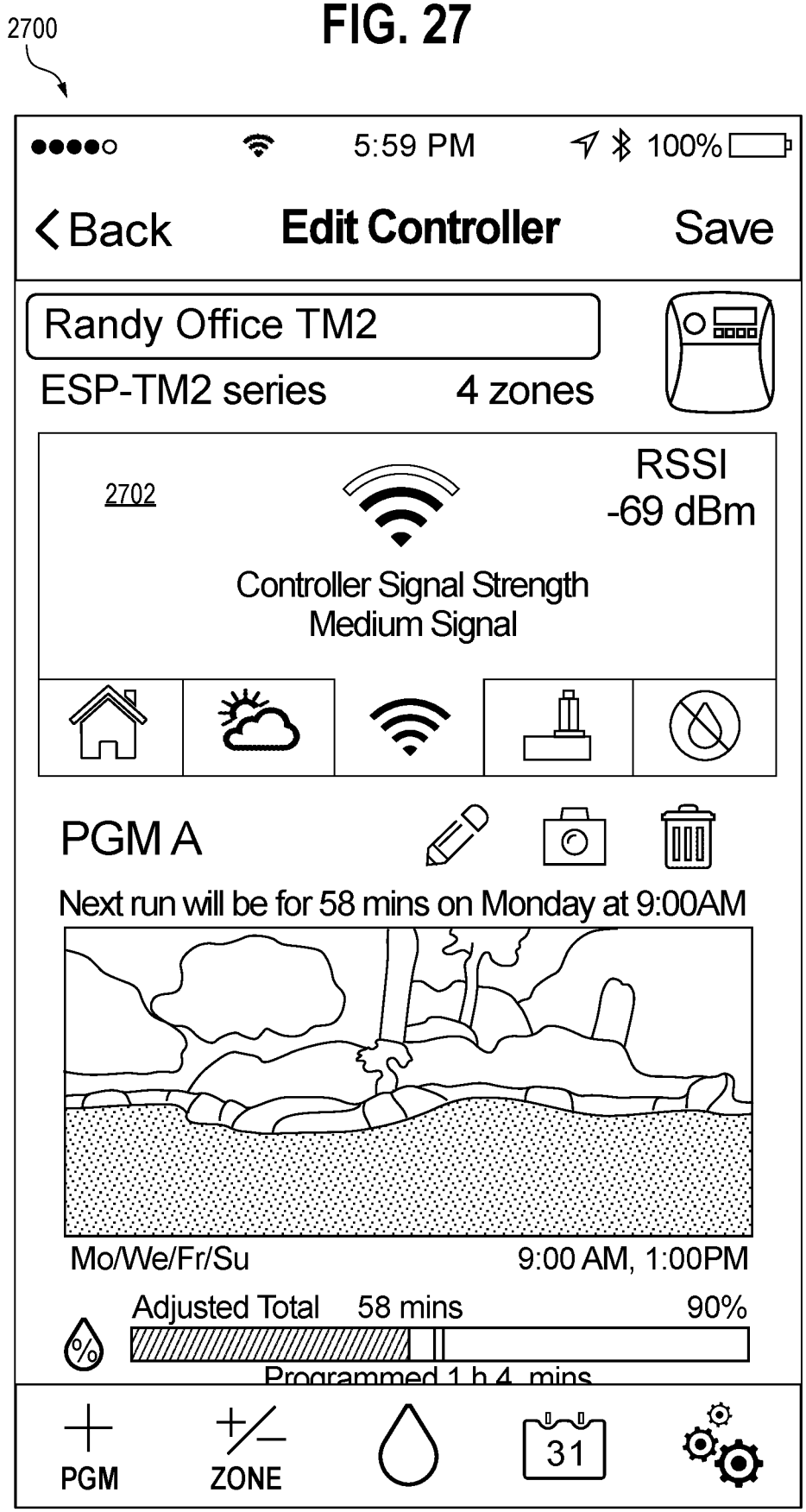
FIG. 27 depicts a GUI 2700 indicating signal strength of a wireless connection for an irrigation controller, according to some embodiments.

FIG. 27 depicts a GUI 2700 indicating signal strength of a wireless connection for an irrigation controller, according to some embodiments. The GUI 2700 includes a network status indicator 2702. As depicted in FIG. 27, the network status indicator 2702 includes a visual representation, as well as an RSSI value, of the signal strength of the network.

Figure 28:
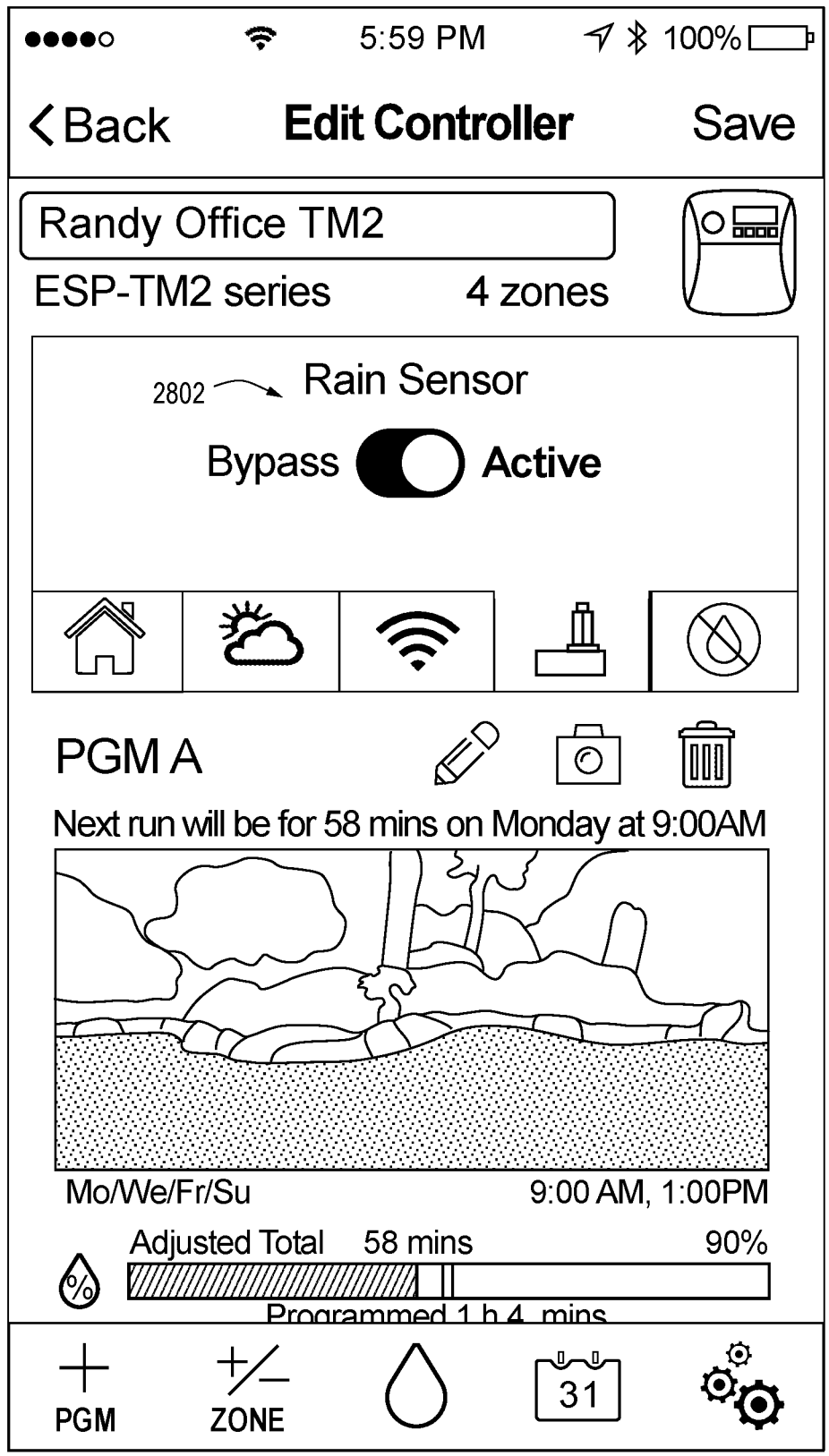
FIG. 28 depicts a GUI 2800 for bypassing a rain sensor, according to some embodiments.

FIG. 28 depicts a GUI 2800 for bypassing a rain sensor, according to some embodiments. The GUI 2800 includes a toggle 2802 that allows the user to bypass and activate a rain sensor.

Figure 29:
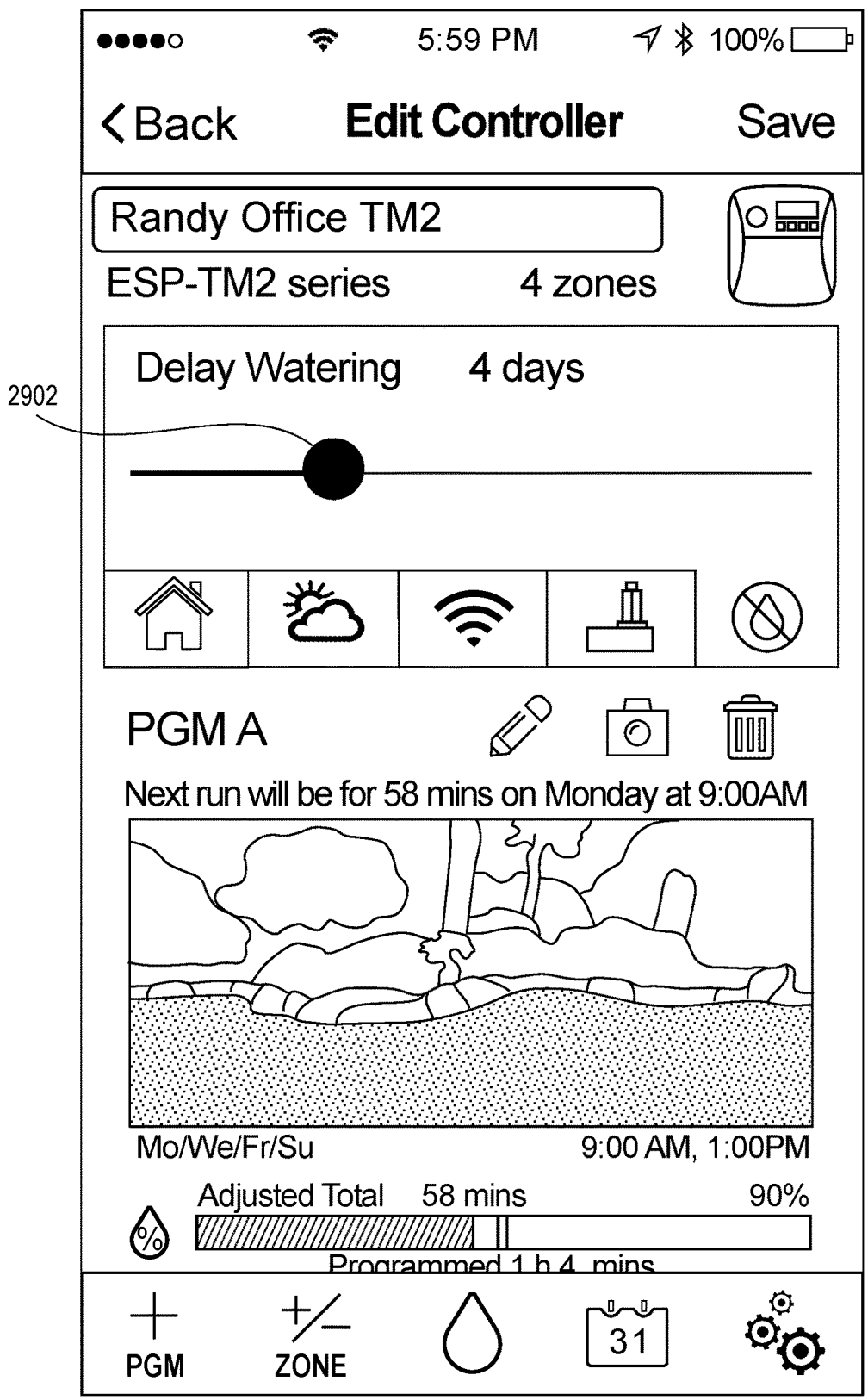
FIG. 29 depicts a GUI 2900 for delaying watering, according to some embodiments.

FIG. 29 depicts a GUI 2900 for delaying watering, according to some embodiments. The GUI 2900 allows a user to delay watering. The user can manipulate a slider 2902 to delay watering. For example, the user can drag the slider 2902 and/or touch an area to cause the slider 2902 to move to that area. As depicted in FIG. 29, the user has delayed watering by four days.

Figure 30:
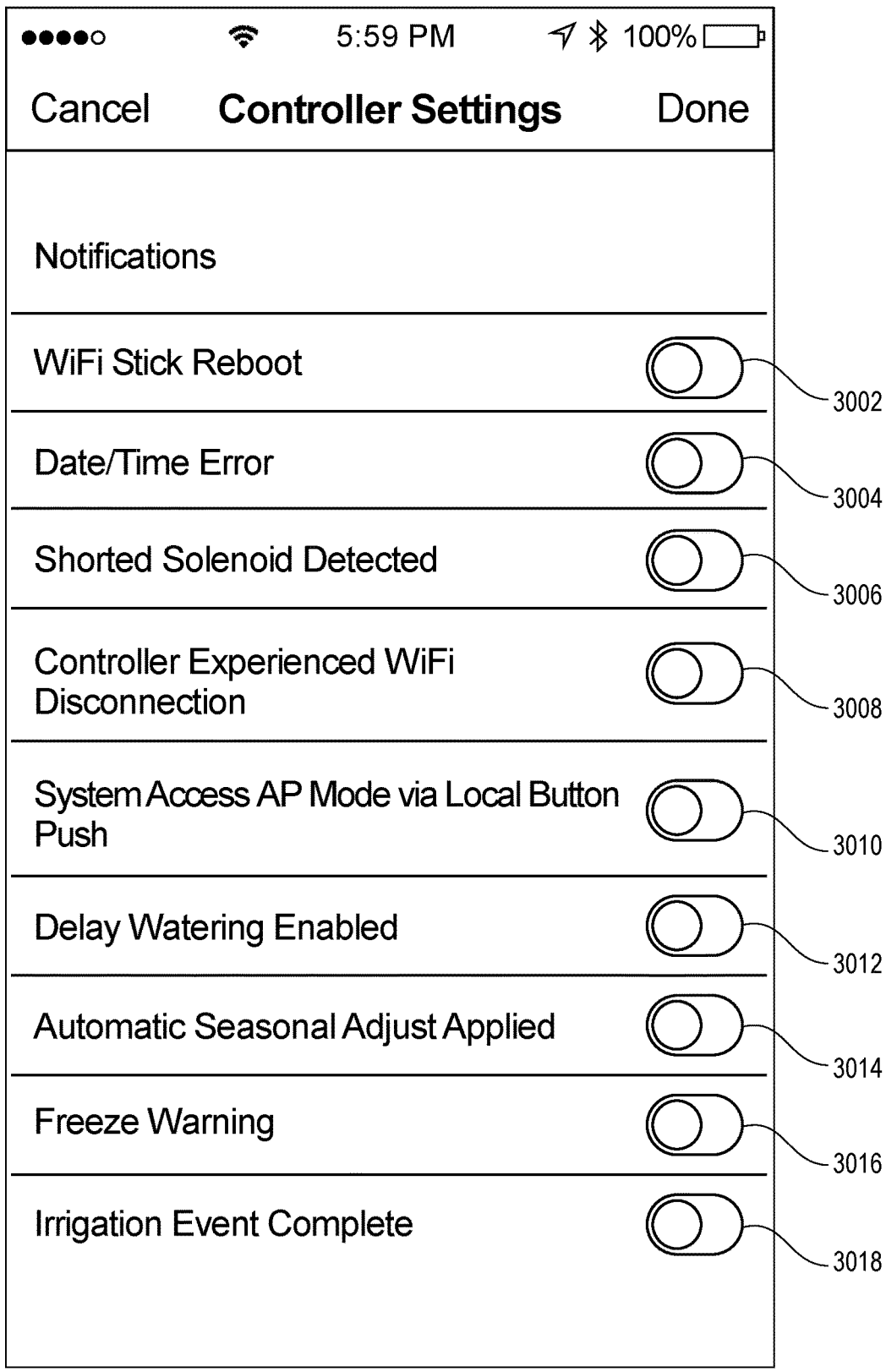
FIG. 30 depicts a GUI 3000 for adjusting controller settings, according to some embodiments.

FIG. 30 depicts a GUI 3000 for adjusting controller settings, according to some embodiments. The GUI 3000 includes a toggle for each notification that can be turned on and off. As depicted in FIG. 30, the GUI 3000 includes a toggle 3002 for wireless adapter reboot the notifications, a toggle 3004 for date/time error notifications, a toggle 3006 for shorted solenoid detected notifications, a toggle 3008 for controller experienced Wi-Fi disconnection notifications, a toggle 3010 for system access direct communication mode via local button push notifications, a toggle 3012 for delay watering enable notifications, a toggle 3014 for automatic seasonal adjust applied notifications, a toggle 3016 for freeze warning notifications, and a toggle 3018 for irrigation complete notifications. When turned on, the application will present a notification upon occurrence of the relevant condition. For example, if the "WiFi Stick Reboot" toggle 3002 is set to on and the wireless adapter reboots, the application will present a notification indicating that the wireless adapter has rebooted. In some embodiments, these notifications are push notifications.

Miscellaneous

In some embodiments, the application can interface with an aggregation device, such as a web console. The aggregation device can aggregate data from applications for multiple irrigation controllers. For example, the aggregation device can aggregate data associated with all irrigation controllers in a community. This aggregate information can be monitored by someone in charge of the community or a governmental body. Such information may be useful in areas with water usage restrictions to determine irrigation controllers responsible for significant water usage and potentially diagnose faults or problems with irrigation systems.

In some embodiments, an irrigation controller can be equipped with (e.g., as depicted in FIG. 2), or connected to (as depicted in FIG. 1), an image capture device. The irrigation controller can transmit, via the wireless adapter, images captured with the image capture device to the mobile device (or any other suitable device). For example, the irrigation controller can transmit images of the user's yard periodically (based on a programmed, predetermined, or random schedule) when the user is away. As another example, the irrigation controller can also include a motion sensor or other means of determining that a person is near the irrigation controller or entering information at the irrigation controller. When the irrigation controller detects that someone is near the irrigation controller or attempting to enter information at the irrigation controller, the image capture device can capture an image that includes the individual and transmit the image, via the wireless adapter, to the mobile device (or any other suitable device). Alternatively, the irrigation controller can simply transmit a notification, via the wireless adapter, that someone is near the irrigation controller or entering information at the irrigation controller.

In some embodiments, the wireless adapter can act as an access point, such as a router. For example, the wireless adapter can include a routing table and can be used as a range extender for a network. In such embodiments, the wireless adapter can communicate directly (as depicted in FIG. 1) or indirectly (as depicted in FIGS. 2 and 3) with the mobile device while also serving as an access point.

In some embodiments, one or more of all functions provided by the wireless adapters described herein may be integrated within the controller 110 housing and/or integrated into the microcontroller within the controller 110. For example, one or more or all of the components illustrated in the wireless adapter 2100 may be integrated within the controller and/or its microcontroller. Such integrated components could be fully integrated such as within the same board or microcontroller structure of the controller, or may be on a separate microcontroller within the controller coupled to the microcontroller of the controller. In such integrated embodiments, the one or more or all of the components are part of the controller 110 and are thus, not meant to be easily separable from the structure of the controller as are the wireless adapters that plug into the controller.

In some embodiments, the wireless adapter can push notifications to the mobile device. The notifications can be based on settings of the irrigation controller. For example, the wireless adapter can push a notification to the mobile device alerting the user that a watering delay has been set. The notifications can be based on components of the irrigation system. For example, the wireless adapter can push a notification to the mobile device alerting the user that a flow sensor is sensing a high flow or that one of the soil moisture sensors is malfunctioning. The notifications can be based on environmental factors, such as the weather. For example, the wireless adapter can push a notification to the mobile device alerting the user that there is a freeze warning (and that irrigation will be suspended until the freeze warning ends, or that the wireless adapter will instruct the irrigation controller to cycle the valves periodically so that the lines don't freeze), rain is likely in the near future, etc. Additionally, the push notifications can be based on activity at the irrigation controller. For example, the wireless adapter can push a notification to the mobile device if the wireless adapter is placed in a direct communication mode. In some embodiments, when in the direct communication mode, the wireless adapter can be accessed, and the password for the wireless adapter reset, without providing the current password for the wireless adapter to the wireless adapter. Accordingly, in such embodiments, the wireless adapter can transmit a notification to the wireless adapter when the wireless adapter enters this mode. This notification can be triggered, for example, by a button press, where selection of the button causes the wireless adapter to enter a direct communication mode.

In some embodiments, the wireless can receive over-the-air updates (e.g., software updates). In a first embodiment, the wireless adapter receives notification of an update from a remote server. The updates can be for the wireless adapter, the irrigation controller, or the application. The remote server can facilitate installation of the update on the wireless adapter. For example, the wireless adapter can accept the update from the remote server or the remote server can force the wireless adapter to install the update before allowing the wireless adapter to access the remote server or providing information to the wireless adapter. In a second embodiment, the application can alert the user to updates for the application, wireless adapter, and/or irrigation controller. In addition to alerting the user, the mobile device can automatically download the updates (e.g., wired or wirelessly). In some embodiments, the mobile device can download the updates for the wireless adapter and/or irrigation controller and facilitate installation of the software updates for the wireless adapter and/or the irrigation controller. Further, in some embodiments, the application can allow the user to manage which version of software is run by the wireless adapter. Many users become frustrated when they are forced to update software for their electronic devices, or unable to revert to an earlier version of the software, if they don't like the new version. In some embodiments, the wireless adapter can provide flexibility in which software is used. For example, the wireless adapter can be capable of storing multiple version of its operating software (i.e., multiple images of different files). In such embodiments, the application allows the user to select from which version of the operating software to boot. Further, the application may allow the user to select which version are overwritten when new versions are downloaded, and may also allow the user to make copies of the versions and move them between storage locations. The ability to switch between version of the software can be an advanced feature (e.g., only available to contractors) or easily accessible (e.g., users can be queried if they like the new version of the software, and whether they'd like to revert to the old version).

In some embodiments, the application includes a demonstration mode ("demo mode"). A user can download the application (or preview the application on a device in a retail facility) using the demo mode. Oftentimes, ease of use of a user interface is as, if not more, important than the hardware associated with Internet-connected devices. Unfortunately, users are oftentimes unable to conveniently trial an application associated with an Internet-connected device before purchasing the device itself, as the application doesn't include any functionality without a device to control. The demo mode allows users to interact with the application and user interface without requiring the user to purchase a device. The demo mode can include one or more fictitious irrigation controllers (and/or other components) with which the user can interact. For example, the demo mode can include a card for each type of irrigation controller (and/or other component) offered. Because the irrigation controllers (an/or other components) are fictitious, no command signals will be sent. The demo mode can provide the user with information as to the functionality of the application and the wireless adapter. In some embodiments, the user can download the application and use the application in the demo mode free of charge. This feature can allows potential customers to use the application and help make a decision to purchase the hardware (irrigation controller and wireless adapter). In some embodiments, once the user purchases the hardware, the user can delete (or the application can automatically remove), the demo mode (e.g., the cards associated with the fictitious irrigation controllers). Further, if the user wishes to again trial features in the application without transmitting any control signals, the user may be able to cause the demo mode to again be presented (i.e., the cards associated with the fictitious controllers).

In some embodiments, the application allows users to set service flags. Service flags indicate to a contractor that the user's irrigation system requires service. In various embodiments, the users can flag the irrigation system generally, specific components of the irrigation system (e.g., valves, sprinkler heads, irrigation controllers, etc.), specific zones of an irrigation system, etc. The application can, via the mobile device, transmit an alert to the user's contractor alerting the contractor that the irrigation system requires service. The notification can include identifying information for the user, identifying information for the irrigation system, an indication of the components and/or zones that need service, information regarding the user's irrigation system (e.g., types of components used, previous service history, maps of the irrigation system, etc.), etc. Additionally, the user may be able to take picture of a component or zone that requires service and the notification can include the image. If the user does not have a contractor, the application can search for and provide a list of contractors near the user. The list of contractors can include information regarding ratings (e.g., from a manufacturer or other users), certifications, specialties, contact information, etc. In some embodiments, the user can schedule a service appointment in the application. Further, the service flags can be based on preventative or predictive maintenance needs. For example, through research it may be determined that valves typically have a useful life of roughly 50,000 actuations. When a valve in the user's system nears 50,000 actuations, a service flag can be triggered indicating that the valve is nearing (or has reached) 50,000 actuations. The valve, the irrigation controller, or the wireless adapter can monitor the usage of the valve.

In some embodiments, the application allows the user to lock a control panel of the irrigation controller. Such a lock mechanism disables the control panel of the irrigation control. When the lock feature is activated, the irrigation controller can only be adjusted via the application. This feature may prevent unauthorized individuals from gaining access to the functionality of the irrigation control and/or modifying the irrigation schedule. In some embodiments, the command to lock the control panel can originate at the irrigation controller and/or the application. If the command to lock the control panel originates at the application, the mobile device can transmit a signal to the wireless adapter to lock the control panel.

In some embodiments, the application can communicate with and/or control other Internet-connected devices on the user's property. As one example, the application can be configured to communicate with a movable barrier operator (e.g., that controls a gate, lock, door, etc.) on the user's property. The application can be used to gain access to the property via a movable barrier controlled by the movable barrier operator. The application can transmit, via the user's mobile device, information necessary for the contractor's device to operate the movable barrier operator along with the credentials for the irrigation controller (as described with reference to FIG. 14). This feature can be useful for a user to grant access to his/her property and/or irrigation controller for a contractor. In some embodiments, the user can define restrictions based on time, day of the week, proximity, etc. for the contractor.

Additionally, the irrigation controller can be integrated with an alarm system (e.g., an alarm monitoring and security system for a home). The wireless adapter integrates the alarm system with the irrigation controller via a network. The network can include an alarm server, with which the alarm system communicates. Typically, the alarm application allows the user to interact with the alarm system. Integration of the irrigation controller with the alarm system enables a user of the alarm system to monitor the irrigation controller via an alarm application. That is, once integrated, the alarm application allows the user to monitor both the alarm system and the irrigation controller. In some embodiments, the user is able to monitor all functionality of the irrigation controller via the alarm application. In other embodiments, the user may only be able to monitor a limited amount of the functionality of the irrigation controller via the alarm application. For example, the user may be able to transmit commands for starting and/or stopping irrigation, setting seasonal adjust values, setting watering delays, etc. The alarm application and the application (i.e., the application for the wireless adapter) may both run on the same mobile device, although this is not required. Initial setup of the integration of the irrigation controller with the alarm system includes connecting the wireless adapter to the irrigation controller. Connecting the wireless adapter to the irrigation controller creates a controller card interface in the application (i.e., the application for the wireless adapter). In the application (i.e., the application for the wireless controller), the user can select the controller card interface to gain remote access to the irrigation controller. If the user is also a user of the alarm system, the user can integrate the irrigation controller with the alarm system via, for example, an advanced menu option. The advanced menu option can include selections to enable integration of the irrigation controller with the alarm system. Once enabled, authentication occurs. During authentication, the remote server transmits information to the alarm server. The information can include information about the wireless adapter. The information about the wireless adapter identifies the wireless adapter to the alarm server. For example, this information can include a media access control (MAC) address. In some embodiments, prior to initial setup of the integration, a security installer goes into an alarm monitoring security installer portal and maps the MAC address of the wireless adapter to the user's account with the alarm system. When the user enables the integration of the irrigation controller, the remote server sends the information for the wireless adapter to the alarm server. This process confirms that the hardware is online for the alarm system. After integration, the application for the alarm system will present a user interface for the irrigation controller. This user interface for the irrigation controller allows the user to monitor the irrigation controller (e.g., view information about the irrigation controller or irrigation system, send commands to the irrigation controller, etc.). When the user initiates an action to control the irrigation controller via the application for the alarm system, a command is sent to the alarm server. The alarm server authenticates that the MAC address for the wireless adapter is associated with the correct user account. After authentication, the alarm server transmits the command to the remote server. The remote server then transmits the command to the irrigation controller. In some embodiments, after receipt of the command, the irrigation controller, via the wireless adapter, transmits a confirmation to the remote server. In addition to monitoring the irrigation controller via the alarm application, in some embodiments, the alarm application can present push notifications relevant to the irrigation controller. Additionally, the user may be able to customize these push notifications so that the application and the alarm application present different notifications. For example, the user can set the application to not present any notifications, and the alarm application to present all notifications for the irrigation controller.

In some embodiments, the wireless adapter can include a radio (e.g., radio frequency transceiver, Wi-Fi transceiver, etc.) that communicates directly or indirectly with components of the user's irrigation system. For example, the wireless adapter can receive operational data (e.g., weather station data, flow sensor data, pressure regulator data, etc.), status data, battery life data, etc. of components associated with the user's irrigation system. The wireless adapter can enter a data gathering mode to collect this data. In one embodiment, the wireless adapter periodically queries the components. In another embodiment, the components send the data to the wireless adapter without being queried (e.g., periodically, when a problem is detected, etc.). The wireless adapter can transmit the data to the mobile device for presentation via the application. As previously discussed, the wireless adapter can transmit service flags. In some embodiments, the service flags can indicate preventative and/or predictive maintenance. If a component is able to communicate with the wireless adapter, the component can include sensor(s) that monitor the component's usage. This usage data can be used by the wireless adapter to trigger service flags.

The following describes and summaries various embodiments as described variously throughout this specification. In some embodiments, an irrigation control system comprises an irrigation controller located within a coverage range of a first local wireless network and configured to control irrigation by outputting control signals to one or more water flow control devices, a wireless adapter, wherein the wireless adapter comprises a processor, a memory and a wireless communication chipset, and an irrigation control application, wherein the irrigation control application is configured to execute on a mobile device, and wherein the irrigation control application is configured to communicate with the irrigation controller via the wireless adapter to provide a remote user control interface to the irrigation controller, wherein the wireless adapter is configured to communicate with the irrigation control application in any one of the following communication modes: a direct communication mode between the wireless adapter and the mobile device where the wireless adapter creates a second local area network and the mobile device becomes a client of the second wireless area network, a first indirect communication mode where the wireless adapter and the mobile device communicate via an access point using the first local area network, wherein the mobile device is within the coverage area of the first local area network, and a second indirect communication mode where the wireless adapter communicates with the access point using the first local area network, where the mobile device communicates with the access point via a wide area network, wherein the mobile device is outside of the coverage area of the first local area network.

The irrigation control system may only require the direct communication mode. The irrigation control system may allow the wireless adapter to be fully configured for communication with the irrigation control application in the direct communication mode. The irrigation control system may not require a user account registered with a remote server including user login data for the mobile device to communicate with the wireless adapter in the direct communication mode, the first indirect communication mode, or the second indirect communication mode. The irrigation control system may not be an account based system having user accounts registered with a remote server including login data. The wireless adapter may not require transmission of a password from the mobile device when receiving communications in the direct communication mode. However, the wireless adapter may require transmission of a password from the mobile device when receiving communications in the first indirect communication mode and the second indirect communication mode. The wireless adapter may be integrated with the irrigation controller. Alternatively, the wireless adapter may be separable from the irrigation controller in that the wireless adapter physically couples to the irrigation controller at a port of the irrigation controller. The wireless adapter can include a physical input, the selection of which forces the wireless adapter to communicate in the direct communication mode. The wireless adapter may allow reset of a password without input of the password when in the direct communication mode. The wireless adapter may be configured to receive a geographically-based weather adjustment factor. Once configured at the irrigation controller, the irrigation control system may allow the wireless adapter to be coupled to a second irrigation controller and operate with the irrigation control application at the second irrigation controller. Transitions from one communication mode to another communication mode can be one or more of manually performed by a user interacting with the irrigation control application and automatically performed in the operation between the wireless adapter and the irrigation control application.

In some embodiments, a method for communicating between a mobile device and an irrigation controller comprises receiving, at a mobile device, user input, wherein the user input indicates a command for the irrigation controller, and receiving, at a wireless adapter that is within a coverage area of a first local area network, the command for the irrigation controller, wherein the command is received from: the mobile device when the wireless adapter is in a direct communication mode, wherein when in the direct communication mode the wireless adapter creates a second local area network and the mobile device becomes a client of the second local area network, an access point when the wireless adapter is in a first indirect communication mode, wherein when the wireless adapter is in the first indirect communication mode the mobile device communicates directly with the access point and the mobile device is within the coverage area of the first local area network, and the access point, when the wireless adapter is in a second direct communication mode, wherein when in the second indirect communication mode the mobile device communicates indirectly with the access point via a wide area network and the mobile device is outside of the coverage area of the first local area network.

The method may only have one required mode, the direct communication mode. The method may also allow the wireless adapter to be fully configured for communication with an irrigation control application executing on the mobile device in the direct communication mode. With the method, the wireless adapter may not require transmission of a password from the mobile device when in the direct communication mode.

In some embodiments, a mobile device for presenting a user interface associated with an irrigation control application comprises a memory configured to store operating system program code and an irrigation control application program code, a processor coupled to the memory and configured to execute the operating system program code and execute the irrigation control application program code to provide the irrigation control application, a user interface comprising a display device configured to visually display user interface display screens provided by the irrigation control application to the user, and an input device configured to receive user input to interact with the irrigation control application, and a wireless radio configured to send transmissions to, and receive transmissions from, a wireless adapter associated with the irrigation control application, wherein the wireless adapter is associated with an irrigation controller remote from the mobile device, wherein the user interface visually displays via the output device a slider for each of two or more zones of an irrigation system simultaneously, and wherein, via the user interaction with the slider, an irrigation run time for each of the two or more zones is independently adjustable by the user.

The slider for each of the two or more zones of an irrigation system may allow manual watering to be programmed for one or more zones. The user interface may allow a user to select which zones will included in the two or more zones presented simultaneously. The user interface may further allow grouping of two or more irrigation controllers in a card. The user interface may allow transmission of irrigation controller credentials via the wireless radio. The irrigation controller credentials may allow temporary access to an irrigation controller associated with the irrigation controller credentials. The user interface may be configured to present information regarding signal strength of a network with which the wireless adapter is connected. The user interface may be configured to receive, via the user input, selectin of a version of software with which the wireless adapter should boot. The irrigation application can include a demo mode. The irrigation controller can include service flags.

In some embodiments, a user interface of an irrigation control application configured to be displayed on a touchscreen of a mobile device in wireless communication with a wireless adapter associated with an irrigation controller that is remote from the mobile device comprises a run time section configured to be displayed on the touchscreen, wherein the run time section includes a first slider and a second slider, wherein the first slider controls run time for a first zone and the second slider controls run time for a second zone, a programming mode configured to be displayed on the touchscreen, wherein the programming mode includes a zone naming section, a frequency section, a start time section, and a run time section, a zone enablement section configured to be displayed on the touchscreen, wherein the zone enablement section includes a first selector and a second selector, wherein the first selector corresponds to the first zone and the second selector corresponds to the second zone, and wherein selection of the first selector disables the first zone and selection of the second selector disables the second zone.

In some embodiments, a user interface of an irrigation control application configured to be displayed on a touchscreen of a mobile device in wireless communication with a wireless adapter associated with an irrigation controller that is remote from the mobile device comprises a controller card selection interface configured to be displayed on the touchscreen, the controller car selection interface is configured to present one or more cards, each card being a visual representation of a set of configuration parameters associated with user configuration of at least one wireless adapter, present a card name associated with each of the one or more cards, and allow a user to select a given card when the user interacts with the visual representation of the selected controller card, wherein one of the displayed cards comprises a grouped controller card, the grouped controller card being associated with sets of configuration parameters of a plurality of wireless adapters.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An irrigation control system comprising:
an irrigation controller located within a coverage range of a first local wireless network and configured to control irrigation by outputting control signals to one or more water flow control devices;
a wireless adapter, wherein the wireless adapter comprises a processor, a memory and a wireless communication chipset; and
an irrigation control application, wherein the irrigation control application is configured to execute on a smart phone, and wherein the irrigation control application is configured to communicate with the irrigation controller via the wireless adapter to provide a remote user control interface to the irrigation controller;
wherein the wireless adapter is configured to communicate with the irrigation control application in each of the following communication modes:
a direct communication mode between the wireless adapter and the smart phone where the wireless adapter creates a second local wireless network and the smart phone becomes a client of the second local wireless network, wherein the direct communication mode is required for configuration of the wireless adapter via the irrigation control application, wherein a password is created during the direct communication mode that allows the irrigation control application to access the wireless adapter in indirect communication modes, and wherein the indirect communication modes cannot be used to access the wireless adapter until the wireless adapter is configured in the direct communication mode;
a first indirect communication mode where the wireless adapter and the smart phone communicate via an access point using the first local wireless network without a user account, wherein the smart phone is within the coverage area of the first local wireless network, and wherein during the first indirect communication mode the irrigation control application transmits the password to the wireless adapter to access the wireless adapter; and
a second indirect communication mode where the wireless adapter communicates with the access point using the first local wireless network without a user account, wherein the smart phone communicates with the access point via a wide area network, wherein the smart phone is outside of the coverage area of the first local wireless network, and wherein during the second indirect communication mode the irrigation control application transmits the password to the wireless adapter to access the wireless adapter.

2. The irrigation control system of claim 1, wherein the only required mode is the direct communication mode.

3. The irrigation control system of claim 1, wherein the wireless adapter is configured by one or more of configuring initial parameters and setting of the wireless adapter and configuring irrigation programs.

4. The irrigation control system of claim 1, wherein the smartphone communicates with the wireless adapter without a user account in that a user account registered with a remote server including user login data is not required for the smart phone to communicate with the wireless adapter in the direct communication mode, the first indirect communication mode, and the second indirect communication mode.

5. The irrigation control system of claim 1, wherein the irrigation control system is not an account-based system having user accounts registered with a remote server including login data.

6. The irrigation control system of claim 1, wherein the wireless adapter does not require transmission of a password from the smart phone when receiving communications in the direct communication mode.

7. The irrigation control system of claim 1, wherein the wireless adapter is integrated with the irrigation controller.

8. The irrigation control system of claim 1, wherein the wireless adapter is separable from the irrigation controller, and wherein the wireless adapter physically couples to the irrigation controller at a port of the irrigation controller.

9. The irrigation control system of claim 1, wherein the first indirect communication mode is a default mode.

10. The irrigation control system of claim 1, wherein the wireless adapter includes a physical input, wherein selection of the physical input forces the wireless adapter to communicate in the direct communication mode.

11. The irrigation control system of claim 1, wherein the wireless adapter allows reset of a password without input of the password when in the direct communication mode.

12. The irrigation control system of claim 1, wherein the wireless adapter is configured to receive a geographically-based weather adjustment factor.

13. The irrigation control system of claim 12, wherein the irrigation control application allows a user to select at the smart phone whether the wireless adapter will output control signals to the irrigation controller responsive to receipt at the wireless adapter of the geographically-based weather adjustment factor.

14. The irrigation control system of claim 1, wherein once configured at the irrigation controller, the wireless adapter can be disconnected from the irrigation controller and coupled to a second irrigation controller and operate with the irrigation control application at the second irrigation controller.

15. The irrigation control system of claim 1, wherein a transition from one communication mode to another communication mode is one or more of: manually performed by a user interacting with the irrigation control application; and automatically performed in the operation between the wireless adapter and the irrigation control application.

16. The irrigation control system of claim 1, wherein the irrigation control application allows a user to transmit encrypted credentials to a person, wherein the encrypted credentials allow the person to access the wireless adapter.

17. The irrigation control system of claim 16, wherein the encrypted credentials allow the person to access the wireless adapter temporarily.

18. A method for communicating between a smart phone and an irrigation controller, the method comprising:
   receiving, at the smart phone, user input, wherein the user input indicates a command for the irrigation controller; and
   receiving at a wireless adapter that is within a coverage area of a first local wireless network, the command for the irrigation controller, wherein the wireless adapter is capable of receiving the command in three modes, and wherein the command is received from:
      the smart phone when the wireless adapter is in a direct communication mode, wherein when in the direct communication mode the wireless adapter creates a second local wireless network and the smart phone becomes a client of the second local wireless network, wherein the direct communication mode is required for configuration of the wireless adapter via the irrigation control application, wherein a password is created during the direct communication mode that allows the irrigation control application to access the wireless adapter in indirect communication modes, and wherein the indirect communication modes cannot be used to access the wireless adapter until the wireless adapter is configured in the direct communication mode;
      an access point when the wireless adapter is in a first indirect communication mode, wherein when the wireless adapter is in the first indirect communication mode the smart phone communicates directly with the access point and the smart phone is within the coverage area of the first local wireless network without a user account, and wherein during the first indirect communication mode the irrigation control application transmits the password to the wireless adapter to access the wireless adapter; and
      the access point when the wireless adapter is in a second direct communication mode, wherein when in the second indirect communication mode the smart phone communicates indirectly with the access point via a wide area network and the smart phone is outside of the coverage area of the first local wireless network without a user account, and wherein during the second indirect communication mode the irrigation control application transmits the password to the wireless adapter to access the wireless adapter.

19. The method of claim 18, wherein the only required mode is the direct communication mode.

20. The method of claim 18, wherein the wireless adapter is configured by one or more of configuring initial parameters and setting of the wireless adapter and configuring irrigation programs.

21. The method of claim 18, wherein the wireless adapter does not require transmission of a password from the smart phone when receiving communications in the direct communication mode.

* * * * *